United States Patent
Everett et al.

(10) Patent No.: US 11,551,486 B1
(45) Date of Patent: Jan. 10, 2023

(54) VEHICLE MONITORING SYSTEM

(71) Applicant: Progressive Casualty Insurance Company, Mayfield Village, OH (US)

(72) Inventors: William Curtis Everett, Chagrin Falls, OH (US); Richard Ashton Hutchinson, Chagrin Falls, OH (US); Wilbert John Steigerwald, III, Kirtland, OH (US); William Andrew Say, Macedonia, OH (US); Patrick Lawrence O'Malley, Kirtland, OH (US); Dane Allen Shrallow, Solon, OH (US); Raymond Scott Ling, Westlake, OH (US); Robert John McMillan, Divide, CO (US)

(73) Assignee: PROGRESSIVE CASUALTY INSURANCE COMPANY, Mayfield Village, OH (US)

( * ) Notice: Subject to any disclaimer, the term of this patent is extended or adjusted under 35 U.S.C. 154(b) by 703 days.

(21) Appl. No.: 15/694,266

(22) Filed: Sep. 1, 2017

Related U.S. Application Data

(60) Continuation of application No. 13/618,021, filed on Sep. 14, 2012, now Pat. No. 9,754,424, which is a continuation of application No. 13/399,386, filed on Feb. 17, 2012, now Pat. No. 8,311,858, which is a division of application No. 12/132,487, filed on Jun. 3, 2008, now Pat. No. 8,140,358, which is a (Continued)

(51) Int. Cl.
*G07C 5/00* (2006.01)
*G06Q 10/08* (2012.01)
*G06Q 40/08* (2012.01)

(52) U.S. Cl.
CPC ......... *G07C 5/008* (2013.01); *G06Q 10/0833* (2013.01); *G06Q 40/08* (2013.01)

(58) Field of Classification Search
CPC ..... G07C 5/008; G06Q 10/0833; G06Q 40/08
USPC ....................................................... 701/33.4
See application file for complete search history.

(56) References Cited

U.S. PATENT DOCUMENTS 4,728,922 A * 3/1988 Christen ................. G01D 5/12
177/136
5,719,551 A * 2/1998 Flick ...................... B60R 25/04
180/287

(Continued)

*Primary Examiner* — Isaac G Smith
(74) *Attorney, Agent, or Firm* — Lempia Summerfield Katz LLC

(57) ABSTRACT

A data logging device tracks the operation of a vehicle or driver actions. The device includes a storage device, which may be removable or portable, having a first memory portion that may be read from and may be written to in a vehicle and a second memory portion that may be read from and may be written to in the vehicle. The second memory portion may retain data attributes associated with the data stored in the first removable storage device. A processor reads data from an automotive bus that transfers data from vehicle sensors to other automotive components. The processor writes data to the first memory portion and the second memory portion that reflect a level of risk or safety. A communication device links the storage device to a network of computers. The communication device may be accessible through software that allows a user to access files related to a level of risk or safety and other software that may be related to those files.

22 Claims, 36 Drawing Sheets

Related U.S. Application Data continuation-in-part of application No. 10/764,076, filed on Jan. 23, 2004, now Pat. No. 8,090,598.

(56) References Cited

U.S. PATENT DOCUMENTS

| | | | | |
|---|---|---|---|---|
| 5,797,134 A * | 8/1998 | McMillan | ............... | G06Q 40/08 705/400 |
| 6,232,874 B1 * | 5/2001 | Murphy | ................ | B60R 25/255 340/426.19 |
| 6,571,617 B2 * | 6/2003 | Van Niekerk | ........... | G01L 17/00 340/447 |
| 6,580,983 B2 * | 6/2003 | Laguer-Diaz | ........... | B61L 3/125 701/31.4 |
| 7,356,389 B2 * | 4/2008 | Holst | ...................... | H04L 67/06 701/3 |
| 2002/0110084 A1 * | 8/2002 | Butt | ........................ | H04L 47/13 370/252 |
| 2002/0198653 A1 * | 12/2002 | Lutter | .................... | G08G 1/162 701/418 |
| 2003/0099210 A1 * | 5/2003 | O'Toole | ............. | G06K 19/0726 370/311 |
| 2003/0100308 A1 * | 5/2003 | Rusch | ................... | H04W 48/18 455/445 |
| 2003/0129961 A1 * | 7/2003 | Weisshaar | ............ | H04W 28/06 455/403 |
| 2003/0139179 A1 * | 7/2003 | Fuchs | ................... | H04L 67/306 455/426.1 |
| 2003/0146841 A1 * | 8/2003 | Koenig | .................. | B60K 28/06 340/576 |
| 2003/0216889 A1 * | 11/2003 | Marko | ................... | G07C 5/008 702/182 |
| 2007/0050108 A1 * | 3/2007 | Larschan | ............... | G07C 5/085 701/33.4 |
| 2007/0276584 A1 * | 11/2007 | Veliu | ...................... | G01C 21/26 701/532 |
| 2008/0319602 A1 * | 12/2008 | McClellan | ............. | G07C 5/008 701/31.4 |
| 2010/0030586 A1 * | 2/2010 | Taylor | ................... | G06Q 40/08 705/4 |

* cited by examiner

Your Trip Details Log

Use Your Trip Details Log to review specific trips. Sort by date and type of trip. Click on the arrow beside a date to see details for all trips taken that day.

All Trips     Click on Day or Trip to View Your Trip Speed Chart

[Select a Trip Type ▼]

| TRIP DATE | NUMBER OF TRIPS | RISK LEVELS | DRIVING TIME hr:min | OVER 75 MPH min:sec | MILEAGE | SUDDEN STARTS/STOPS |
|---|---|---|---|---|---|---|
| Fri. 10/26/07 | 3 | ⊘⊗ | 001:11 | 000:00 | 46.0 | 0 \| 1 |
| Mon. 10/29/07 | 6 | ⊘⊗⊘ | 001:20 | 000:00 | 42.7 | 1 \| 0 |
| Tue. 10/30/07 | 6 | ⊘⊗⊘⊘ | 001:23 | 000:00 | 52.4 | 0 \| 3 |
| Wed. 10/31/07 | 2 | ⊘⊗ | 000:56 | 002:01 | 42.5 | 0 \| 2 |
| Thu. 11/01/07 | 4 | ⊘⊗⊘⊘ | 001:23 | 000:00 | 55.7 | 1 \| 5 |
| Fri. 11/02/07 | 5 | ⊘⊗⊘⊘◆ | 001:22 | 000:00 | 50.1 | 0 \| 5 |
| Sat. 11/03/07 | 5 | ⊘⊘⊘⊗⊗ | 000:37 | 000:00 | 16.2 | 1 \| 0 |
| Mon. 11/05/07 | 5 | ⊘⊘⊘⊗⊗ | 001:21 | 000:10 | 49.1 | 0 \| 3 |
| Tue. 11/06/07 | 3 | ⊘⊗⊘ | 001:00 | 000:00 | 42.4 | 0 \| 0 |
| Wed. 11/07/07 | 4 | ⊘⊘⊗⊘ | 001:07 | 000:00 | 45.3 | 0 \| 3 |
| Thu. 11/08/07 | 2 | ⊘⊗ | 000:58 | 000:00 | 42.3 | 0 \| 2 |
| Fri. 11/09/07 | 4 | ⊘⊘⊗⊘ | 001:13 | 000:00 | 46.4 | 1 \| 4 |
| Sat. 11/10/07 | 2 | ⊘⊘ | 000:17 | 000:00 | 6.9 | 0 \| 0 |
| Sun. 11/11/07 | 2 | ⊘⊘ | 000:18 | 000:00 | 7.8 | 0 \| 1 |
| Mon. 11/12/07 | 4 | ⊘⊘⊗⊘ | 001:12 | 000:00 | 46.5 | 1 \| 6 |
| Tue. 11/13/07 | 2 | ⊘⊗ | 000:55 | 000:00 | 42.3 | 0 \| 1 |
| Wed. 11/14/07 | 3 | ⊘⊘⊗ | 001:01 | 000:00 | 42.4 | 0 \| 0 |
| Thu. 11/15/07 | 4 | ⊘⊘⊗⊘ | 001:10 | 000:00 | 43.2 | 1 \| 2 |

FIG. 34A

Your Trip Details Log

Use Your Trip Details Log to review specific trips. Sort by date and type of trip. Click on the arrow beside a date to see details for all trips taken that day.

All Trips

Click on Day or Trip to View Your Trip Speed Chart

Select a Trip Type ▼

| TRIP DATE | NUMBER OF TRIPS | RISK LEVELS | DRIVING TIME hr:min | OVER 75 MPH min:sec | MILEAGE | SUDDEN STARTS\|STOP |
|---|---|---|---|---|---|---|
| ▶ Fri. 10/26/07 | 3 | ⊘⊘ | 000:00 | 000:00 | 46.0 | 0\|1 |
| ▼ Mon. 10/29/07 | 6 | ①⊘⊘ | 000:00 | 000:00 | 42.7 | 1\|0 |
|   06:01am-06:36am | | ⊘⊘ | 000:35 | 000:00 | 18.2 | 1\|0 |
|   10:59am-11:03am | | ①⊘ | 000:04 | 000:00 | 1.3 | 0\|0 |
|   11:21am-11:27am | | ⊘⊘ | 000:06 | 000:00 | 2.4 | 0\|0 |
|   04:37pm-05:01pm | | ⊘⊘ | 000:24 | 000:00 | 17.9 | 0\|0 |
|   05:01pm-05:04pm | | ①⊘ | 000:02 | 000:00 | 0.0 | 0\|0 |
|   05:07pm-05:14pm | | ⊘⊘ | 000:07 | 000:00 | 2.9 | 0\|0 |
| ▶ Tue. 10/30/07 | 6 | ①⊘⊘ | 000:00 | 000:00 | 52.4 | 0\|3 |
| ▶ Wed. 10/31/07 | 2 | ⊘⊘ | 000:00 | 000:00 | 42.5 | 0\|2 |
| ▶ Thu. 11/01/07 | 4 | ①⊘⊘ | 000:00 | 000:00 | 55.7 | 1\|5 |
| ▶ Fri. 11/02/07 | 5 | ⊘⊘ | 000:00 | 000:00 | 50.1 | 0\|5 |
| ▶ Sat. 11/03/07 | 5 | ①⊘⊘ | 000:00 | 000:00 | 16.2 | 1\|0 |
| ▶ Mon. 11/05/07 | 3 | ⊘⊘ | 000:00 | 000:00 | 49.1 | 0\|3 |
| ▶ Tue. 11/06/07 | 4 | ①⊘⊘ | 000:00 | 000:00 | 42.4 | 0\|0 |
| ▶ Wed. 11/07/07 | 2 | ⊘⊘ | 000:00 | 000:00 | 45.9 | 0\|3 |
| ▶ Thu. 11/08/07 | 2 | ①⊘ | 000:00 | 000:00 | 42.3 | 0\|2 |
| ▶ Fri. 11/09/07 | 4 | ⊘⊘ | 000:00 | 000:00 | 46.4 | 1\|4 |

VEHICLE MONITORING SYSTEM

PRIORITY CLAIM

This application is a continuation of U.S. Ser. No. 13/618,021, which is now U.S. Pat. No. 9,754,424, which is a continuation of U.S. Ser. No. 13/399,386, filed Feb. 17, 2012, which is now U.S. Pat. No. 8,311,858, which is a division of U.S. Ser. No. 12/132,487, filed Jun. 3, 2008, which is now U.S. Pat. No. 8,140,358, which is a continuation-in-part application of U.S. Ser. No. 10/764,076, filed Jan. 23, 2004, which is now U.S. Pat. No. 8,090,598, all of which are incorporated by reference.

BACKGROUND OF THE INVENTION

1. Technical Field

This disclosure relates to data acquisitions, and particularly to a system that acquires data related to evaluating risk.

2. Related Art

Methods that determine costs of insurance may gather data from personal interviews and legacy sources. The data may be used to classify applicants into actuarial classes that may be associated with insurance rates.

Some data used to classify risk is not verified and has little relevance to measuring risk. Systems may accumulate and analyze significant amounts of data and yet discover that the data does not accurately predict losses. The data may not be validated, may be outdated, and may not support new or dynamic risk assessments.

SUMMARY

A data logging device tracks the operation of a vehicle and/or operator behavior. The device includes a storage device (which may be removable or portable) having a first memory portion that may be read from and may be written to in a vehicle and a second memory portion that may be read from and may be written to in a vehicle. The second memory portion may retain data attributes associated with the data stored in the first memory portion. A processor reads data from an automotive bus that transfers data from vehicle sensors to other automotive components. The processor writes data to the first memory portion and the second memory portion that reflect a level of safety. A communication device links the data logging device to a network of computers. The communication device may be accessible through software that may be retained on a computer readable media. The software allows a user to access files related to a level of risk or safety and other software that may be related to those files.

Other systems, methods, features, and advantages will be, or will become, apparent to one with skill in the art upon examination of the following Figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the Figures are not necessarily to scale, emphasis instead being placed upon illustrating the principles of the invention. Moreover, in the Figures, like referenced numerals designate corresponding parts throughout the different views.

FIG. 12 is an exemplary Web page displaying trip information and relationships with other vehicles.

FIG. 13 is an exemplary Web page that includes speed information.

FIG. 14 is an exemplary Web page that includes trip information by date.

FIG. 15 is an exemplary Web page that includes trip log data.

FIG. 16 is another exemplary Web page that includes trip log data.

Figure 17:
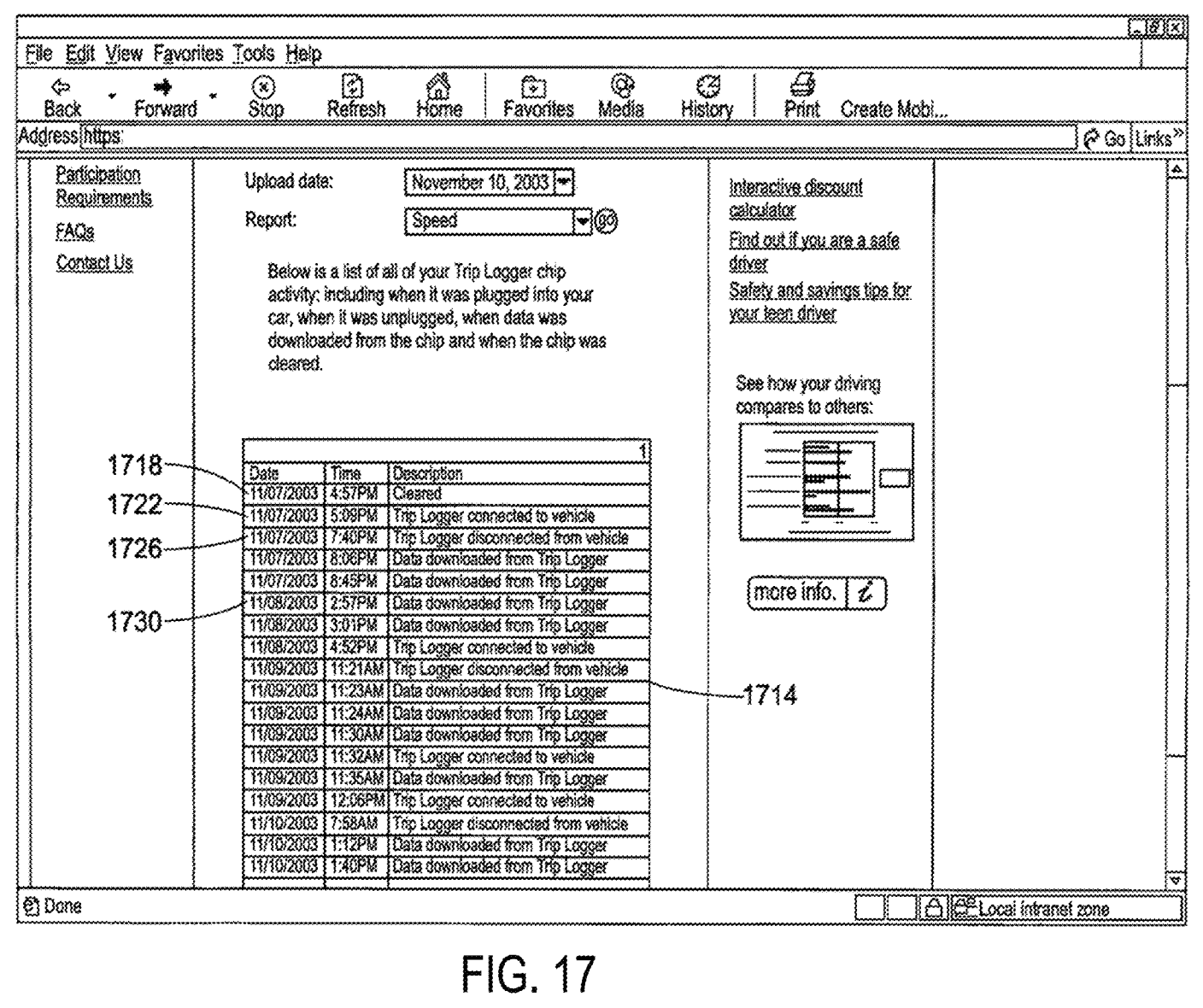

FIG. 17 is another exemplary Web page that includes data identifying an exemplary installation, disconnection, and data transfer events.

FIGS. 34A and B are multiple graphical user interfaces displaying selected trip details.

FIG. 35 is a sample data file generated by a vehicle monitoring device.

DETAILED DESCRIPTION OF THE PREFERRED EMBODIMENTS

Figure 1:
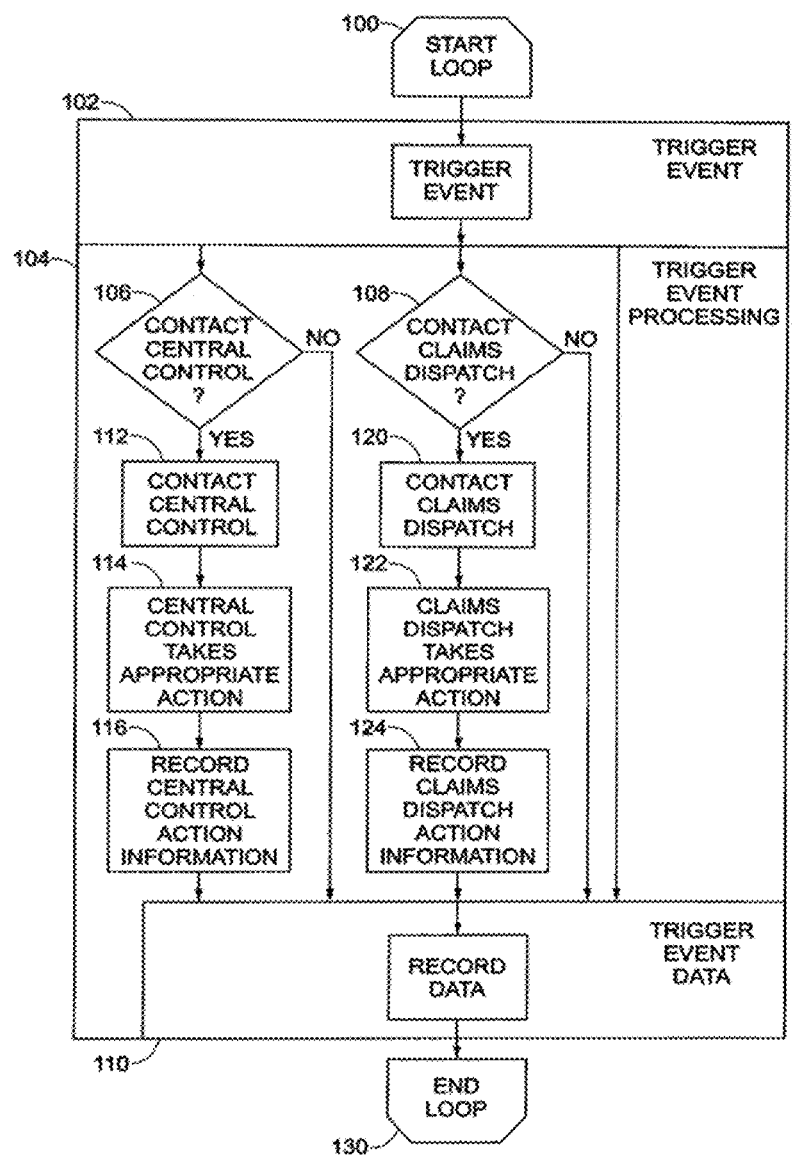
FIG. 1 describes a data capture method used in a claim process.

The following terms may be used in this detailed description.

Internet refers to interconnected (public and/or private) networks that may be linked together by protocols (such as TCP/IP and HTTP) to form a globally accessible distributed network. While the term Internet refers to what is currently known (e.g., a publicly accessible distributed network), it is also encompasses variations which may be made in the future, including new protocols or any changes or additions to existing protocols.

World Wide Web ("Web") refers to (i) a distributed collection of user-viewable or accessible documents (that may be referred to as Web documents or Web pages) or objects that may be accessible via a publicly accessible distributed network like the Internet, and/or (ii) the client and server software components which provide user access to documents and objects using communication protocols. A protocol that may be used to locate, deliver, or acquire Web documents or objects through HTTP (or other protocols), and the Web pages may be encoded using HTML, tags, and/or scripts. The terms "Web" and "World Wide Web" encompass other languages and transport protocols including or in addition to HTML and HTTP that may include security features, server-side, and/or client-side scripting.

Web Site refers to a system that serves content over a network using the protocols of the World Wide Web. A Web site may correspond to an Internet domain name, such as "progressive.com," and may serve content associated or provided by an organization. The term may encompass (i) the hardware/software server components that serve objects and/or content over a network, and/or (ii) the "backend" hardware/software components, including any standard, non-standard or specialized components, that may interact with the server components that provide services for Web site users.

The drawings illustrate exemplary embodiments and are not intended to limit the subject matter claimed. Some of the figures show systems and/or methods that monitor, record and/or communicate risk-based or insurance-related data. The data may be used to quantify risk, determine a level of risk, or determine a rating or a cost of insurance. The metrics can be used to monitor the operation and/or location of a machine, or measure the relative safety of its operation. The device may monitor a vehicle or other machine through an interface or may be a unitary part of the vehicle or machine. It may generate data that may determine the cost to protect against a risk of loss, such as damage or injury to the vehicle or machine itself, to the operator of or passengers in the vehicle or machine, or to other vehicles or property. The data may be processed to determine an insurance cost that may be based on statistical analysis, models, comparisons, or other evaluations.

For example, based on operational information or data, an insurer may make predictions about how and/or where a machine may be operated. The system or method may measure or monitor machine operation. Where the machine is a vehicle, a user may monitor and/or adjust his/her insurance costs by adjusting his/her driving behavior. The data may establish a safe driving record a lower risk of being subject to a claim. Such monitoring may generate insurance scores, safety scores, rating factors, and/or affect current, retrospective or prospective costs of insurance. Data that may be monitored and recorded include, for example, any one or more of the following:

1. Actual miles driven;
2. Types of roads driven on (high risk vs. low risk); and,
3. Safe or unsafe operation of the vehicle by the vehicle user through:
   A. speeds driven,
   B. safety equipment used, such as seat belt and turn signals,
   C. time of day driven
   D. rate of acceleration,
   E. rate of braking (deceleration),
   F. observation of traffic signs (signals);
   G. traffic conditions (high congestion vs. low congestion); and/or
   H. road conditions
   I. acceleration events;
   J. deceleration events; and/or
   K. force/lateral acceleration or characteristics that indicate a hard turning maneuver.
4. Driver identification
5. Temporal characteristics (e.g., period of time an ignition is active or internal power bus is sustained).

Figure 3:
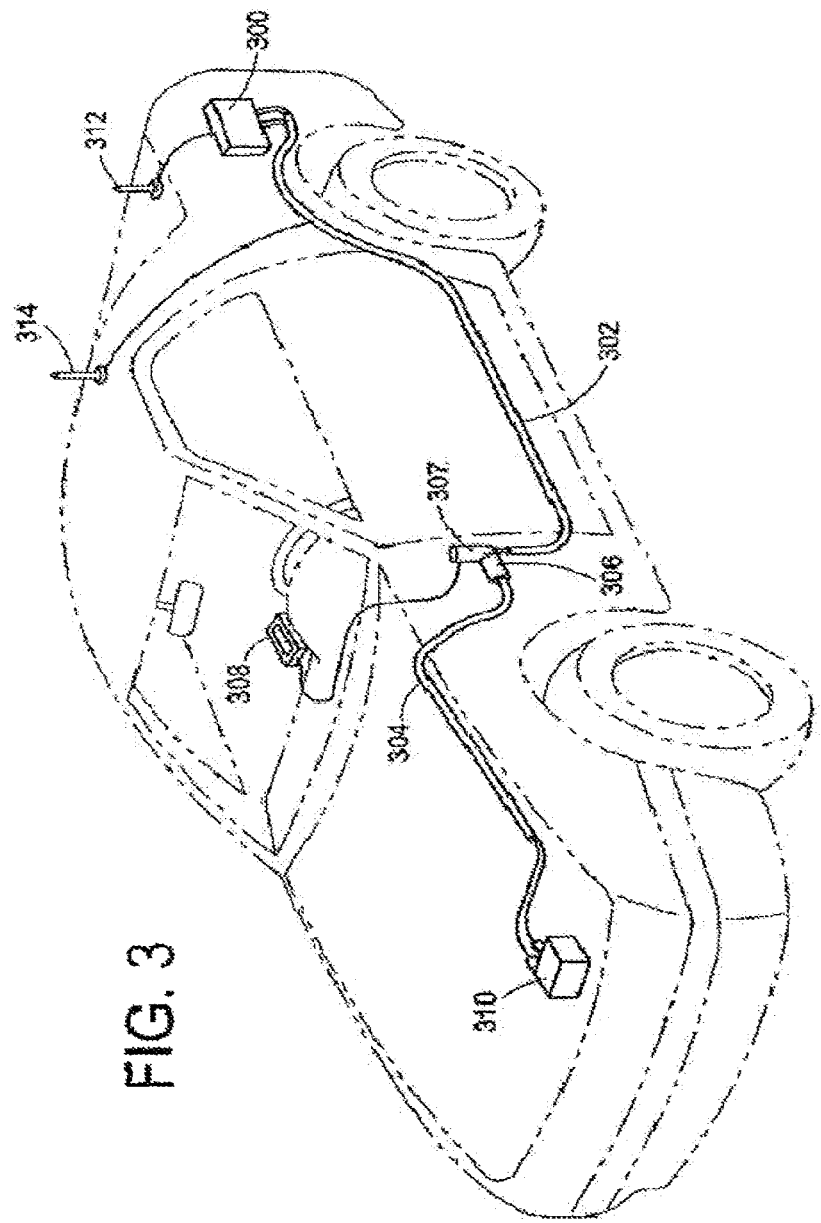
FIG. 3 is an exemplary vehicle with a monitoring device.

FIG. 3 shows an exemplary motor vehicle. An on-board portable mobile device 300 (the device 300) monitors and records output of diverse sensors and operator actions to assess a level of risk or determine a price or cost of insurance. One, two or more operating sensors (e.g., physically or wirelessly linked to a physical or virtual vehicle data bus) within the vehicle may monitor a variety of raw data elements. The data may be transmitted to in-vehicle OEM (Original Equipment Manufacturer) processors that manage powertrain, safety, entertainment, comfort, or ancillary functions. Such data elements may be communicated directly to the device 300 (e.g., from the sensors), or from the in-vehicle OEM or out-of-vehicle processor(s) through a physical or wireless connection that may interface an in-vehicle data bus 304. The in-vehicle data bus 304 may be connected to the on-board device 300 through a virtual or physical connector, such as, for example, a vehicle connector compliant with SAE-1962 or On Board Diagnostic connector (e.g., ODBI, ODBII, ODBIII, etc.) and the protocols they convey.

In some systems, in-vehicle or network communication occurs through a wireless protocol or network. Transceivers may provide short and/or long range radio, optical link, or operational links that may not require a physical communication path to receive or transmit data. The communication protocol or network may provide an interoperable communication link with other in-vehicle or external applications and/or devices. In some systems, a wireless network may provide connectivity when the wireless network or a wireless service provider indicates a channel capacity or excess channel capacity to transfer some or all of the desired data to a destination. A device push may load the desired data to a destination and may keep the connection open to allow the device 300 to continue sending the desired data or respond to external requests (e.g., queries). A device 300 may pull data to the device 300 too, in which a connection may or may not remain open.

In some systems, the transceivers may be compliant with a low-cost, low-power, wireless mesh network, such as Zigbee (e.g., 868 MHz in Europe, 915 MHz in countries such as USA and Australia, and 2.4 GHz in other jurisdictions), or a short range protocol, such as Bluetooth® The Bluetooth word mark and logos may be owned by Bluetooth SIG, Inc. Bluetooth may encompass the wireless specification defined by IEEE 802.15, 802.15.4 (TG4), 802.15.3 (TG3), or other standards. The standard may include multiple sub-layers including an RF layer that may be based on an antenna power range starting at about 0 dBm up to a range of about 20 dBm in the abut 2.4 GHz band and having a link range from about 10 centimeters to about 10 meters. It may include a baseband layer that establishes a physical link between devices forming a piconet (e.g., a network of devices that may be connected in an ad hoc fashion). It may include a link manager that sets up the link between Bluetooth devices. Other functions of the link manager may include security, negotiation of baseband packet sizes, power mode and duty cycle control of the communication portion of the device, and the connection states of a compliant device in a piconet. Also, it may include a logical link control and adaptation protocol (L2CAP) that provides the upper layer protocols with connectionless and connection-oriented services.

An optional driver input device 308 may be operatively connected to the device 300 through a virtual or physical connector (e.g., a cable 302 and 307). The device 300 may receive power through the vehicle battery 310, a remote generator, an alternator, fuel cell, an internal source (e.g., battery or elements that temporarily store charge) or other sources, such as a solar based system (not shown). In some systems, a power source may be part of the device 300 even when a primary power is drawn from the machine (vehicle). For instance, an internal battery may source power to a timing device, such as internal clock, device memory and/or allow the device to record connection and disconnection events. In other systems, the device may draw power from the vehicle or a network it interfaces.

A second receiver or transceiver in the device 300 may track location through navigation signals that may comprise a GPS (global positioning system) protocol, a differential GPS protocol, a trilateralerlism of external encoded signals (e.g., may be in the radio frequency range), protocols that monitor continuously transmitted coded signals, or other locating protocols or systems 312 (referred to as the location protocols). In FIG. 3, a cellular or wireless protocol, a wireless or cellular telephone, a radio, a satellite, or other wireless communication system may link the device to a privately accessible or publicly accessible distributed network or directly to an intermediate surrogate or central control station. The communication link may comprise Mobile-FI or a low-cost, always-on, mobile broadband wireless network that may have IP (Internet Protocol) roaming & handoff (at more than about 1 Mbit/s), MAC and PHY with IP and adaptive antennas, full mobility or substantial mobility up to vehicle speeds of about 88.7-162 km/h or higher (e.g., 250 km/h), operate in frequency bands (below 3.5 GHz), and/or utilize a packet architecture and have a low latency. In some applications, the device 300 may be Ultra-wideband compliant and may transmit information by generating radio energy at specific time instants and occupying large bandwidth, thus enabling a pulse-position or time-modulation communications. This protocol may be different from other wireless protocols that transmit information by varying the power level, frequency, and/or phase of a sinusoidal wave. In other applications, the system may be complaint with WiMax or IEEE 802.16a or may have a frequency band within a range of about 2 to about 11 GHz, a range of about 31 miles, and a data transfer rate of about 70 Mbps. In other applications, the device 300 may be compliant with a Wi-Fi protocols or multiple protocols or subsets (e.g., ZigBee, High Speed Packet Access (e.g., High Speed Downlink Packet Access and/or High Speed Uplink Packet Access), Bluetooth, Mobile-Fi, Ultrawideband, Wi-Fi, WiMax, mobile WiMax, cellular, satellite, etc., referred to as the transceiver protocols) that may be automatically detected and selected (through a handshaking, for example, that may automatically determine the source type of the transmission e.g., by a query for example, and may attempt to match it) and may enable this automatic access through one or more communication nodes. In some systems, automatic selection and/or detection may occur through an exchange of signals that acknowledge a communication or a transfer of information or data may occur at a desired or predetermined channel capacity. In some alternative systems, a device 300 may not directly communicate or connect to a central base station. Like a mesh network, the devices 300 may transmit information between themselves (like an electronic bucket brigade) which may be relayed to a destination. Built-in logic may allow some devices 300 to relay information from one device 300 to another when wireless networks are unavailable, device 300 failures occur, bandwidth restrictions occur, or other conditions warrant. In some applications, a receive-and-relay feature in some devices 300 may allow devices 300 to conserve power by not transmitting data or messages continuously and directly to base stations. Some devices 300 may communicate data across relatively short distances (e.g., a few yards or 100 yards between mobile or stationary devices 300, for example) instead of the larger distances a communication to a stationary wireless base station may require.

Figure 4:
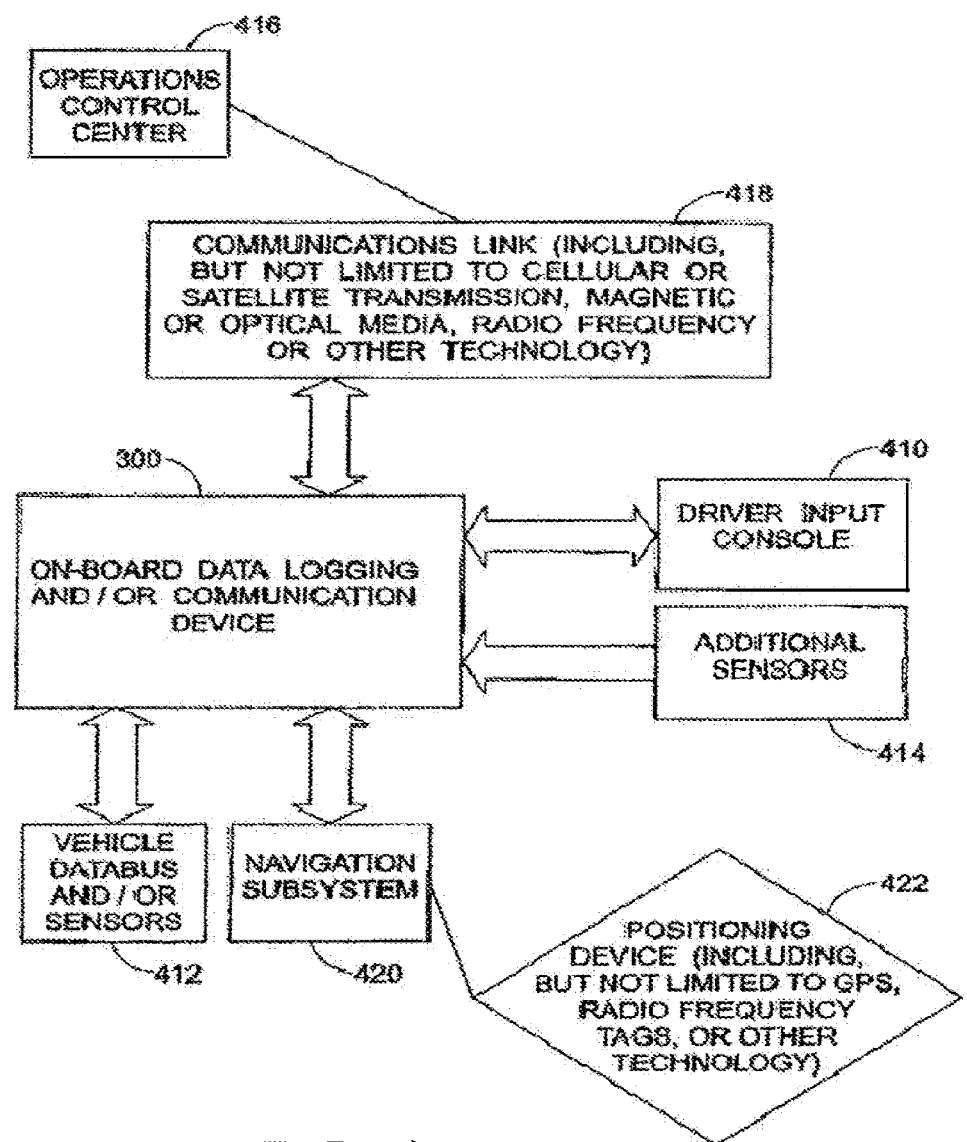
FIG. 4 is an exemplary vehicle architecture that includes a vehicle processor or onboard computer interfaced to a monitoring device that communicates selective data to a remote destination.
Figure 18:
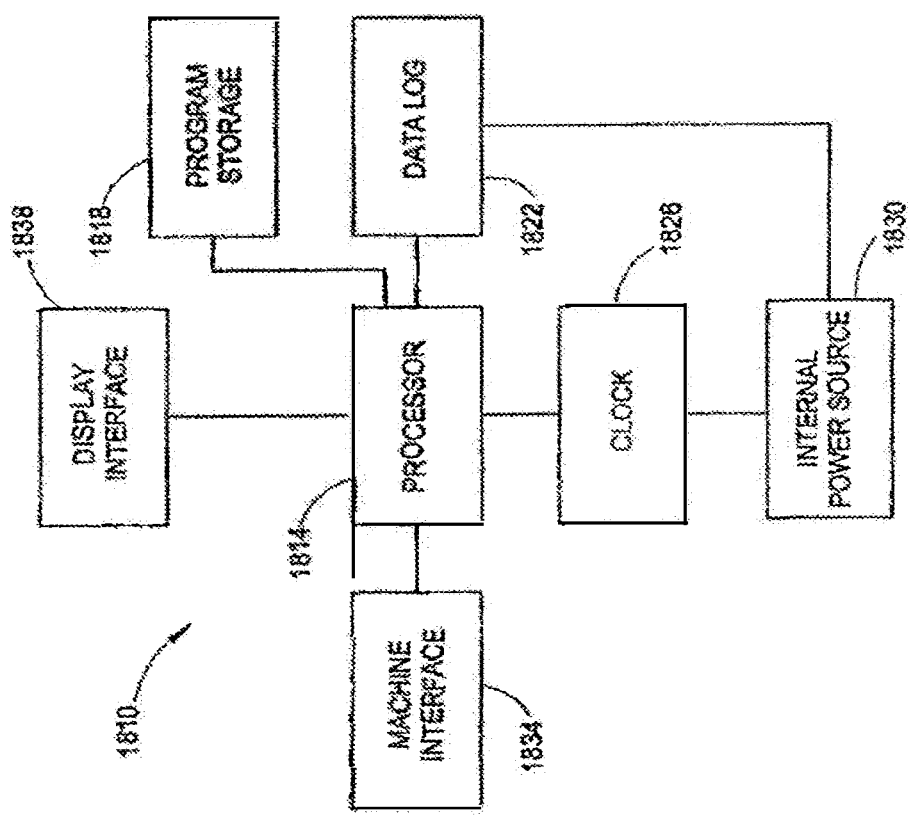
FIG. 18 is a block diagram of an exemplary device that monitors vehicle data.
Figure 23:
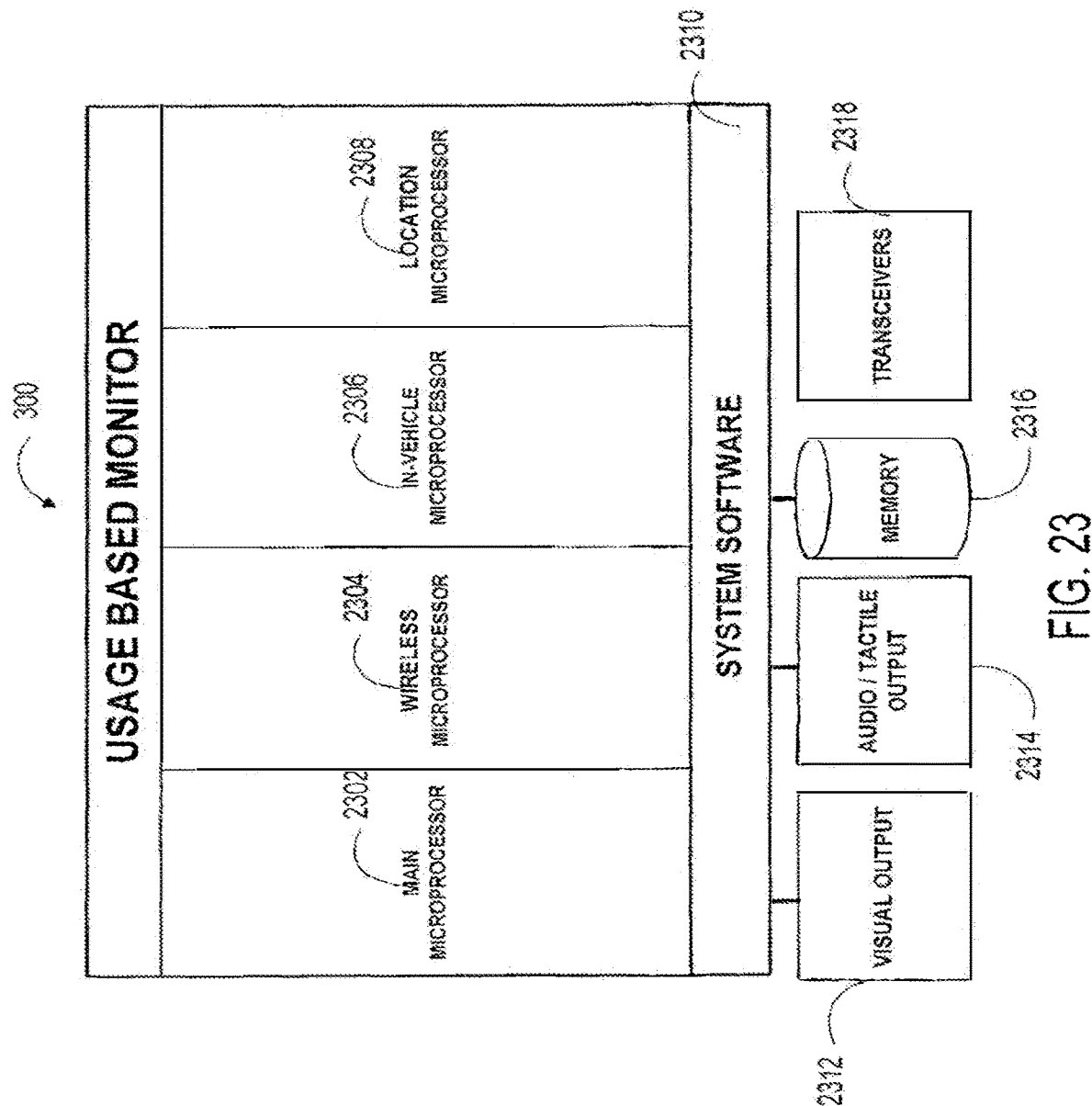
FIG. 23 is a block diagram of an in-vehicle device that may communicate with an in-vehicle local processor or controller.

FIG. 4 is a block diagram of an exemplary in-vehicle computer system. The on-board portable mobile device 300 may include an on-board data storage device (or storage devices), an input/output interface that may communicate with one or more external devices, one or more central processing units, a local memory that may be separated into multiple partitions or portions, and/or a real-time operating kernel. In alternative in-vehicle systems, the portable mobile device 300 comprises one or more controllers or microprocessors that may be interfaced through expansion connectors. The device 300 may support two or more (e.g., multiple) modulation schemes and may include two or more input/outputs to different wireless networks or protocols. The inclusion of multiple protocols and/or inputs/outputs may allow the device 300 to support higher throughputs as wireless networks and connections become available or accessible. The exemplary in-vehicle systems are shown in FIGS. 4, 18 and 23 may be non-portable or a unitary part of a vehicle too. Each of the systems may include memory accessible only to a remote site or an insurer. The memory may be inaccessible to other in-vehicle OEM or aftermarket systems to ensure data integrity. Hardware, data encryption, or software may maintain data security. Data accuracy and/or conformity may be important to users or applications that insure risk or monitor safety.

The device 300 may communicate with one or more machine or vehicle components to acquire information from the vehicle that describe or represent vehicle operation or characteristics, or driving behavior. An optional driver input interface or console 410 may allow the driver to input data to satisfy or respond to one or more threshold factors or requests. For instance, the interface or console 410 may allow the machine operator to enter an identifier (e.g., identification number) so that recorded characteristics may be associated with a particular machine operator. Alternatively, the console may include or interface a biometric sensor, such as a fingerprint or retinal scanner to identify an operator, for example. A driver authentication system may validate a driver when multiple drivers (e.g., same family members, multiple users, etc.) operate a vehicle. Each may have different ratings (e.g., driver rating, safety score, insurance rating/score, etc.) that may be used in insurance or risk computations.

Vehicle operation may be monitored through one or more sensors 412 (e.g., powertrain sensors, safety sensors, entertainment and comfort sensors, ancillary sensors, etc.). Additional sensors 414 may communicate wirelessly or across a physical or virtual data bus directly to the device 300.

A vehicle may be linked to a network or remote control center 416 through one or more communication links 418. In some systems the communication link comprises a wireless link (e.g., cellular link, a satellite link, a radio frequency link, etc.), a magnetic or optical link, or other tangibly free links. A navigation sub-system 420 may receive navigation signals from a positioning device 422 that may include, but is not limited to, a GPS, radio frequency tags, or other locating technology. The navigation sub-system 420 may communicate directly with the device 300 or through surrogates.

Some of the elements monitored and/or recorded by the device 300 include raw data elements, calculated data elements, derived data elements, and subsets of these elements (hereinafter data elements).

Raw Data Elements:

Information from powertrain or related sensors may include:
RPM,
transmission setting (Park, Drive, Gear, Neutral, etc.),
throttle position,
engine coolant temperature,
intake air temperature,
barometric pressure,
vehicle speed,
manifold absolute pressure,
oxygen sensor,
coolant sensor.
Information from electrical sensors may include:
entertainment status (e.g., visual or audio systems integrated or interfaced to vehicle)
brake light on,
turn signal indicator,
headlamps on,
hazard lights on,
back-up lights on,
parking lights on,
wipers on,
doors locked,
key in ignition,
key in door lock,
horn applied,
battery voltage,
Information from body sensors,
airbag deployment,
ABS application,
level of fuel in tank,
brakes applied,
accelerator applied,
radio station tuned in,
seat belt on or off,
door open,
tail gate open,
odometer reading,
cruise control engaged,
anti-theft disable,
occupant in seat,
occupant weight,
accelerator/brake pedal depression (e.g., measured in degrees or force applied)
accessories (e.g., mirror settings, dash light status, etc.)
Information from other elements may include:
vehicle speed,
vehicle location (e.g., navigation related information),
date,
time,
vehicle direction,
IVHS data sources (e.g., wide-area Intelligent Vehicle Highway Systems),
pitch and/or roll,
relative distance to other objects (e.g., may be monitored to assure compliance with an assured clear distance rule that may require drivers to be able to stop their vehicles within a distance they may clearly see).
Calculated Information may include:
deceleration,
acceleration,
vehicle in skid,
wheels in spin,
closing speed on vehicle in front,
closing speed of vehicle in rear,
closing speed of vehicle to side (right or left),
space to side of vehicle occupied,
space to rear of vehicle occupied,
space to front of vehicle occupied,
lateral acceleration,
rotation of vehicle (e.g., sudden),
loss of tire pressure (e.g., sudden);
driver identification (e.g., through voice recognition, code, fingerprint, retinal, or
other recognition);
distance traveled; and
environmental conditions (e.g., potential hazards, rain, ice, etc.).
Derived Data Elements may include:
vehicle speed in excess of speed limit;
observation of traffic signals and signs;
relative braking or acceleration or deceleration events;
road conditions;
traffic conditions; and
vehicle position.

Other elements may be monitored and retained in local memory with optional metadata. The time a file is created or written to such as a timestamp or size of a file may comprise metadata.

FIG. 1 is a flowchart of a data capture process. The data may be processed for insurance, risk management or assessment and/or claims processing purposes. The process may be implemented through a real-time operating kernel within the device 300. In some systems and processes, users employ a unique logic (e.g., a circuit and/or software) associated with that user's machine or unit of risk. When the system is started 100, a data capture may be initiated by a trigger event 102 which may include, but is not limited to:

Ignition On/Off (e.g., may measure length of time an ignition switch is activated)
Airbag Deployment
Acceleration Threshold
Velocity Threshold
Elapsed Time
Battery Voltage Level
System Health
Date
Time
User Activation/Panic Button
Traction
Location/Geofencing
Driver Identification
Remote Activation
Vehicle Motion
Revolutions per Minute
Transmission or Clutch Engagement or Disengagement
Power Bus Activation (may measure the length of time power is sourced to a bus or a conductor)

Trigger event processing 104 may comprise multiple elements that may include: a flow process for contacting a central control 106, contacting a claims dispatch, and/or recording trigger event data 110. Trigger event processing may include, but is not limited to:

Contact External Entities
EMT (Emergency Medical Transport), Claims Dispatch, Other External Entity Takes Appropriate Action
Record Sensor Information
Transmission of Data
Message transmissions
Recalibration
Load Software If trigger event processing comprises a contact to a central control 112, the inquiry may be transmitted and confirmed by a message exchange. At 114, the central control 112 may take appropriate action and a record may be made by the central control at 116. In some instances, a central control 112 or the device 300 may transmit an alert directly or indirectly to third parties. An alert may occur when another party or user is monitoring another's driving behavior or vehicle performance. For example, a text message (e.g., a Short Message Service), a telephone call, or other messages may be transmitted to a party or a destination when an incident occurs (e.g., a parameter is exceeded or violated). An incident may occur when a commercial, teen, or inexperienced driver exceeds a programmed speed threshold or exceeds a designated speed limit (e.g., tracked by GPS, local mappings, and a vehicle speed output), exceeds a mileage limit, or is not wearing a seatbelt, for example. In some devices 300, an incident may allow the party or destination to communicate with a driver or passenger by phone, voice, text, or other messaging service through a wireless processor (e.g., see FIG. 23).

In some circumstances, the central control 112 or the device 300 may service a vehicle (e.g., through an in-vehicle or external speech recognition system, a telephone call to the device 300, etc.). Upon an authentication, the central control 200 and the device 300, or the device 300 itself may lock or unlock vehicle doors or execute some other action. In some systems, one or more in-vehicle recognition systems may authenticate a user (e.g., an in-vehicle speech recognition system may authenticate a user's voice, one or more in-vehicle biometric scanners may identify a user's retina, touch, or other biological feature(s), or other in-vehicle devices may identify other user characteristics) when a user is remote from or in proximity to a vehicle. Once authenticated, the device 300 may service a user request or service a vehicle without receiving directions, and in some cases, communications from a remote destination, such as a remote control center.

Entertainment and/or comfort settings may also be adjusted in some alternative systems to a user's preference with or without directions or commands from a remote destination. In other circumstances, powertrain and service reminders may also be transmitted to a designated party through an aural and/or visual alert.

When processing a claims dispatch in FIG. 1 at 108, the system may contact the claims dispatch service department of the insurer at 120. The claims dispatch takes appropriate action at 122 and a recording 124 of the claims dispatch action information may be logged to a file before the process concludes at 130.

The recording of trigger event data may include, but is not limited to:

The Trigger Event
Location information, such as latitude and longitude
Time, such as, Greenwich Mean Time
Velocity
Acceleration
Direction
Deceleration
Vehicle Orientation
Seatbelt Status
Turn Status (e.g., a hard turn or lateral force detection)

The recording may include one or more raw data elements, calculated data elements, and/or derived data elements. Each element may describe an operating state of the vehicle or an action of an operator or passenger. One or more selected data elements may be stored in a local memory of the device 300 before the data elements are transferred to a remote memory. Element selection may occur before the device 300 interfaces the vehicle or when a data element has a relationship to a safety standard, operational metric, or measure of risk. For example, vehicle speed may be related to safety. Therefore, speed may be recorded synchronously (e.g., on a regular basis or may occur at fixed programmable time intervals, such as every 10 seconds). Alternatively, where memory or storage space is a factor, speed may be recorded asynchronously or less often when the speed is below a predetermined or programmable threshold. In alternative systems, data may be recorded at synchronous intervals and during or after asynchronous events. The recording may include or may be associated with date, time, and/or location information. Other examples of data that may be recorded include rates of acceleration, deceleration, and/or hard braking events. Some of these data elements or events may be remotely or locally derived. For example, acceleration or distance may be derived from speed measurements made at a fixed interval (e.g., every second) or derived from measured data retained locally within the device or remotely at a remote server. In some devices, acceleration or deceleration data elements may be monitored directly or indirectly from one or more vehicle accelerometers or devices that may measure acceleration and/or deceleration.

In a synchronous mode, the recording process may be implemented by monitoring and storing the data in a local buffer after/at pre-selected selected time periods (e.g., that may comprise a cycle time of a processor or controller of the device 300 or a longer period, such as about every thirty seconds of vehicle use, for example). In an exemplary operation, the output of the monitored sensors (e.g., the data elements) may be written to a file (e.g., at a fixed programmable interval such as every two minutes, in this example)

which is stored in a portion of the local memory of the vehicle data storage within or accessible to the device 300. The raw, calculated, and/or derived data elements may comprise some of the data elements that may be stored locally or remotely. Desired data elements or those determined or deemed to be relevant to an insurer or an assessment of risk may be stored in this exemplary device 300.

Some "trigger events" may occur when a condition is detected by one, two, or more sensors. The sensor data may indicate the need for an action. In an insurance application, it may result in an assessment of a premium, or a surcharge or discount to a premium, during an insurance billing process. In some systems, a trigger event may cause an immediate or almost immediate transfer or exchange of data, such as a data upload 106 to a network, surrogate, or a central control. For example, a rapid deceleration and an airbag deployment may be a trigger indicating a collision event, in which the system may notify the central control of the vehicle location and status at a rate the data may be received (e.g., real-time). Alternatively, if an operator were to cause an emergency light to activate or an alert to issue, the system may notify the central control of the emergency, and in some systems, vehicle location.

Some systems may classify or divide trigger events into two or more classes or grouping. Two groupings may include those requiring immediate action and those not requiring immediate action, but useful for determining a cost of insurance, measuring risk, or monitoring performance. Those useful for determining a cost of insurance or measuring risk may be stored in a file with other recorded vehicle sensor information in a logically distinct portion of a memory. Those trigger events requiring action may be stored in a second logically distinct portion of a memory before being transferred to a network or central control center which may take further action. Some trigger events may indicate the need to send emergency services, such as police or EMS, and may be stored in another logically distinct portion of a memory and others may indicate the need to dispatch of a claims representative or agent that may be associated with an insurance company that are stored in another logically distinct portion of memory.

The following comprises an exemplary list of some, but not all, trigger events.

Need for Assistance:

These are some of the exemplary events that may require immediate notification of a surrogate or central control center.
1. Accident Occurrence. An accident could be determined by monitoring an output of a single sensor, such as the deployment of an airbag or a sustained lateral acceleration. It could also be determined by monitoring a combination of outputs from two or more sensors that may indicate, for example, a sudden deceleration of the vehicle without the application of the brakes.
2. Roadside assistance needed. This could be determined through the pressing of a "panic button" in the vehicle or through the reading of a sensor output, such as the level of fuel in the tank. Another example may be a rapid loss of tire pressure, signifying a flat tire.
3. Lock-out assistance needed. The reading of two or more sensor outputs may indicate that the doors are locked, but the keys are in the ignition or in the vehicle and the driver has exited the vehicle.
4. Driving restrictions. The insured or another user may identify circumstances or restricted areas in which he/she requests notification of driving (outside of a designated area or) within restricted areas, and warned when he/she or another is entering a dangerous or restricted area (or leaving a designated area). This may apply to youthful drivers, where the parent wants to restrict time or place of driving, driving behaviors in predetermined areas and have a record thereof.

Unsafe Operation of the Vehicle:

These exemplary events may be recorded and stored in the in-vehicle portable recording device 300 for future upload. Individual or repeated trigger events may result in notification of the driver of the exceptions.
1. Excessive speed. A reading of the output of the vehicle speed sensors might indicate the vehicle is exceeding the speed limit. Time may also be measured to determine if the behavior is prolonged.
2. Presence of alcohol or controlled substances. Using an air content analyzer, breath analyzer or other identifying device outputs or combinations that may identify driver impairment (e.g., touch or a pattern matching behavior), the level of alcohol or other substance and/or their use may be determined.
3. Non-use of seatbelt. Frequent or infrequent use may result in a discount (to a premium for high use) or surcharge (to a premium for low or no use).
4. Non-use of turn signals. Low use could result in surcharge. Frequent use may result in a discount.
5. ABS application without an accident. High use could indicate unsafe driving and may be subject to a surcharge. Low use may result in a discount.

Figure 2:
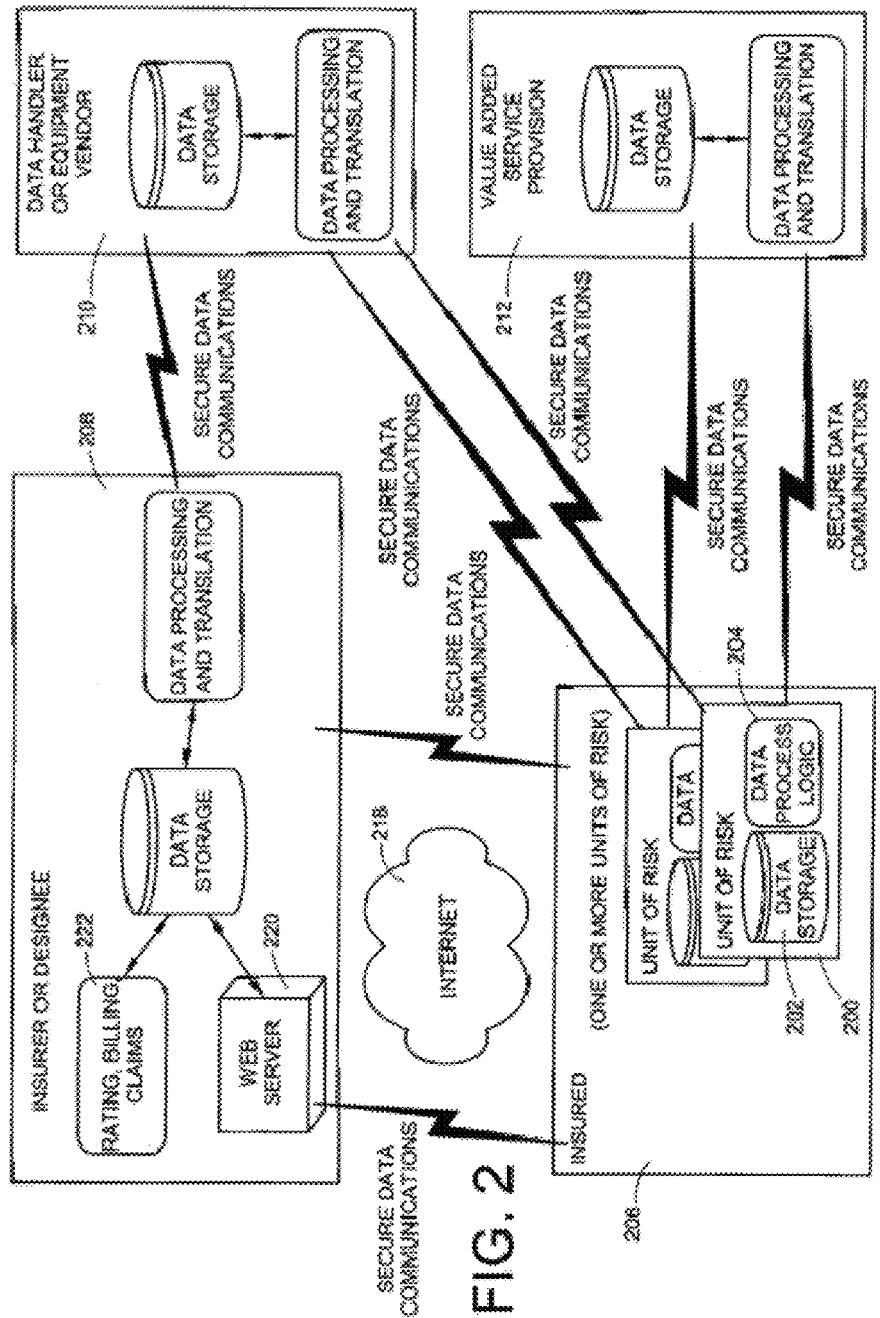
FIG. 2 is a block diagram of a network that includes a response center and a data handling center.

FIG. 2 is a block diagram/flowchart of a network design for gathering information for insurance billing at synchronous or asynchronous intervals. A machine or unit of risk 200 (or device 300) may interface and monitor an industrial machine, farm machine, an airplane, boat, RV, a motorcycle, or other vehicle (e.g., a device or structure that transports person or things). The device may include a local data storage 202 and data process logic 204. The insured or potential customer 206 associated with or responsible for each unit of risk may communicate with an insuring entity 208 or a designee. A "designee" may be an intermediary acting for an entity or an insurer, such as a dedicated data collection agent, data handler or equipment vendor 210 and/or a value added service provider 212. The data handler may be a third party entity verifying that the operating equipment of the system is in proper working order and may be a subcontractor. A value added service provider may be a third party entity, such as a directional assistance service, a security firm, a vehicle monitoring company, telephone service provider, or another entity whose communications with the units of risk may be important or relevant to assess risk or may be used in insurance computation algorithms.

In some systems, the insured or potential customer 206 may communicate directly with the insurer 208 through a wireless or a physical communication link 418 (FIG. 4) that may include a publicly accessible distributed network, such as the Internet 218. Such access may allow users to view documents, access files, and access software related to those files while on the move or at fixed location. Access to a Web server 220 and the insurer's Web site may allow an insured or potential customer 206 to observe, and in some instances verify, recorded data, derived data, calculated data, claim processing, insurance costs and risk scores and the occurrence and state of trigger events, and billing 222. Access may further allow an insured or potential insured to acquire insurance cost estimates through a relational database or other storage systems and view content that may reduce current, future or prospective premiums. The content may describe how to reduce or control insurance costs by modifying machine or vehicle operating behavior.

Figure 5:
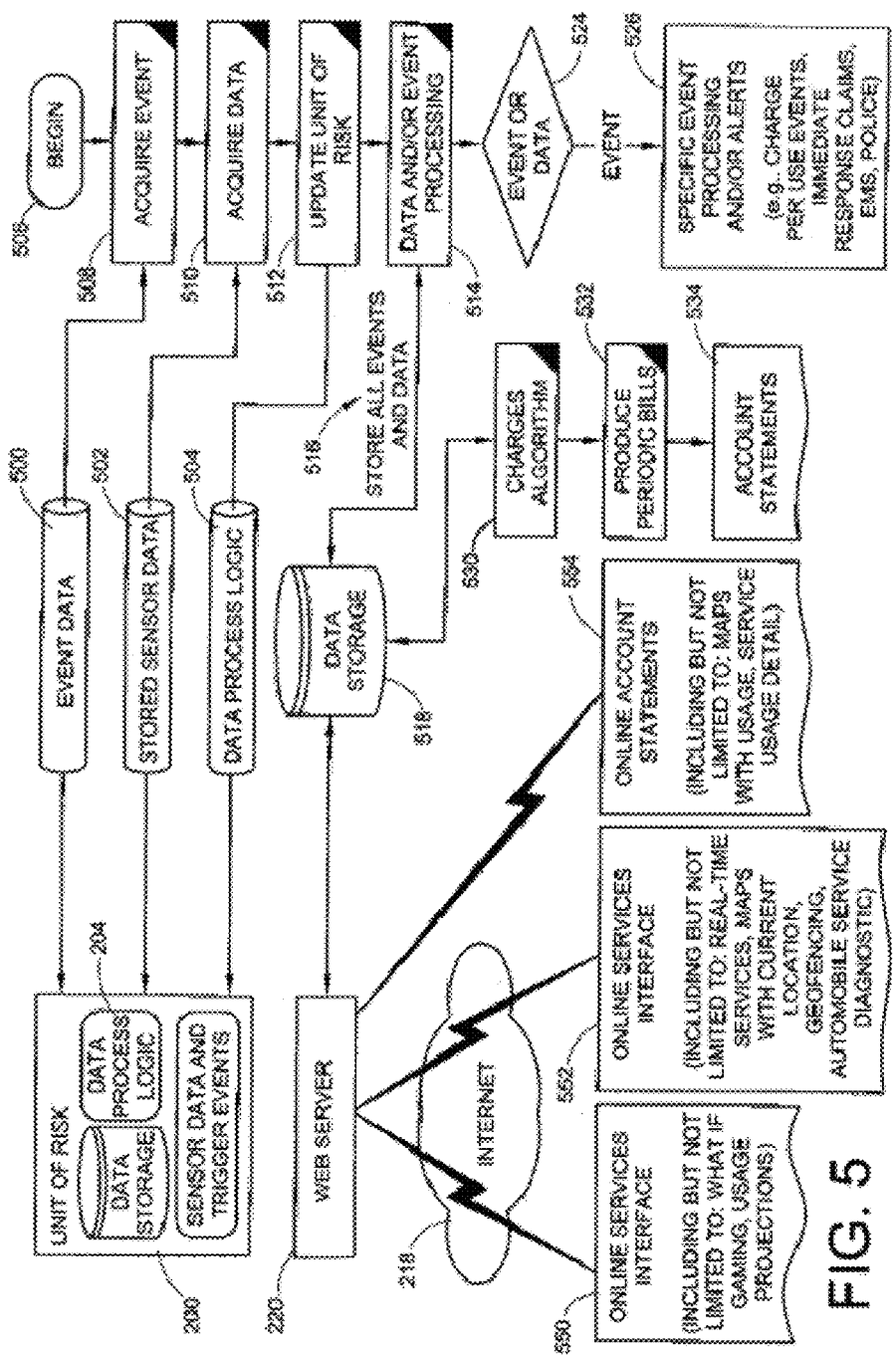
FIG. 5 is a data flow process illustrating communication through an Internet access.
Figure 6:
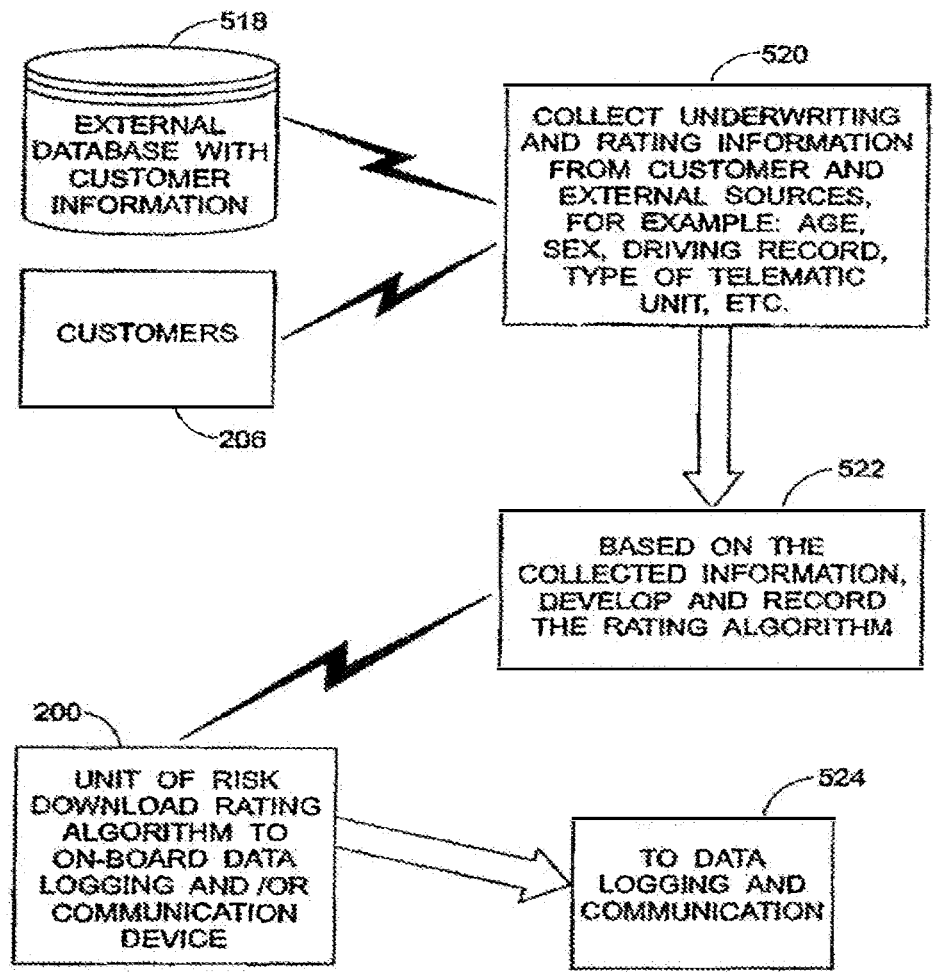
FIG. 6 is an exemplary underwriting and rating method.

FIG. 5 provides a more detailed exemplary description of a distributed system's use of data acquired from a unit of risk 200. Some units of risk 200 (device 300) may synchronously or asynchronously transfer one, two, three, or more classes of data to an insurer. The event data 500 and stored sensor data 502 may capture data from the unit of risk 200. Data process logic 504 may be transferred to the unit of risk 200 from the insurer. The data process logic 504 may be adapted or programmed to acquire data that may be relevant to assess a unit's insurance cost or level of risk. For example, if an insurer or entity has a need for information about brake pedal use or application, data process logic 504 may be programmed or configured to store data related to that use or application. For alternative assessments, such data may be unnecessary and so the unit of risk 200 may not interface with data process logic 504, or it may acquire other data. The data process logic 504 may be programmed, configured or customized and may be updated as the insured, the insurer, or the potential customer desires. The data process logic 504 may be programmed, configured or customized while interfaced to a vehicle (may be field-programmable). In some applications, the data process logic may 504 be programmed to acquire data related to breathalyzer or other analysis.

In FIG. 5, the flowchart starting at 506 describes an exemplary communication between an insurer and the unit of risk 200. The insurer may acquire event data at 508, acquire sensor data at 510, update data process logic at 512, and process data elements at 514. The result may generate data elements, such as a safety rating, insurance rating/score, or a driver score at a remote site. In alternative embodiments, the device 300 processes data elements in the vehicle and stores the raw, calculated and/or derived elements (including the ratings and/or scores) in an in-vehicle memory. The data may be uploaded to a network and a remote computer that may display or render the data locally or may be transmitted to another remote location with or without raw data elements. In some systems, data is stored 516 in a media or nonvolatile memory, such as a data storage device 518. If the stored item is an event 524, an insurer may transmit an event response. For example, when an airbag deploys data may be delivered to the insurer as the data is received (e.g., in real-time) or after a minimal delay. The insurer may communicate or attempt to communicate with the vehicle when the data is received. If the communication fails, the insurer may contact emergency medical or police services.

In some systems, if specific events processing and/or alerts 526 occur, the system may charge a user on a per-use, a subscription, or an event-basis. In some applications charges may reflect an immediate response claim, EMS charges, and/or dispatch charges. The data or events may be stored in a remote server 220 or in a remote storage device 518 that may be accessed by a billing or estimating algorithm 530 programmed and executed in a controller. The data may be used to generate a cost of insurance for the unit of risk 200 with some or all other relevant data. The cost may reflect one or more occurrences that are recorded and stored in the storage device 518.

In some applications, the cost of insurance may be based, in part on, the operating characteristics of the vehicle and/or operator behavior within a time period. A usage-based insurance cost may be based on the real-time data that is generated contemporaneous with or near a billing event. In some applications, the system may generate an invoice based on a driver's own data instead of an estimate based on interviews and historical trends. Alternatively, customized discounts or surcharges (to premiums) may be determined for a next billing period (e.g., a prospective period) based on operational aspects or behaviors captured by the recorded information. The data may be processed during a current or previous billing period. When a cost is computed, a bill or estimate may be generated and mailed, transmitted, or otherwise communicated as an account statement 534 or as an offer of insurance.

FIGS. 10-17 illustrate documents and screens that a server may retrieve or generate and transmit in response to requests received at a proxy or origin Web server 220. The Web server 220 may allow a user to request and access content through a publicly accessible distributed network like the Internet 218. Through remote software that allows users to view documents and files and software related to those documents, a user may view sensor data, event data, ratings, and/or analysis.

Different types of on-line services' interfaces may be accessed through the Web server 220. The figures illustrate exemplary documents and screens that may be rendered through different interfaces. The interfaces include a prospective on-line services interface 550 and an interface for reporting acquired data and relationships 552. The data reports rendered through the acquired service interface 552 may comprise all or selected stored events, sensor data, metadata, and/or relationship data (that may describe relationships between selected data or events to other data and events). The acquired service interface 552 may provide enhanced processing maps showing travel routes (e.g., during a desired or a billing period) and other maps, such as maps that identify current locations of the unit of risk. A site's ability to report a geofence may allow a user to identify when a unit of risk or device 300 travels outside of an imaginary boundary. When a unit travels outside the boundary (e.g., set by a user, the insurer, or another) the site may identify the unit's location and travels. In some systems, the location coordinates (e.g., GPS-coordinates) may be transmitted by a short-message-service and a wireless (e.g., the transceiver protocols described above) network. Some sites determine whether automobile maintenance service is appropriate through a diagnostic analysis of the sensor and event data.

A prospective interface may relate to "what if" evaluations, in which a customer may change or enter certain values that may reflect the actual or hypothetical operation of the unit of risk or a driver's actions. The system may render or reveal the effects of those changes or values (e.g., in a risk assessment or an estimated cost or a proposal of coverages). The "what-if" evaluations may be based on historical data, customer profiles, logical relationships (e.g., relationships between relative levels of risk and monitored vehicle data), matrices, or other analysis (or any combination thereof) that may quantify risk in a use of the device 300. Through an interface, a user may determine, in advance, what behavior may reduce risk or cost, or what coverages may be available for such a profile (e.g., an insurance estimate). Enhanced account statements 554 may also be rendered and transmitted to remote interfaces on-line. The account statements 554 may include maps of usage, detailed explanations, and accountings of costs.

Monitoring the unit of risk 200 or using the device 300 may generate improved rating determinations or driver scores due to an improved acquisition and retention of user data. In some applications, a database 518 retains data from many customers and/or potential customers 206 and/or other drivers/operators. In time, an insurer may use the accumulated underwriting, rating, or driver score information from individual customers 520 to establish relationships between users or user profiles and levels of risk. Direct data acquisition may improve rating algorithms 522, 530. The algorithms and relationship may be retained in databases 518 remote from or within the unit of risk 200 or device 300.

Figure 7:
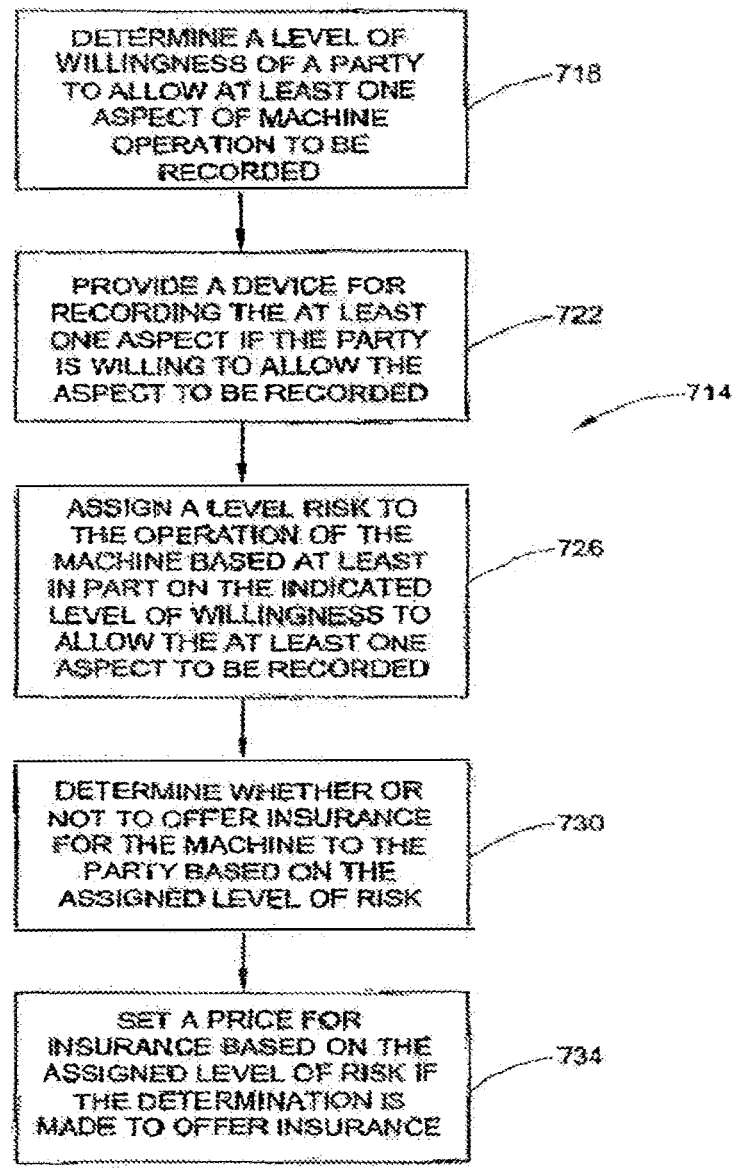
FIG. 7 is an exemplary underwriting and rating method.

Data acquired by the unit of risk 200 or device 300 may be used for insurance and non-insurance purposes, such as advertising and marketing; site selection; transportation services; land use planning; road design, surface or composition analysis, traffic planning or design; or monitoring road conditions. For example, a method 714 for underwriting insurance related to the operation of a machine is shown in FIG. 7. The method includes determining a willingness of the party to allow one or more aspect of machine operation to be recorded at 718 and providing a device for recording one or more aspect at 722. At 726, a site or insurer may assign or assess a level of risk to the operation of the machine based in part on the indicated level of willingness of the party to allow aspects to be recorded. At 730, the insurer or site may determine whether or not to offer insurance based on the level of risk. At 734, a site or insurer may set a price for insurance coverage based on an assessed level of risk.

Since the price or cost (of insurance) may be determined (at 734) based on an assessed risk (at 726) and the level of risk may be based on willingness of a party or operator to allow an aspect to be recorded, the process may reward users based on their driving abilities and the driver's acceptance of a usage-based (insurance) program. Aspects of the method of underwriting and pricing insurance shown in FIG. 7, such as the presentation of cost and other information that may influence machine operator behavior and affect insurance costs. The safety and savings may be marketed to sell insurance.

A measure of a parties' willingness to allow an aspect of a machine to be recorded at 718 may be made in many ways. For example, if an unsolicited request for the device (e.g. 300) for recording is received, it may indicate a relatively high level of willingness or enthusiasm to have one or more aspects of machine operation to be monitored and/or recorded. In time, data may show that machine operators or owners who are not customers of an insurer, but who request the device for recording, are more enthusiastic or have a greater willingness to have one or more aspects of their machine operation monitored. Their willingness may be greater than current customers of that insurer who request the device. In other circumstances, it may be determined that current customers that have access to contact information and may request the device with less effort are less enthusiastic than a non-customer. A request for the device after receiving an offer may indicate a similar willingness or may indicate a somewhat diminished level of willingness. Responding to an offer may require less effort than someone who has not received an offer but requests the device.

In some circumstances, a level of willingness to have an aspect of machine operation monitored may be related to a user's driving behavior. For instance, some may assume that users that believe they are careful drivers will be more willing to have one or more aspects of their driving, such as, for example, the speed at which they drive, monitored. In contrast, others that may be more reckless may be less willing to have one or more aspects of their driving monitored. In some circumstances, these assumptions may not be true. Over time, an insurer may acquire and compile data in a database (e.g., 518) that includes information correlating to or establishing relationships between the willingness (or unwillingness) to have an aspect of machine operation monitored and a level of risk for one or more classes or categories. The data may be correlated with other user's data that describes actual vehicle use.

In some situations, parties that use the device 300 or unit of risk 200 may indicate a greater willingness to allow one or more aspects of machine operation to be recorded than do those who merely request the device, but fail to use it. In some uses, it may be assumed that those parties who install the device 300 and allow it to record machine data are more likely to be careful machine operators than are those who do not. Furthermore, those who review the recorded information locally or on-line may show a greater willingness to allow monitoring and may be among the more careful drivers. These users who provide the recorded information to an end-user may show an even greater willingness to be monitored and may be the most careful operators.

Each assumption may be subject to verification and change. Verification may analyze the collected data, correlate the data to actual losses, and relate the data to actuarial classes.

A level of risk assigned or associated with a party and/or the operation of a machine may be based on many factors, including demographics such as the sex, age, marital status, and/or address of an insured party or machine operator. Assigning a level of risk at 726 or establishing relationships (that may be retained in one or more databases) to the operation of the machine may be based in part on a measure of willingness to allow one or more aspects of vehicle operation to be recorded. This association may be assessed on known factors or through an analysis of retained data.

Assigning a level of risk at 706 to the operation of a machine may include an evaluation of selected data recorded by the device 300, or a copy thereof. Where the machine is a vehicle, such as an automobile, truck, motorcycle, RV, boat or airplane, one or more recorded aspects of machine operation may include speed, acceleration events, deceleration events and/or locations where the vehicle was operated and/or any individual or combination of those events or elements. Other individual or collective aspects that may be recorded include seat belt use, turn signal use and/or the times and dates of vehicle use. One or more of these aspects of machine operation, either alone or in combination with one or more other characteristic (that may include operator age, sex, location, selected demographics, etc.) may be compared to assess risk. The conclusions may be compared against assumptions about safe operation determined by an insurer or through actuarial data acquired or compiled from similar data to validate or adjust risk assessments. The results of such comparisons may be used to assign a level of risk at 726 to a driver or owner that is retained in a database, database management system, or other storage systems.

The collection and assessments may have many applications. For example, if the data received from the device 300 indicates that a relatively high percentage of vehicle operation is done at a speed deemed to be unsafe, the operator and/or machine may be placed in or assigned a high risk category. Additionally, or alternatively, if the recorded aspect(s) indicates a relatively large number of aggressive accelerations and/or decelerations for a number of miles driven, the operator and/or vehicle/operator may be assigned a high risk category or actuarial tier. In these applications, previously known actuarial parameters may be processed when evaluating the recorded aspect(s). In some analysis, location-based actuarial data may indicate that the safest class of drivers may perform rapid decelerations frequently in urban settings when compared to safe drivers traveling through rural areas. In this analysis, allowances may be made for location or other factors. When location information is not available, a location may be determined from other data.

Data may be stored or processed in relation to a trip. A trip may start when motion is detected or when the vehicle ignition is turned on (or data, such as speed data, is first detected or received and vehicle voltage exceeds a programmable threshold) and ends when motion ends or when the ignition of the vehicle is turned off (or when data, such as speed data, is not detected or no communication occurs within a programmable time period or vehicle voltage falls below a programmable threshold, or in response to an insurer's or other entities command). In alternative devices 300, one or more combinations of these conditions may identify trips (e.g., a beginning and/or end of a trip). When motion sensors are used, a physical mechanism or electronic sensor may quantify motion. The device may be integrated with or in communication with the device 300 or a vehicle. In many applications, the device 300 may provide data that allow programs to reach conclusions. If a high percentage of the recorded trips are short (e.g., below some threshold distance and/or time), then a system may conclude that the vehicle is garaged in an urban area or is used primarily for city driving. In some analyses, the speed at which the vehicle is driven during the short trips may influence (or be a factor in) such conclusions.

Data validation or verification may also be part of the process of assigning the level of risk at 726 and/or in setting the price or cost of insurance at 734. For instance, the device 300 may log vehicle identification information (e.g., vehicle identification number or "VIN") and/or or network protocol information when the device initially interfaces a vehicle control system. Some information may be available from an in-vehicle network and may be requested, transmitted, received, and written to a non-volatile memory of the device 300. Additionally, where the device 300 or machine include an optional interface that allows a user to enter information (e.g., operator identification, code numbers, I.D. cards, biometric scans), this information may be received and stored in the memory of the device 300. Where the device 300 or vehicle include, or communicates with, location determining systems (e.g., GPS, wireless triangulation, trilateraleralism of encoded signals, etc.), this information may be stored in a logically distinct or common portion memory. The recorded and stored information may be compared against information recorded or transmitted earlier by the party. A recorded VIN may be compared against a vehicle description provided by the party when applying for insurance. Similarly, location information retained in the device may be compared against "garage location" information provided by a user (e.g., in a policy renewal form, for example). Operator identification and vehicle mileage information may be compared against operator lists and mileage estimates provided by the user (e.g., in policy application forms).

When incorrect data is found it may be corrected and the inconsistency (that may be found through comparisons with applications or renewals, for example) may be considered in cost calculations. In some circumstances, incorrect data may indicate a fraud. The detection may place a party in a lower or uninsurable underwriting class or in a higher risk tier.

The assigned level of risk at 726 may include an assignment of one or both of an underwriting tier and an insurance rate. The level of risk at 726 may be used to determine whether or not to offer insurance at 734 or establish a price for the insurance at 734.

The marketing method 714 may serve current customers or potential customers (e.g., those who are not current customers). Potential or current customers of an insurer may access stored data of one or more aspects of the operation of a machine through customizable software that allows users to access documents and files and software related to those files. These users may review data regarding one or more aspects of machine operation and, in some instances, relationships between many users and the relative levels of risk associated with those users. This may occur on a regular basis, at policy renewal time, when a potential customer is evaluating insurers, or at other times. In reviewing the data, the current or potential customers may indicate a willingness to allow an aspect to be recorded. Furthermore, after such reviews, or instead of them, the current or non-customer may transmit the recorded data to the insurer for the insurer's review and analysis. The analysis may determine a price (e.g., prospective or retrospective) for insurance coverage. In some circumstances, a retroactive discount may be offered against an insurance premium for a period that was monitored. Alternatively, assumptions may be made about future behavior based on the recorded data and/or the established relationships. The analysis may result in a discounted or a higher premium for prospective insurance periods. Non-customers may receive estimates or offers of insurance electronically or by courier (e.g., postal mail) that may include pricing information based the non-customer willingness to review recorded data.

The system may also serve a prepaid customer. When a customer contracts for insurance on a prepaid basis (e.g., per mile, kilometer, or per minute, or other unit of time), a user interface may allow the user to review the recorded data. The review may allow users to display a number of miles driven or number of minutes or miles remaining on an account. It may allow users to estimate when a prepaid insurance balance may be consumed.

Decisions about insurance levels and insurance periods may be based on a willingness to allow one or more aspects of machine operation to be recorded at 718 and be transferred to an insurer. These determinations may be considered when deciding whether or not to offer insurance at 730 and its term. For example, it may not make sense to enter into a long term agreement with an operator or machine owner associated with or assigned to a high risk level (or high underwriting tier). However, a shorter term may represent an acceptable risk.

Assumptions may be tested. For example, a non-customer may request a device 300 for recording one or more aspects of a machine. The non-customer may install the device and store one or more aspect of machine operation for a trial period. The data may be transmitted or uploaded through a wireless, tangible, or combination network to a remote server at an insurer. In this example, it may be assumed, or it may be supported by actuarial information, that the non-customer is a responsible, law abiding, careful vehicle operator. Nevertheless, the uploaded data may indicate that, for example, the non-customer drove at excessive speed and/or with overly aggressive accelerations and decelerations. For these reasons, the insurer may be unwilling to extend certain insurance coverage to the non-customer and/or make a long term commitment. However, the insurer may be willing to minimize risk and improve an expected return by underwriting a limited coverage for a shorter term or by charging an additional premium. Less coverage, a shorter term, and/or continued data monitoring may cause the non-customer to change his/her driving behavior. As driving behavior improves, the likelihood of a better assessment may increase. If successful, the insurer may determine 730 to underwrite more coverage for a longer period and/or set a lower premium for such coverage.

The behavior modification and/or cost control aspects of the method for marketing insurance 714 may also include providing a remote interface to access "what-if" evaluations. The interface may allow users that record vehicle data to transmit the data to a remote insurance server cluster or site that provides the user with an opportunity to enter or change values to reveal the effect of those submissions. A user may adjust or evaluate different parameters, such as speed and distance traveled, to learn how these changes may affect their costs over time, such as an insurable term. The software may accept a user's changes or even recommend changes automatically to highlight differences.

Behavior may change when users have access to data. A remote interface may allow users to view documents and access files and software related to those documents at a remote location. The remote interface may be customized to the user's preferences and may allow the party to upload or transfer the recorded information, or a copy thereof, from the device 300 to a remote computer or an insurer's remote server. The remote interface may transfer or render some or all of the data retained in the device 300 or selected information. In some systems, the remote interface may display graphs, animations, or graphics that may include one or more stored data elements (e.g., the recorded speed of a vehicle, distance traveled, the duration of trip(s): on a minute by minute or other time related basis, metadata, etc.). Alternatively, the remote interface may render information indicating a percentage of time the vehicle was operated within particular speed ranges, and/or at high risk or low risk locations (routes), and/or times, with aggressive accelerations or decelerations, summaries or information about another aspect (e.g., turn signal use, seat belt use, vehicle roll, vehicle yaw, entertainment system on or off status, radio or television station, compact disc, digital video disks, or other entertainment being played, telephone use, convertible top up or down status and/or tire pressure, etc.). Where the machine is industrial or farm equipment, other aspects may include line speeds, operating pressures, safety gate status, temperatures, operator run times, machine configuration information (e.g., harvester, plow, planter, or other configurations), etc.

In some systems, client-side software executed by a remote interface may allow users to review information. The content may indicate how the recorded information may affect a prospective or retrospective cost of insurance. For example, the software may display the recorded information with a message indicating that a five percent discount may be available if the data is transmitted to an insurer or a service provider. Additionally, or alternatively, the software may automatically highlight portions of the stored data that may qualify the party for additional discounts or surcharges. These highlights may be explained through hyperlinked documents or tags that may not be visible to the user, but may be activated by selecting or hovering an absolute or relative pointing device over a link or tag.

In some systems, the interface that allows a party to review recorded information about one or more aspects of machine operation allows users to compare operational behavior to the operational behavior of others. For instance, a party's recorded data may be compared against an average or aggregate set of data received from other users. Statistical or other comparisons may be made. These comparisons may compare a user's data to an average or aggregate of some or all parties who have uploaded data, an average, or aggregate of data provided by operators with similar demographics or characteristics (e.g., age, sex, location, etc.), an average or aggregate of data provided by parties associated with similar machines (same model car, same model milling machine, same size heat treating furnace, same model tractor or same model combine) or a combination of other classes of data.

In some systems, the interface that allows a party to review recorded information may include a transceiver or transmitter that may transfer the recorded information, or a copy thereof, from the on-board portable mobile device 300 to a device or destination that may deliver a portion of the information to the user. A transfer may be made by a wireless or physical link. The connection may be made by a cable that links the device 300 to a communications port (e.g., and RS-232, USB port or a parallel port) of a computer, programmable digital assistant, or other device. Alternative, complimentary, or backup connections may be made by devices compliant with low-power, wireless mesh networks (such as Zigbee), a multilayered communication protocol (such as Bluetooth®) or other wireless networking or communication technology (including the transceiver protocols described above).

In some systems, a compatible interface may enable the device to connect to a remote computer (e.g., a home computer), a work station, or personal digital systems (that may include a display device). If the ancillary device is portable or is in proximity to the on-board portable mobile device 300, a physical or wireless connection may be made. For example, a cable may link a personal digital assistant or laptop computer to the on-board portable mobile device 300 while the device 300 is physically connected to an OBDII connector or virtually connected to a vehicle interface.

Through a wireless interface, data may be delivered to a user and displayed even when the display is remote from the on-board portable mobile device 300. For example, the on-board portable mobile device 300 may establish a connection with a remote computer when the vehicle is parked in proximity to a home or a remote network interface. A vehicle may be parked in a driveway or a garage and be within range of a wireless connection. When a connection is established, the technology may transfer a copy of the recorded information from the on-board portable mobile device 300 to a remote destination.

In some applications, the on-board portable mobile device 300 may be removed from the vehicle and connected to a remote transmitter, transceiver, display, or other device. In some applications, the device may be removed from the vehicle on a regular basis (e.g., monthly, quarterly, or yearly) to enable communication with a remote device, such as a display device. A wireless or physical connection may be established between a personal computer or other computational platform to allow the on-board portable mobile device 300 to transmit the record data. After a connection is made, some or all of the recorded data may be transferred or copied to a second device. The data may be displayed, processed, manipulated, analyzed, and/or compared to other data. In some systems, the data retained in the on-board portable mobile device 300 is stored and/or is transmitted in an encrypted format. When received in an encrypted format, the intermediary or destination may include software or hardware that restores the data to its original form.

In another application, an interchangeable component of the on-board portable mobile device 300 may be physically removed from the device 300 to transfer data. Some devices may include a self-contained assembly of components and circuitry, such as a removable memory card or stick. Data may be stored on the removable storage element. When the storage element is interfaced to a remote device, the data may be transferred to a remote site. In some systems, the removable element may be erased after a data transfer. Once transferred, the removable element may be reconnected to the on-board portable mobile device 300. Should the removable element not be erased, the data may be archived and a replacement may be reconnected to the on-board portable mobile device 300. If the interchangeable device comprises a memory, it may comprise memory sticks or other devices that may store and retrieve data. Some interchangeable devices may comprise movable media, such as floppy disks, recordable compact disks, digital video disks, static media such as block-oriented memory, etc.

Data transfer may occur automatically or in response to user commands. When a transfer occurs, a party may be rewarded with a discount for transmitting the data to a remote destination, such as an insurer's server cluster. The data may indicate that an insured party is entitled to an additional discount or subject to a surcharge. If a party is not a customer, a quote may be transmitted to the user.

In some systems, data is stored in multiple forms in the device 300. The first form may comprise an encrypted form for communication with a display device, node, or an external device. A second set of data may be encrypted in a second format through a second encryption algorithm or device. The second set of data may be transmitted to a second node or service provider, such as an insurer. The encryption schemes may prevent unauthorized access to the data.

The interface that allows a party to review the recorded information may be local to a user (e.g., installed locally on the parties' personal computer or computing platform), may be remote to a user (e.g., installed on a remote computer or server and communicated through a wireless and/or physical link that may comprise an internet link), or may be distributed among a different platforms or locations. For example, the software and hardware that comprises an interface that provides a preview portion may be installed and run locally, (e.g., on a party's computing), while other detail or display functions may be served by a remote content provider through a server or cluster (e.g., a Web page server).

Some parties may be reluctant to provide information to an insurer unless the party is assured that the data will lower their expenses (e.g., reduce insurance costs). Through a distributed transaction processor or processing, a local computer may allow a user to review and analyze the data and control its distribution to a service provider, such as an insurance company. A separate computer or cluster may be programmed to analyze the data, assess risk, assess performance, or establish an insurance rate, and transmit some or all of the results of the analysis to the local computer. By distributing the analysis to a separate computer, some systems may provide the user with an incentive to transmit the recorded data to a third party.

Figure 8:
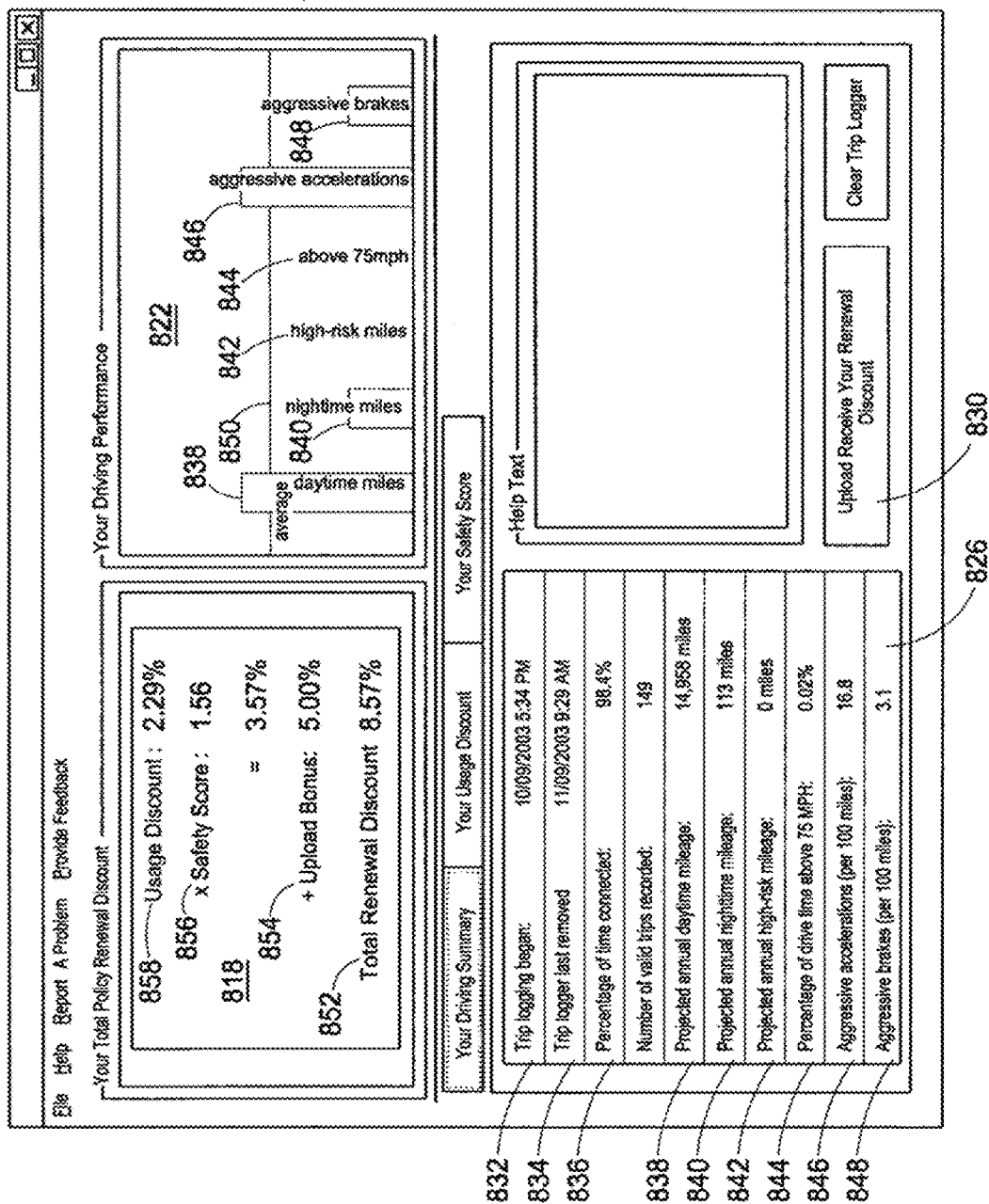
FIG. 8 is an interface displaying vehicle data that includes exemplary information that may relate to a cost of insurance.

For example, in FIG. 8, preview software retained and running, for example, on a personal or local computer may receive and render a driving summary display 814. The driving summary display 814 includes a policy discount section 818, a graphical operating performance section 822, and a numerical operating performance section 826. Clicking or selecting an upload button 830 may direct the software to transmit encrypted data from the device 300 or local computer to a remote computer, server, or cluster. The remote computer, server, or cluster may belong or may be associated with an insurer or a third party service provider. When selected, hardware and software may activate a program that transmits the data through a physical or wireless link (e.g., an internet or telephone based connection).

When received, the remote server or cluster may analyze and/or transmit data that cause a display of the information in one or many formats. The display may include a numerical performance display section 826 that includes a logging start time stamp 832, a logging stop time stamp 834, and a percentage of time connected parameter 836. The start and stop time stamps 832, 834 may indicate the time period in which the data was monitored. The percentage of time connected parameter may indicate how faithfully the device 300 or interchangeable component of the device 300, (e.g., a memory module) was used during that period. For example, if the percentage of time connected 836 was relatively low, it may indicate that the device 300 or interchangeable component was disconnected and did not record machine performance during long periods of time. This may suggest that the machine was operated in an unsafe manner during that time. A relatively high value, on the other hand, may indicate that the submitted data is representative of machine performance or driver behavior. In some systems, the percentage of time connected parameter 836 may be used to determine a driver's willingness to record operational data at 718. This measure may influence underwriting decisions and rating scores. For example, when the percentage of time connected to a vehicle bus or controller is low, the low use may be associated with a higher level of risk that reduces or eliminates a discount.

The numerical driving performance section 826 may also display summary information about recorded parameters recorded by the device 300. When appropriate, the information is presented on an annualized or customized basis. In FIG. 8, the logging start and stop parameters 832 and 834 indicate that the summarized data was collected over a 31 day period. Software and hardware allows users to review machine use or mileage estimates based on a predetermined logging period (e.g., the 31 day logging period) through the remote interface. In some systems, projections may be based on the ratio of recorded days versus the number of days in a year; in other systems; the projections may be seasonally adjusted. The interface (and preview software) may project an annual daytime mileage of 14,958 miles based on the number of miles recorded in the logging period. Additionally, the interface and (preview software) may display a nighttime mileage projection 840 of 113 miles and a high risk mileage projection 842 of 0 miles.

In FIG. 8, a client-side scripting may add interactivity and may customize the viewing or delivery of documents that may be updated dynamically. The page may include numerical performance display 826, including indications 844, 846, and 848 that the vehicle is driven above 75 miles per hour 0.02 percent of the time, aggressively accelerated 16.8 times per 100 miles driven and was aggressively braked or decelerated 3.1 times for every 100 miles driven. The graphical operational performance section 822 may display these parameters 838-848 as pictorial representations, such as graphics or charts in relation to a comparison value, such as an average or nominal values 850. The inclusion of a comparison value may allow the operator to compare individual operating habits or profiles to other operators or drivers or profiles.

In FIG. 8, the discount section 818 of the operational summary 814 indicates that a total discount 852 may be based upon an upload bonus 854 or a rating factor, such as a safety score 856 and/or a usage discount 858. Current customers may apply the discount 852 to a premium to determine a cost of insurance. Non-customers may apply the discount to a cost presented in an insurance quote. The insurance quote may be estimated, or, if the data is delivered to an insurer, delivered electronically in real-time, after a delay, or through a postal service, and may be a firm offer. In some systems, a cost of insurance notification is transmitted after the recorded data is transmitted or transferred to the insurer.

In some exemplary systems, an upload bonus 854 may reflect a portion of a discount applied to an insurance premium. It may reflect the willingness to monitor machine operation and the uploading, transmitting, or otherwise providing recorded data to an insurer. Other (e.g., lesser or greater) discounts may also be given. A discount may be given to users that record and review their machine (e.g., vehicle) data, but do not transmit the data to an insurer. A smaller discount may be given to those who request and install the device 300, but do not review the data or transmit the data to an insurer. In some applications, a willingness less than that willing to transmit data to the insurer may be assigned 726 a level of risk that results in no discount, or may result in the assessment of a surcharge. The safety score 856 and usage discount 858 of FIG. 8 may be explained through secondary screens, windows, or documents that may be linked by tags or a markup language associated with text, icons, or other elements.

Figure 9:
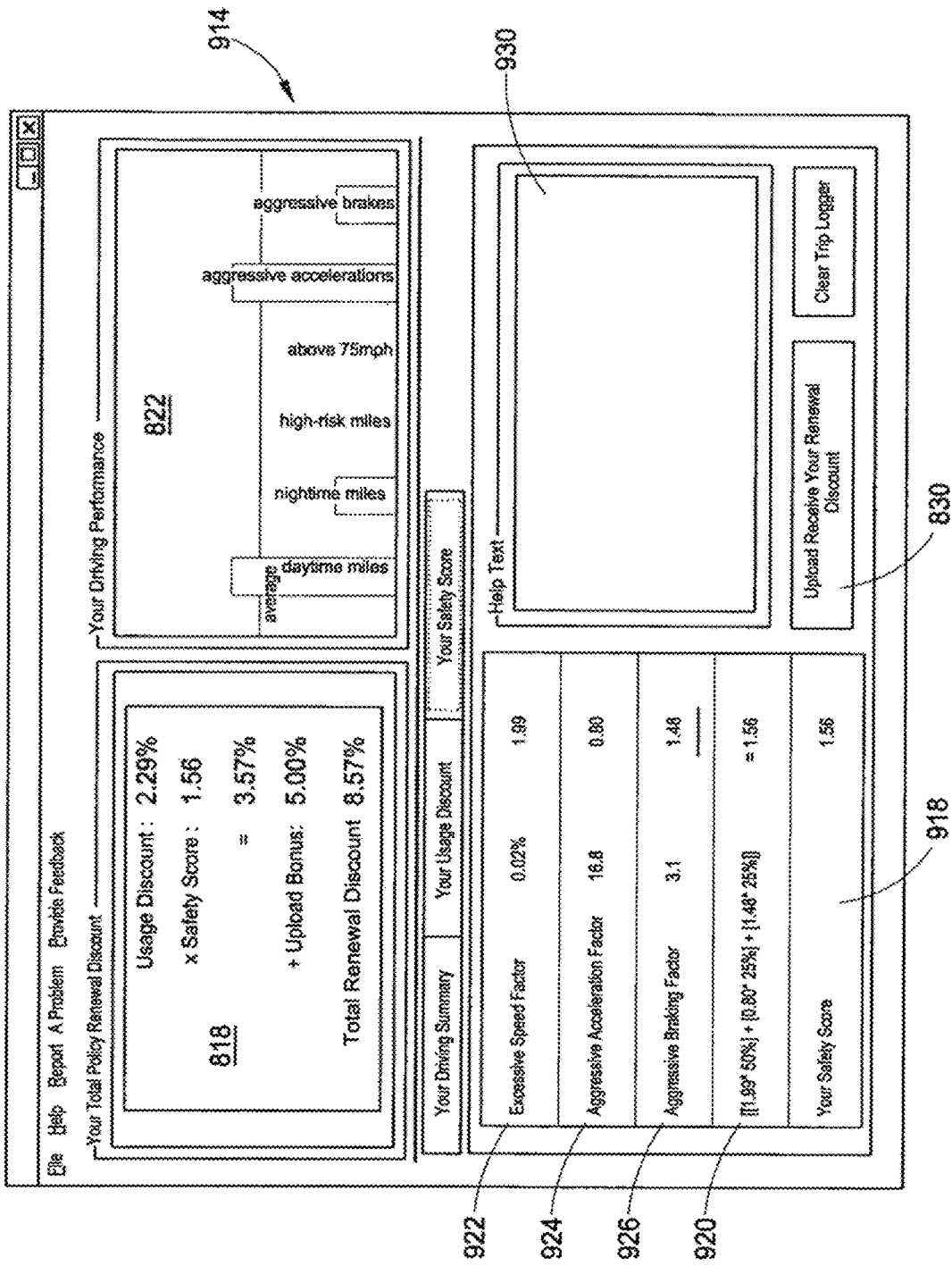
FIG. 9 is a second interface displaying vehicle data that includes exemplary information that may relate to a cost of insurance.

In FIG. 9, a server side scripting may add additional interactivity and customizes the viewing or delivery of documents or objects that may (be updated dynamically and may) include a safety score or rating. The page or documents may include a score display 914 (that may include graphical objects) in proximity to a safety score explanation section 918. Some safety score displays 914 may include the discount summary 818 and graphical performance section 822.

In some systems, the safety score may be based on one or more driving or operational characteristics. In some systems, the characteristics may include a speed factor 922, an acceleration (and/or deceleration) factor 924, and/or a braking factor 926. An on screen help feature in the form of a help window 930 or a cartoon like dialog balloon may appear when a user positions a cursor over an icon or element to further explain the elements or objects on the page or document(s). For example, a help feature may explain that an excessive speed factor 922 may be programmed to a predetermined value (e.g., such as 2.0), but is thereafter reduced at a fixed or variable programmable factor based on one or more parameters. In some systems, the predetermined value is thereafter reduced by a programmable factor of 1 for every 1.5 percent of driving done at a speed over 75 miles per hour (a predetermined amount). A help feature, such as a help window 930, may explain that a braking factor, such as an aggressive braking factor 926, may be programmed to a predetermined value (e.g., such as 2) and thereafter is reduced at a fixed or variable programmable factor based on one or more parameters. In some systems, the predetermined value is reduced ⅙ times the number of observed, recorded, or detected aggressive braking events normalized to a per 100 miles driven basis. A help feature or window 930 may also explain, for example, that an acceleration factor, such as an aggressive acceleration factor 924, may programmed to a predetermined value (e.g., such as 2.0), and is thereafter reduced at a fixed or variable programmable rate. In FIG. 9, the rate may comprise a fraction (e.g., 1/14) times the number of aggressive acceleration events recorded in the device 300 normalized to a per 100 miles driven basis. In FIG. 9, the safety score or rating may be adjusted or weighted by a function, such as the function 920 that comprises a combination of speed factors 922, acceleration factors 924, and braking factors 926, or may be based on a single factor that may be a raw data element, calculated data element, and/or derived data element alone.

Figure 10:
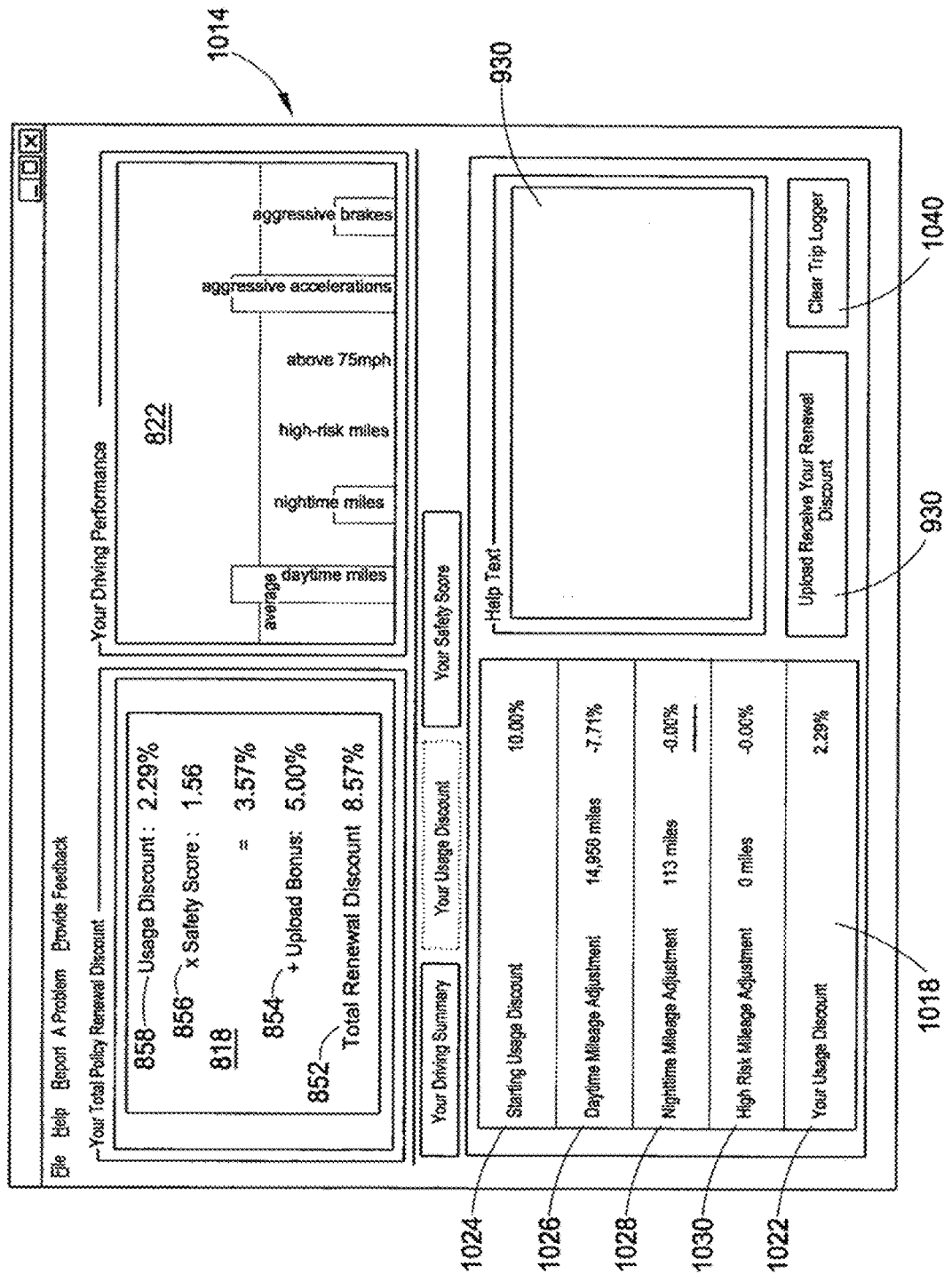
FIG. 10 is a third interface displaying vehicle data that includes exemplary information that may relate to a cost of insurance.

In FIG. 10, a server-side scripting adds additional interactivity and customizes the viewing or delivery of documents or objects (that may updated dynamically) to render a usage discount display 1014 having a usage discount detail section 1018. The usage discount display 1014 may also include the discount summary display 818 and a graphical operation performance section 822. The usage discount usage discount 1022 may be a function of one or more elements. In FIG. 10 the elements include a starting discount 1024 and rating factors. The rating factors rendered in the exemplary page reflect a daytime mileage adjustment 1026, a nighttime mileage adjustment 1028, and a high risk mileage adjustment 1030.

In some systems, a help feature, such as a help window 930, may explain that the usage discount 1022 may be programmed to the value of the starting usage discount 1024, but is thereafter reduced by one or more adjustment values. In some systems, the adjustment values may be based on daytime driving 1026, nighttime driving 1028, and/or a high risk adjustment 1030. For example, a starting usage discount may be programmed to a fixed percent (e.g., 10 percent). The usage discount 1022 may be adjusted higher or lower based on one or more adjustment values. In FIG. 10, the usage discount may be adjusted downward based on the number of annualized miles driven during the day, driven during the night, and/or classified as high risk. Daytime miles might, for example, may be miles driven between a programmed range (e.g., the hours of 5 a.m. and 10 p.m. local time). Miles driven between the hours of 10 p.m. and 5 a.m. Monday-Friday may be classified as nighttime miles. Miles driven during the hours of 12 a.m. to 4 a.m. on Saturday and Sunday might be classified as high risk miles.

A help feature or window 930 may explain that a daytime adjustment may reduce the starting usage discount by a predetermined programmable value (e.g., 1 percent for every 1000 miles driven) beyond a predetermined limit (e.g., 7250 miles per year). Miles driven during nighttime may reduce the usage discount by, for example, a fixed programmable percent (e.g., 2.5 percent for every 1000 nighttime miles driven) in excess of another predetermined limit (e.g., 250 miles). High risk miles may reduce the usage discount at a predetermined programmable rate (e.g., 12 percent per 1000 high risk miles driven).

In some pages and documents, the total discount 852 may be calculated by multiplying the usage discount 858 by the safety score 856 and adding the upload bonus 854 to that product. In other applications, the usage discount may be based on other factors and/or functions.

If the party selects or decides to provide recorded data from the device 300 to the insurer, the user may click or select the upload button 930. The interface and preview software may server as an intermediary that transmits encrypted data from the device 300 to a server or cluster of the insurer or to a third party through a publicly or privately accessible distributed network. In some systems, the device 300 transmits encrypted data. When a data transfer is complete a party may elect (e.g., by clicking or selecting) or enable a clear logger button 1040 that directs the preview software to issue commands to erase selected recorded data from the device 300. The device may be cleared in blocks or bytes to free up resources and allow a dynamic memory allocation process to reallocate memory to functions within the device 300.

Figure 11:
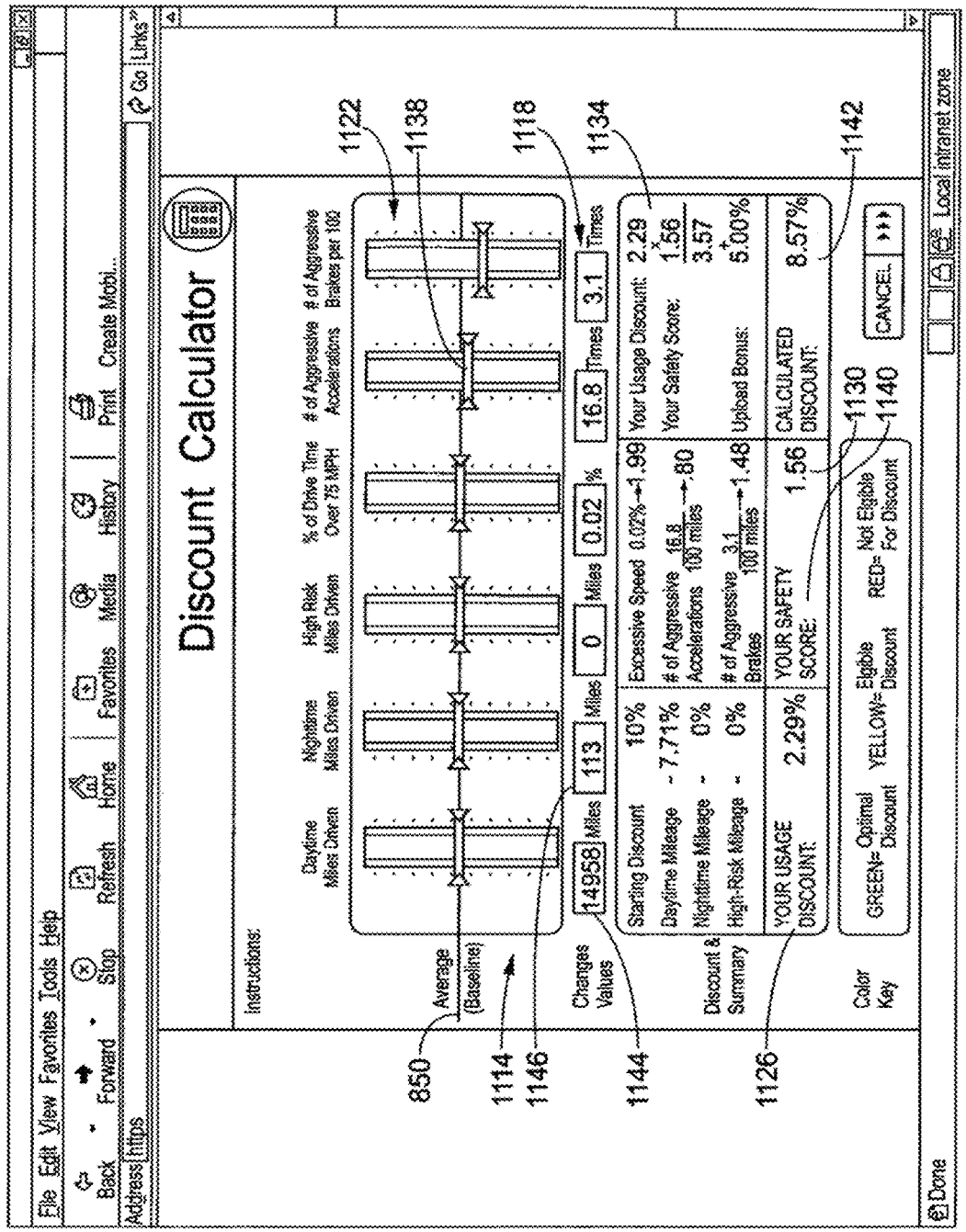
FIG. 11 is an exemplary Web page displaying in-vehicle data that includes exemplary information that may relate to a cost of insurance and an interface enabling "what-if" evaluations.

In FIG. 11, a server side scripting adds more interactivity and customizes the viewing or delivery of documents or objects (that may updated dynamically) to render recorded information regarding one or more aspect of machine operation. Through these documents, a party associated with a machine may further review the data through the pages that may be served through a Web site. The Web site may transmit tools 1114 associated with files, graphical elements, and scripts that may examine how adjusting operational behaviors or characteristics may affect a cost of insurance (or a discount or surcharge on insurance) in the future or from the past. For example, the Web site may transmit dialog boxes such as text entry boxes 1118 or graphical sliders 1122 that may manipulate or edit summary information. The summary information may include information received by the insurer or the third party service provider of the insurer. A party may log in or otherwise associate him or herself with the uploaded data and summary information. The uploaded data may be preloaded into tools 1114, 1118, and 1122. A usage discount summary 1126, safety score summary 1130 and/or discount calculation 1134 portions of the Web page may be preloaded with summary information. A party may use the text windows 1118 or sliders 1120 to change the displayed performance summary information to reveal how different machine operational behavior may affect a (prospective or retrospective) cost of insurance, discount, surcharge, or coverage (not shown).

For instance, a party may change a position of an aggressive accelerations slider 1138 and observe, for instance, how reducing the number of aggressive accelerations that may occur when driving may affect a (or their) safety score 1140 and/or a discount 1142. Similarly, increasing the number of daytime 1144 or nighttime 1146 miles driven may reveal changes in a usage discount 1126 and a calculated or total discount 1142. Other pictorial or graphical display techniques may highlight the significance of these changes. For example, the colors of the slider 1122 or entered text 1118 (e.g., that may yield an impression characteristic) may be changed to indicate the level of risk, safety, and/or cost associated with the current or adjusted values.

Figure 12:
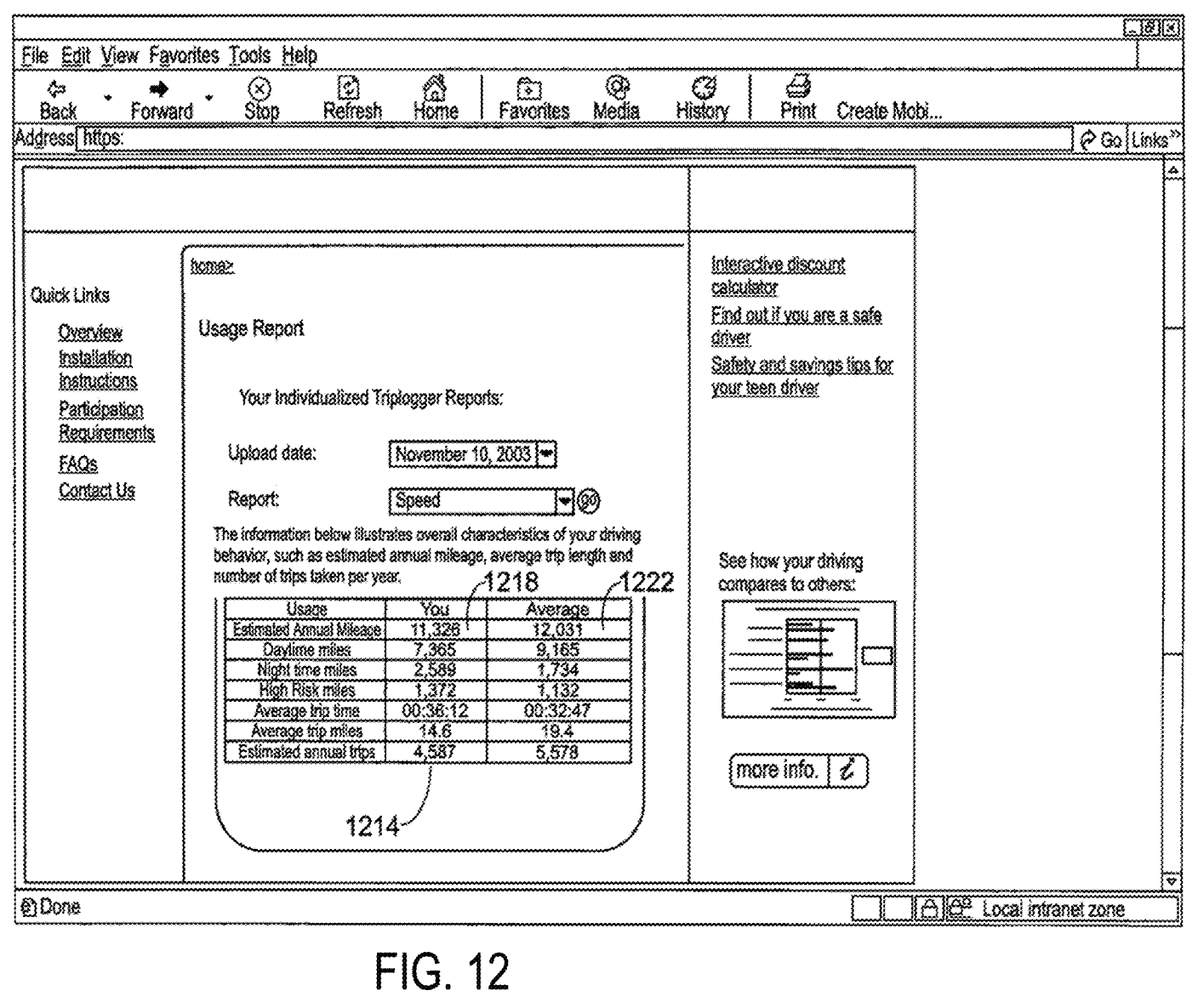

In FIG. 12 a server side scripting adds more interactivity and customizes the viewing or delivery of documents or objects (that may updated dynamically) to provide a review or comparison to other parties. A party may compare one or more aspect of operation of the machine or a party's behavior to other parties and machine operations. For example, a table 1214 or graphic may compare operational aspects 1218 of the machine to historical and/or statistical data such different averages 1222.

Figure 13:
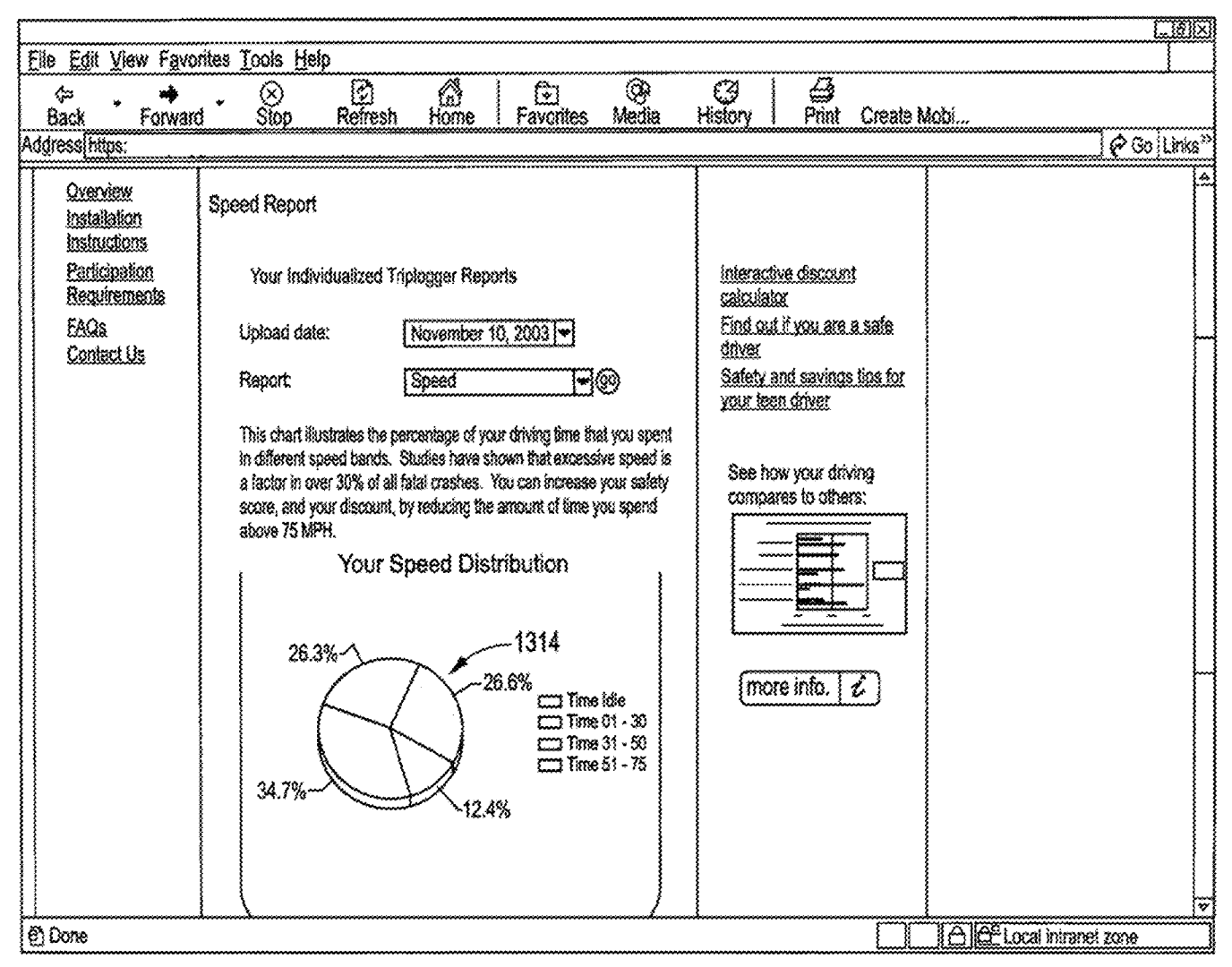

Server side scripting customizes the viewing or delivery of documents that illustrate a speed distribution graph 1314. The speed distribution shown in FIG. 13 illustrates a percentage of time a vehicle is operated within predetermined or programmable speed ranges. In alternative pages data comparisons are provided between a user and the speed distribution of an average driver (that may have a similar or differing demographic), neighboring drivers, and other drivers of the same model vehicle or any other comparison. Information about other operational parameters may also be delivered to a user's remote interface. For example, a distribution graph displays the percentage of time a seatbelt is used, a radio is played, or a cell phone or wireless device is used or frequency (e.g., the number of times) turn signals are used per a predetermined distance (e.g., 100 miles).

Figure 14:
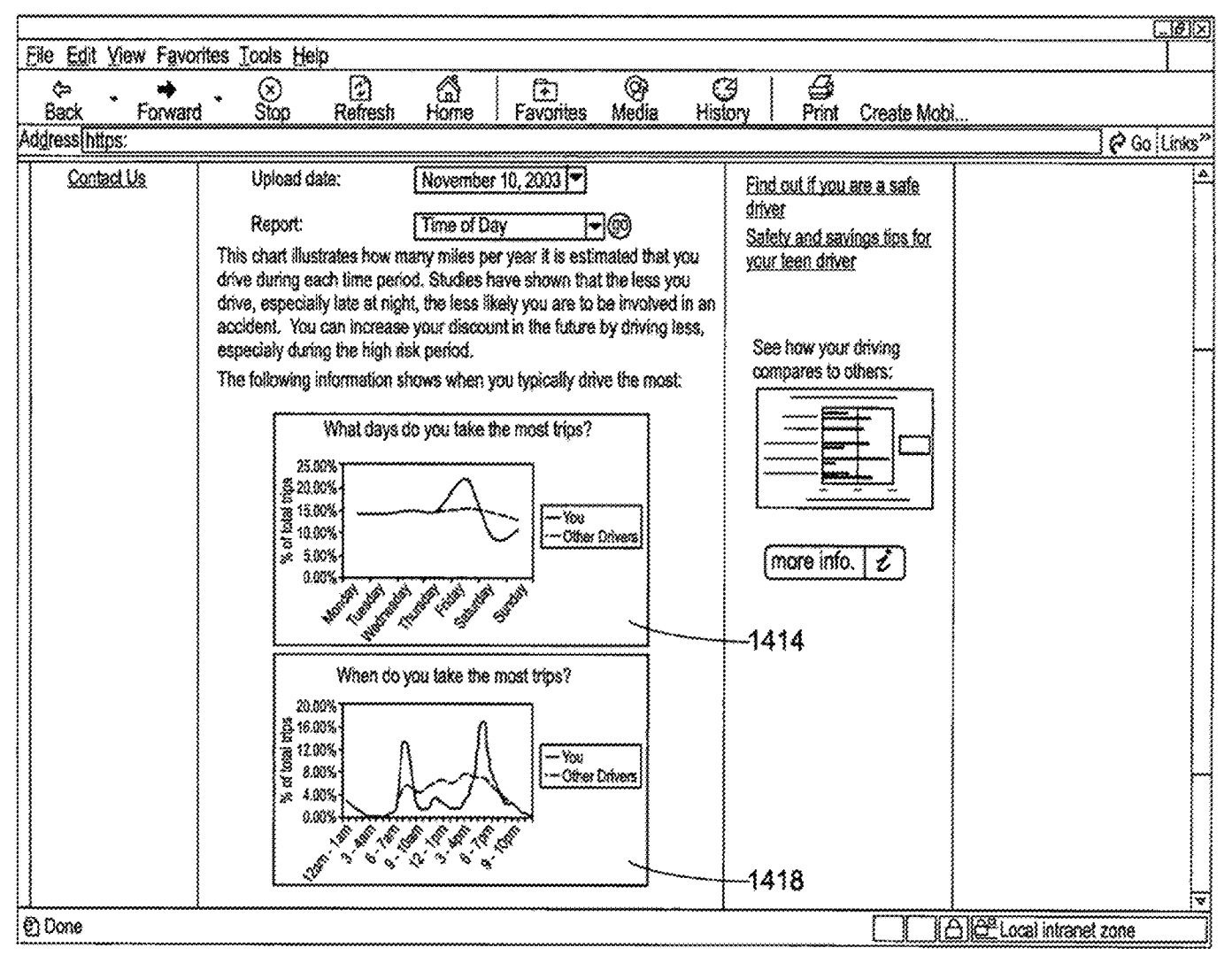

Summary information about the received recorded data may be transmitted in other contexts that a user may request. For example, a distribution 1414 may be generated by a server-side script that correlates driving activity to the days of the week (FIG. 14). Additionally, or alternatively, driving activity may be correlated to a time of the day and presented in graphical format 1418. In alternative pages or documents, the data may be presented through comparisons to other machine operators or drivers. If the data is presented in comparison to neighboring drivers, the party may determine a time of day for driving when traffic is light, which may reduce the driver's level of risk.

Figure 15:
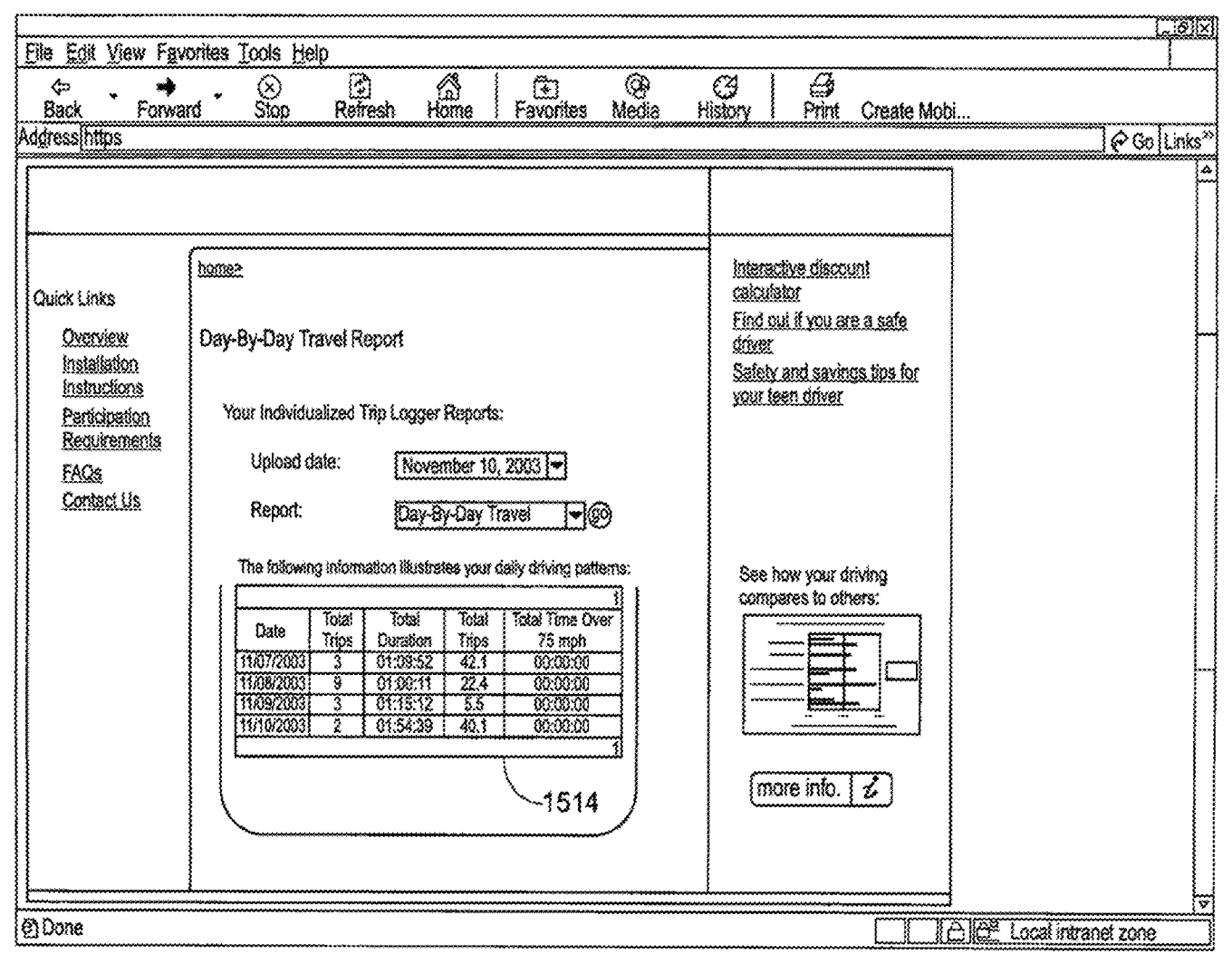

In FIG. 15, a Web site delivers the tags, text, pictorial objects, and/or scripts that provide the exemplary summaries of machine operation in the form of a log. When summarizing a vehicle's operation, the data may comprise a trip log 1514. Asynchronous vehicle events, such as an ignition cycle, the detection of speed, or other data may identify the beginning or the end of a trip. In FIG. 15, ignition start and stop events are used to identify the beginning and the end of trips. The length of time and the number of miles driven for each trip or for the total number of trips on a given day may be tracked and transmitted to a user's remote interface. Where a fuel consumption aspect is included in the recorded data, fuel economy may be included in the trip log. When presented in a graphical format, fuel economy may be used to detect an engine, system or other failure, the onset of a failure, or to remind a user to schedule or perform preventive maintenance that may allow the user to avoid a failure.

Trip log information may assist a user account for miles driven. When used for work-related purposes, it may assist a user to account for business expenses. When delivered to a server or cluster hosted by an insurer, miles driven or the number of hours a machine is operated may be transmitted to a user's remote interface with a cost of insurance on a per trip basis. When serving a prepaid user, the server or cluster may transmit the monitored parameter (e.g., miles driven or the number of hours a machine is operated) with its associated costs (e.g., as a bill or debit from a pre-paid amount).

Figure 16:
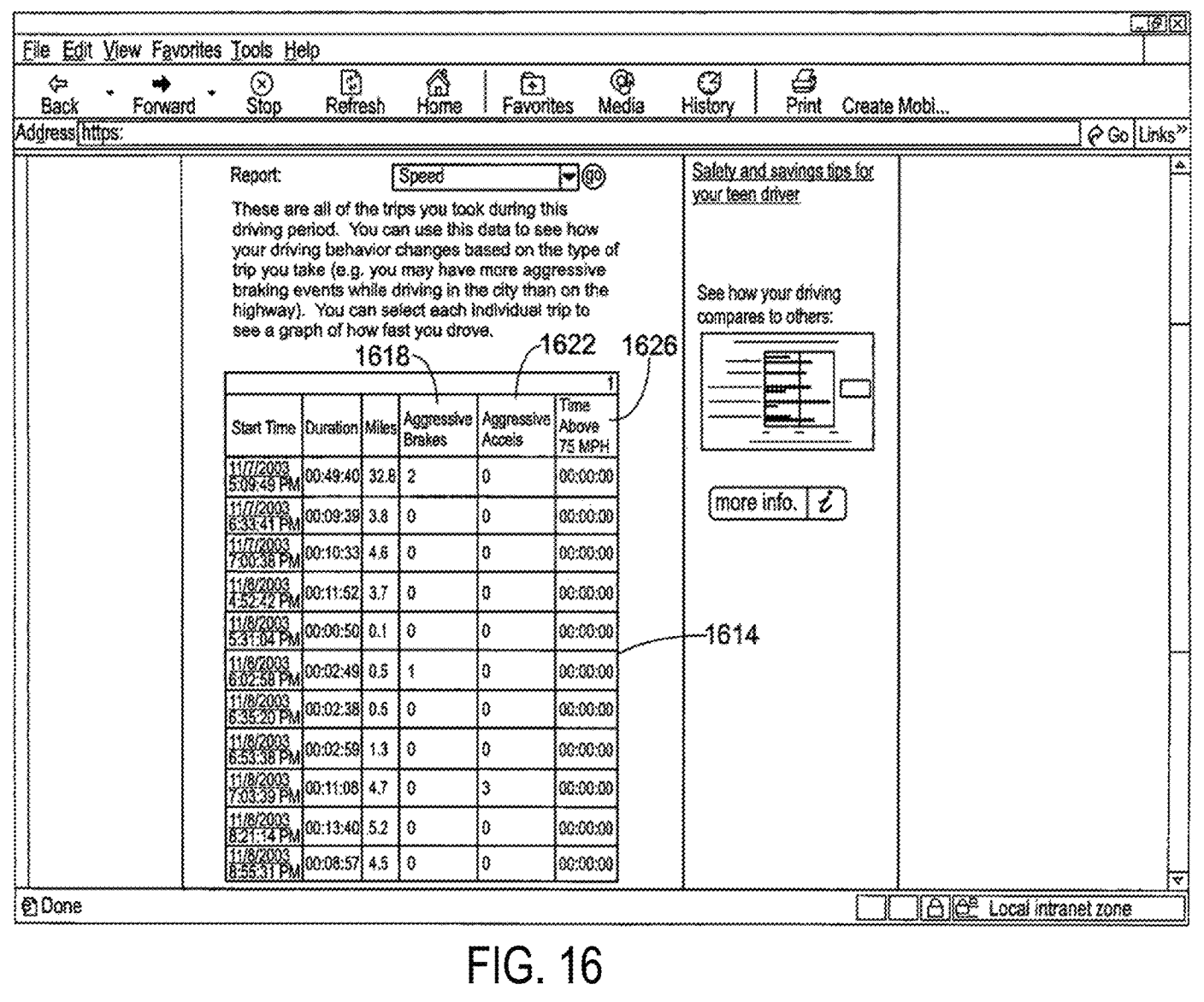

Some server-side scripts adds interactivity and customizes the viewing or delivery of documents or objects (that may updated dynamically) by automatically selecting and/or highlighting parameters. FIG. 16 highlights behavior or data that may increase insurance costs, such as aggressive braking 1618, aggressive deceleration 1622 events, excessive number of trips, duration of trips, distance of trips and time spent above a threshold speed 1626. The highlights may be delivered through a context-sensitive script or program that that highlights high risk parameters relevant to a user that may be based on a user and/or context (e.g., information may be highlighted if it reflects risks associated with an actuarial class). The highlights may assist a user in modifying their behavior.

A server-side scripting may add other interactivity and customizes the viewing or delivery of documents, objects, or records (that may updated dynamically) related to the device 300. A record may indicate when the device 300 was cleared 1718, when the device 300 was installed in or interfaces a machine 1722, was removed from the machine 1726 and/or when data was transferred 1730. It may allow a user to review data processed through local software (such as their preview software described in FIG. 8). It may allow a user to review a percentage of time installed parameter (e.g., 836) and/or other data retained in an interchangeable component, such as the removable storage element.

In some systems, a network connection to the insurer or a service provider may maintain the device 300. For example, software updates may be provided to the device through a Web site. If the device 300 is to be interfaced to a different machine or through a different protocol, device software may be changed to accommodate differences between machines (e.g., firmware updates). Device updates may occur through hardware changes (e.g., memory chips or cards) or through magnetic or optical media physically delivered to the party. In yet other alternatives, updates are provided through wired telephone or wireless connections to the insurer or the service provider or directly to the device itself.

The hardware, software, and scripts that allow a party to review recorded information described above is exemplary only. In some embodiments, the hardware, software, and scripts may be run on a local computing platform. In other embodiments, the software and scripts may be delivered from a remote Web site or other communications network. In still other embodiments, a party may not be able to review the recorded data. Instead, the data is provided to and processed by the insurer without review.

The device 300 may be embodied in various combinations of hardware and software. For instance, an embodiment adapted for use with factory machinery may be embodied in software that may be stored, for example, in a programmable logic controller (PLC) or supervisory computers controlling factory machinery. An exemplary embodiment 1810 of the device 300 may include a processor 1814, program storage 1818, a data log 1822, a clock 1826, an optional internal power source 1830, a machine interface 1834, and a display interface 1838. The program storage 1818 may comprise storage medium, which may be a read only memory (ROM), Electrically Erasable Read Only Memory (EEPROM), a Flash memory or other non-volatile storage medium. The program storage 1818 retains instructions for controlling or directing the processor 1814 to record one or more aspects of machine operation. The processor 1814 may process signals received through the machine interface 1834 and store information in the data log 822. In some embodiments, data may be stored in the data log 1822 with a time stamp indicating the time of day information is received, generated, or changed. In some systems, a timestamp may comprise a time value based off of the clock 1826, the vehicle, or a wireless bus or network.

In some systems, the program storage 1818 may store instructions for encrypting data. For example, data to be transmitted to an insurer or a service provider may be encrypted before or as it is being stored in the data log 1822 (or when it is transmitted to a remote destination). In some embodiments, a second (or backup) copy of the data or information may be retained in the data log 1822 using a second layer or technique of or for encryption. A first layer or technique may be used for data to be transmitted to a user or local device or may be maintained as a backup or duplicate copy. A second layer or technique may be used for the data to be transmitted or delivered to an insurer or a third party service provider.

In some embodiments, the program storage 1818 may retain instructions for monitoring sensor output or measuring vehicle parameters (such the acceleration and/or deceleration rate of a vehicle). The device 1810 may monitor vehicle speed data (based on output of speed sensor) through the machine interface 1834. The speed information may be processed at a synchronous rate (e.g., once per second) by the processor 1814. The difference between consecutive speed measurements may be continuously measured in the vehicle or after the device 1810 transmits data (e.g., may comprise synchronously recorded speed) to a remote site. A positive difference between a current speed and a previous speed may indicate, for example, an acceleration event. A negative difference may indicate a deceleration event. An aggressive acceleration event may be identified when an acceleration value exceeds a programmable threshold. When analyzed in the vehicle, the rate of acceleration may be stored in the data log 1822 and time stamped (and/or date stamped) by the processor 1814. When a deceleration rate exceeds a threshold, the rate of deceleration may be stored in the data long 1822 and time stamped (and/or date stamped) by the processor 814 when aggressive deceleration events are identified in the vehicle.

In some systems, the rate of acceleration or deceleration may not be derived in the vehicle or at a remote site. In these systems, one or more accelerometers may transmit acceleration and deceleration rates that may be processed as described above.

In some systems, the program storage 1818 may retain relationship data and instructions to preserve other data for retrieval. Program storage 1818 may direct the processor 1814 to monitor and store raw data elements (such as vehicle speed) through the machine interface 1834 at a synchronous rate. Speed and other data may be recorded, and time stamped, at a regular interval and/or upon an asynchronous event (e.g., when a speed threshold is exceeded). Other data may include trip start and stop times, device 1810 installation and de-installation times, seat belt use, turn signal use, location or route information, entertainment system use, cell phone use, tire pressure, other safety and performance parameters, and relationship data. Relationship data may comprise data that establishes a connection between the monitored or recorded data and one or more vehicle or driver characteristics. In some systems, data that establishes a connection between the monitored or recorded data and an identifier (e.g., a unique identifier to the system) or user account may comprise relationship data.

When physically connected to a vehicle, the machine interface 1834 may mate with an in-vehicle connector (e.g., an onboard diagnostic connector), such as an OBDI, OBDII and/or OBDIII connectors. Additionally, or alternatively, the machine interface 1834 may include connectors that mate with other connectors (e.g., such as those known as SAE J-1962 connectors). Furthermore, the machine interface 1834 may include electronic components that generate signals that interface the networks associated with those connectors. For instance, the machine interface 1838 may comprise electronic components compatible with a Controller Area Network (CAN) protocol, Media Oriented Systems Transport/Transfer (MOST), J1850 Variable Pulse Width (VPW), J1850 Pulse Width Modulated (PWM), Keyword Protocol 2000 (KWP2000), J1939, ISO9141, and/or protocols adopted by the International Organization for Standardization (ISO), Society of Automotive Engineers, or an automotive (in-vehicle protocols) or OEM protocol.

In some systems, an optional display interface 1838 may include one or more connector and associated electronic components for communicating with a display, computational platform, personal computer, and/or digital personal assistant. Some display devices include an RS-232 connector and/or USB connector for receiving and transmitting signals using one or more protocols. Additionally, or alternatively, one or both of the interfaces 1834, 1838 may include wireless communication software and hardware compliant with some or all of the wireless standards described above. These interfaces may automatically identify and connect with other computers and devices.

In yet another alternative, the data log 1822 may comprise a removable storage element, such as, for example, a memory chip, card or stick, or a movable media (e.g., rotatable media), such as, for example, a floppy disk, or recordable CD or DVD. In these systems, the optional display interface 1838 may also comprise the removable storage element. The removable storage element may communicate with a display device through, for example, a memory reader or drive that transfers or copies data from the removable storage element to a display device.

In some embodiments, the device 1810 receives power from the vehicle through the machine interface 1834. In these embodiments, the internal power source 1830, such as, for example, a battery, "super capacitor," or capacitor, may maintain the optional clock 1826 when the device 1810 is disconnected from the vehicle. Additionally, in some embodiments, the power source 1830 may provide power to the data log 1822 for maintaining the recorded data when the device 1810 is separated from the vehicle or machine. For example, if the data log 1822 includes CMOS memory, the internal power source 1830 may serve as a battery backup for retaining the data.

In some embodiments, the device 1810 may receive power from the display interface 1838 when the device 1810 is connected to the computational platform, display, personal computer, and/or PDA. In some embodiments, the device 1810 may interface a remote clock or timing device that synchronizes to remote time signals. Time may be received from governmental or standards organizations, such as, for example, the National Institute of Standards and Technology and associated radio stations, such as WWVB, or through a wireless network. In some systems, the clock 1826 is calibrated when the device 1810 connects to a vehicle. In other embodiments, the clock 1826 calibrates when the device connects to a computational platform, display, or a network. For example, a Web page, GPS network, or wireless network may provide a timing signal that synchronizes the clock 1826. In these embodiments, an internal power source 1830 may be used to maintain the clock between update events.

Figure 19:
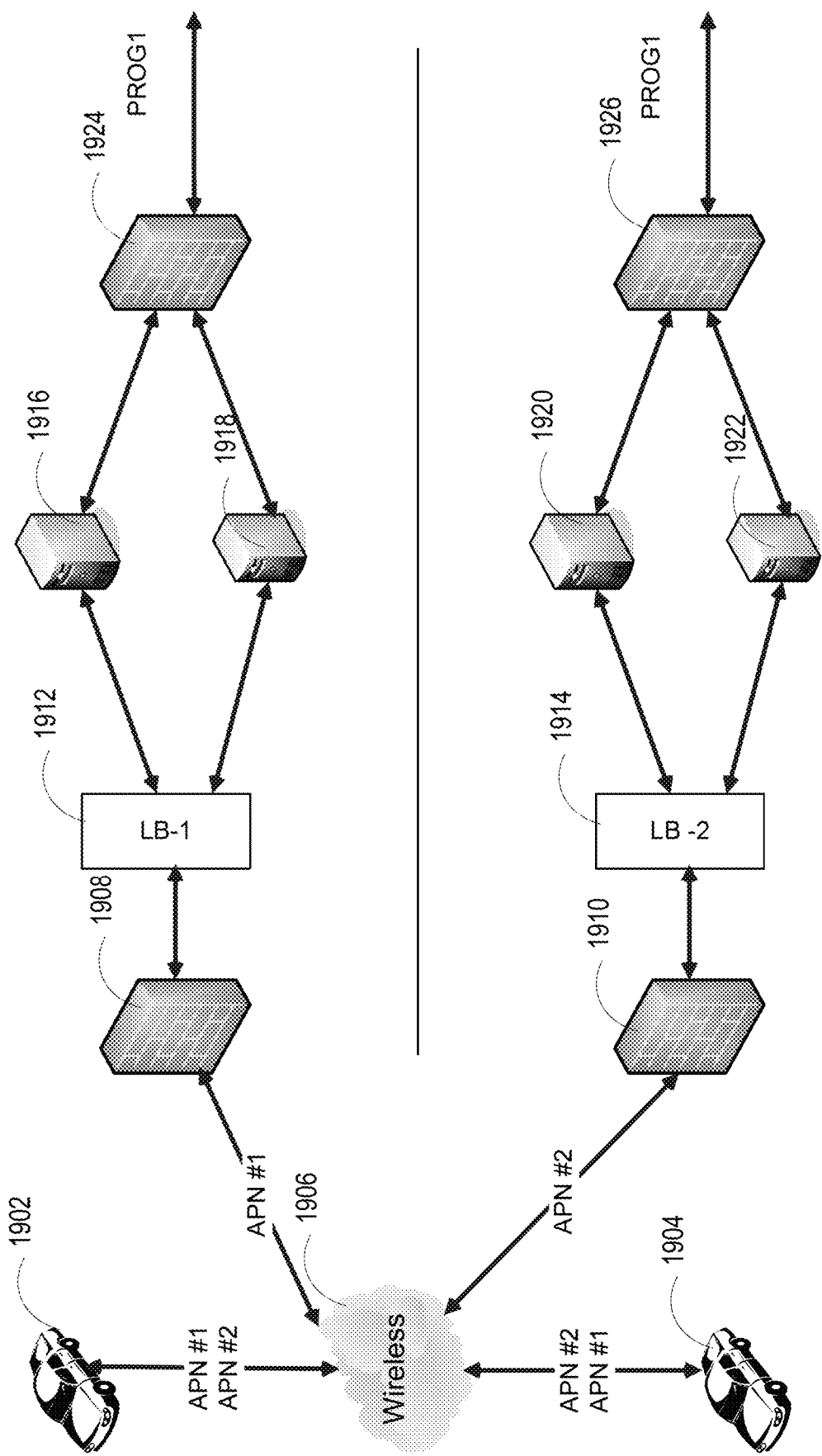
FIG. 19 is a network in communication with a vehicle monitoring device.

FIG. 19 is a network that may communicate with on-board portable mobile devices 300. The host system may comprise two or more trip monitoring servers 1916 and 1918 or 1920 and 1922 (e.g., server farm or clusters) that operate and appear to the on-board portable mobile devices 300 as if they were a single unit. The clusters 1916 and 1918 or 1920 and 1922 improve network capacity through load balancers 1912 and 1914 that spread work (e.g., requests and responses) between the servers 1916 and 1918 or 1920 and 1922. Before a request is parsed and forwarded, it must be passed through a firewall 1908 or 1910 that incorporates filters that allow or deny a request to enter or leave one or more local area networks serving the clusters. A packet filtering may be used to accept or reject packets, including the exchange of short text messages that may be exchanged between the device 300 and the clusters 1916 and 1918 or 1920 and 1922. Some packet filtering may accept or reject packets based on their origin or content.

To access a cluster 1916 and 1918 or 1920 and 1922, the device 300 may access a plurality of Access Point Names (APN) 1902 and 1904 that may interface external wireless network nodes. One of many APNs 1902 and 1904 may be automatically selected based on signal strength and a series of signal exchanges that acknowledge a communication or the transfer of data without an error. The order of selection of an APN 1902 or 1904 may be based on configuration files that are automatically executed by a communication controller or by one or more processors. The configuration files may comprise files (e.g. text files, batch files) that identify the device 300 (e.g., a unique identifier) and/or control the device 300 operating behavior. Commands or priorities in the configuration files may enable or disable features, set limits on resources (e.g., memory allocations, number of sensor outputs that may be monitored, etc.) and extend the functions of the device 300. Device extension may occur by loading device drivers that control or support hardware specific to the device 300 or to a customized use (e.g., monitor specific outputs, derive specific elements, enable or drive an audio, text, and/or video transmission, transmit in a selected wireless protocol, etc.). An exemplary configuration file may be created or modified by an insurer or third party (e.g., in other versions, by the operating system at system installation) at any time, and contain commands that configure the system to establish monitoring (e.g., sample frequency, storage frequency, error tracking, etc.) and/or communication (e.g., sequential protocol detection, network selection, connection conditions, network connection frequencies, file formats, signal monitoring, transfer protocols, etc.).

System installation may set up applications in the device 300 to monitor a vehicle 1902 or 1904 and communicate with remote destination(s). When a voltage threshold is detected or reached (or the unit 300 identifies the desired vehicle), an initialization file containing information about the initial configuration of the device 300 may be executed by a communication controller or one or more processors of the device 300. The initialization file may include commands that determine the source and transmission protocol of the physical or virtual in-vehicle data bus. In-vehicle bus protocol may be identified through a sequential handshake. The device 300 may cycle through a plurality of protocols by transmitting requests in different protocols while waiting for a valid response. When a valid response is received, the communication controller or processors may store the identity of the validated protocol (or if more than one protocol is used, store the identity of the valid protocols) in a cache or a non-volatile memory and loads software routines (or a Basic Input/Output System, BIOS, from a non-volatile to an operational memory) that support data transfer or exchanges between the device 300, the vehicles 1902 and 1904, and input/output nodes. Some devices 300 may synchronize an internal timing device or clocks to an in-vehicle clock. In other devices 300, clock synchronization to the vehicle does not occur when the internal timing devices synchronizes to local time maintained on the out of vehicle networks (e.g., external networks).

When a connection is established between the device 300 and the in-vehicle data bus, the initialization file may request vehicle attributes and manufacturers' data. Some systems may request Vehicle Identification Numbers (VIN) through the in-vehicle bus. A VIN may establish a manufacturer, assembly location, and vehicle characteristics, such as the engine, transmission, differential ratio, year, make, model, and/or a unique vehicle identifier of that vehicle. The initialization file may also establish other defaults and/or user preferences that may be edited, modified, or updated by the operating system or through software releases and/or updates from the insurer or third party.

Before a device 300 initiates a connection with an external network and then a session with a content provider (e.g., an insurer or third party), it may select between multiple wireless nodes. In some cellular applications, one or more nodes may support a Wireless Application Protocol APN and other node(s) may support a World Wide Web APN. The Wireless Application Protocol APN may provide access to known destinations and/or information services provided to the users of that proprietary network. World Wide Web APN may provide access to known destinations and any content (or server) accessible through a publicly accessible distributed networks like the Internet.

Upon an initialization event, after a synchronous period (e.g., after a predetermined time such as twenty-four hours from a plug-in event), and/or an asynchronous event (e.g., a trigger event), a wireless connection may be made and a session established between the device 300 and the external wireless network. When established, the device 300 may synchronize its internal timing device or clock (e.g., time of day, date, and/or month) to the time, date, and/or month maintained by the external network. In some networks, including cellular networks, data exchanges may occur through wireless control protocols, wireless encryption protocols, and/or other communication protocols. Wireless control protocol and a wireless transaction facilitator may control the communication throttle (e.g., transmission rates across the network) based on the available bandwidth of the network. Programming and instructions stored in non-volatile memory (e.g. firmware) may be updated through a wireless control protocol and/or a wireless transaction facilitator.

A dynamic memory allocation processor or a dynamic memory allocation process may allocate memory to maintain existing firmware (e.g., a legacy version that may include startup routines, input/output instructions, etc.) when updated firmware is transferred to the device 300 through a physical or virtual link. If a device self-diagnostic or an error-detection coding detects an error during storage or transmission, the legacy firmware may be automatically restored and the device 300 may be reset to the preferences and defaults observed before the unsuccessful update. When an error correction coding is used, a detection and correction of errors may be made during the transfer or installation of the firmware to assure an error-free version is stored or installed within the device 300. The update may be installed or the legacy firmware sustained before the memory allocation processor or the dynamic memory allocation process de-allocates the memory retaining the uninstalled or inactive version of the firmware to free the previously allocated memory.

An APN selection may select one of two private front end branches that comprise substantially similar or identical processing functions in FIG. 19. Firewalls 1908 and 1910 allow or deny entry to or exit from the local area network. Load balancers 1912 and 1914 pass commands, firmware, and/or data between two or more trip monitoring servers 1916 and 1918 or 1920 and 1922 (e.g., to improve throughput and response times). The servers 1916-1922 may support wireless control protocols (e.g., a Web service), wireless encryption protocols, a wireless transaction facilitator, a Short Message Service (e.g., a Web service that may support up to about 160 characters) and other communication facilitators and protocols. The device 300 and servers 1916-1922 may be File Transfer Protocol compliant to support the download firmware to or upload files from the device 300. Firewalls 1924 and 1926 may secure the middle tier and backend networks shown in FIG. 21 from the front-end networks shown in FIGS. 19 and 20.

Figure 20:
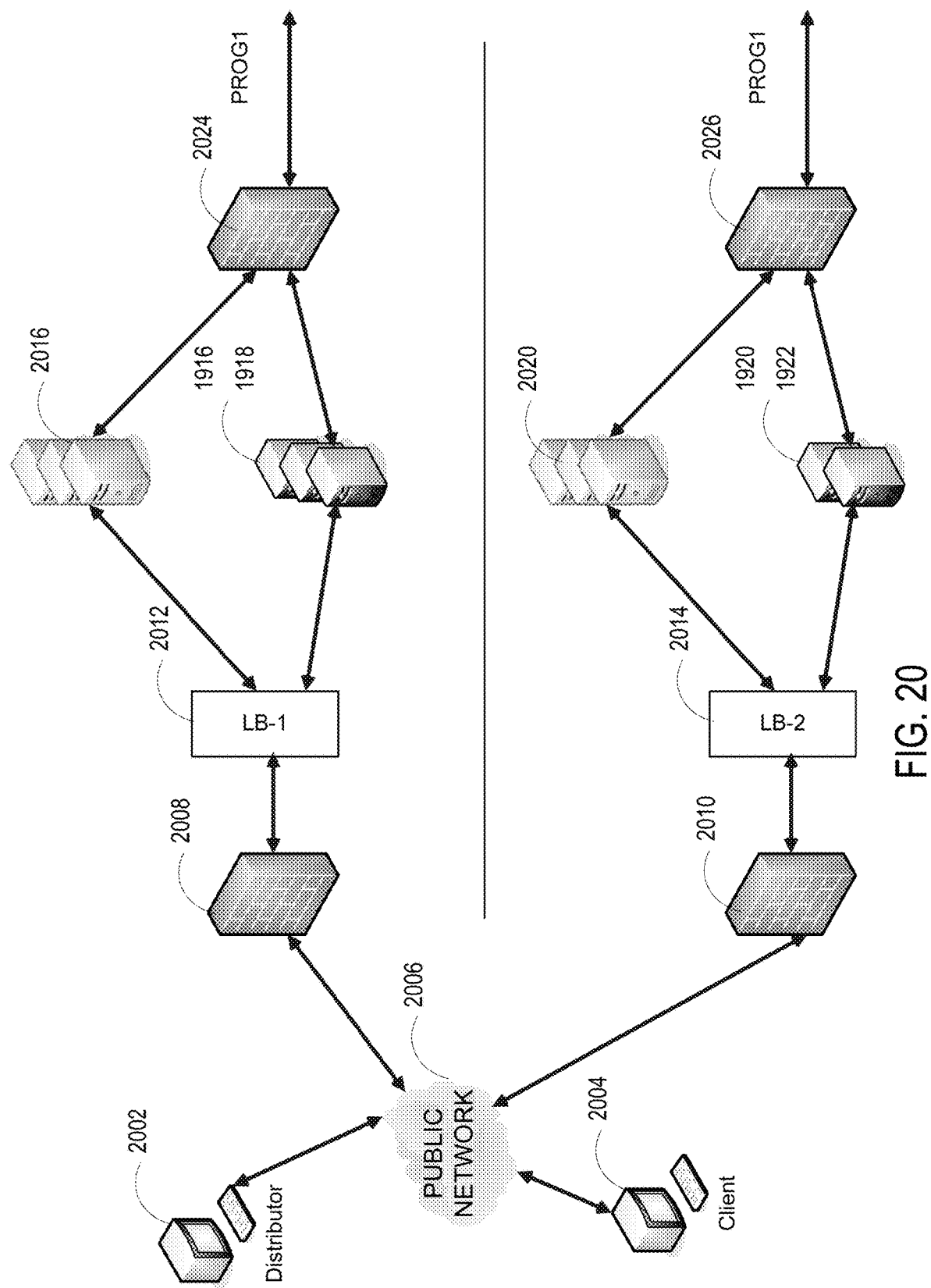
FIG. 20 is a network in communication with remote clients.

A client may access a similar network of firewalls, load balancers, and servers 2008-2026 shown in FIG. 20. Through a publicly accessible distributed network 2006, distributors 2002, customers 2004, and other authorized users may transmit requests, and receive, parse and render responses from an on-line services cluster 2016 and 2020 (that may communicate through Web services) and/or Trip monitoring servers 1916-1922. Some response may include scripts that display responses in a common window where the request originated or in a different window. Some presentation choices may be made by the user, by a selected link, or may be made as a result of a response as described through this written description. Some responses contain scripts that may cause an output to be rendered in a different visual window. In some instances, such as when output highlights safety or cost content, a separate visual window may be rendered to attract the user's attention or focus. The impression characteristic of a response (e.g., choice of fonts, color, graphics, positions, animations, styles, etc., may indicate a designator of source) may be selected by or tailored to a sender's desired format at the server-side (e.g., through an active server page).

Figure 21:
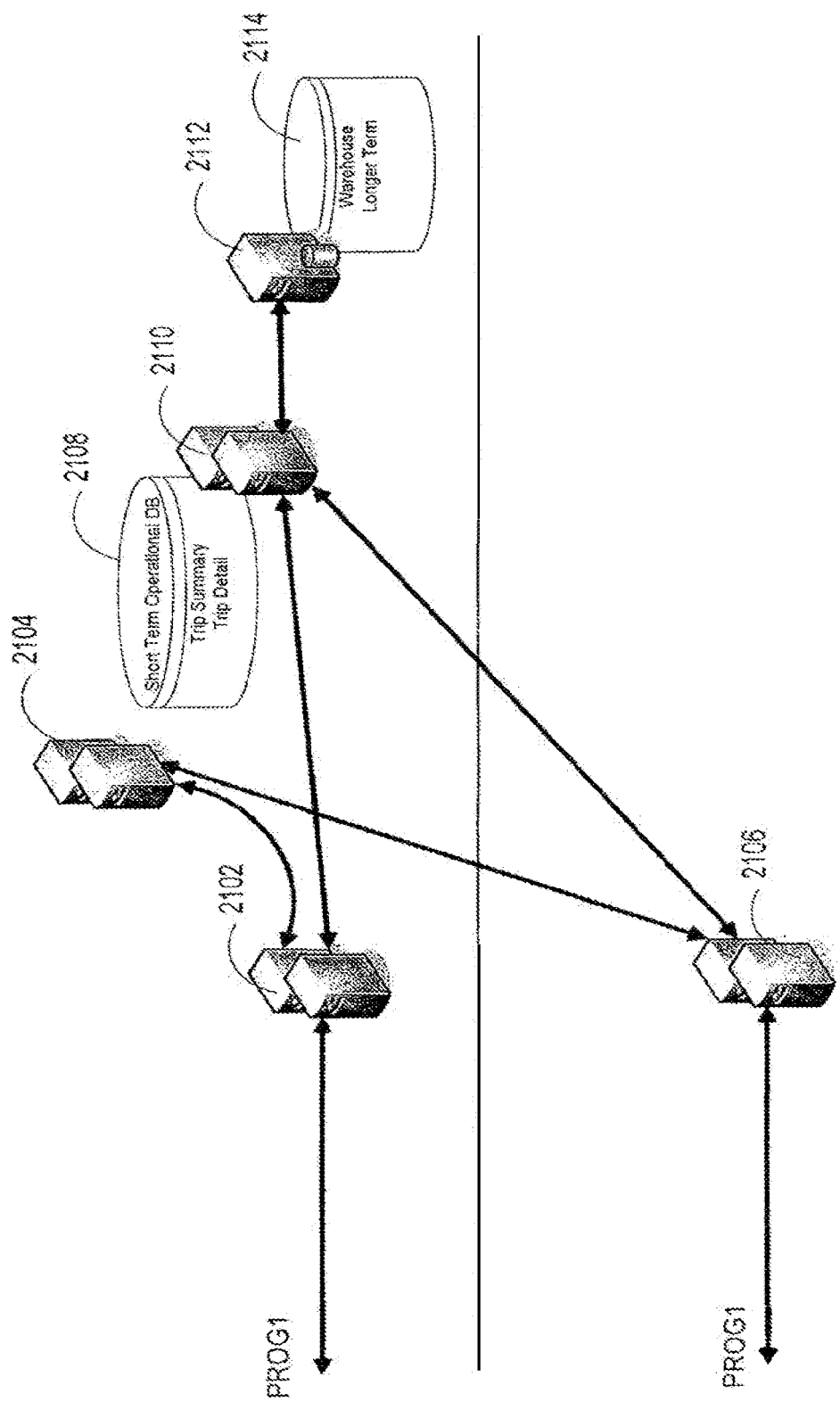
FIG. 21 is a backend of a network based risk management system.

Two or more application servers (e.g., clusters) 2102 and 2106 may reside in the middle-tier of the server centric architecture. The servers 2102 and 2106 may provide middleware service for security and maintenance. In FIG. 21, the application servers 2102 and 2106 are wireless transaction facilitator and device data transform compliant. In some systems, the middle tier servers 2102 and 2106 may comprise batch servers serving as a first location in which the raw data elements, calculated data elements, and/or derived data elements may be temporarily stored, locally or across a distributed storage devices or database(s) 2108. For longer term storage or data analysis, data may be retained in database(s) 2108 and 2114 (e.g., relational databases that may comprise one or more flat files (2-dimensional arrays) that may be transformed to form new combinations because of relations between the data in the records or other databases, such as hierarchical databases that retain searchable indices that reference distinct portions within that database and/or other storage devices or databases accessible through an archive file server 2104 and/or a database management server. A parallel database system (not shown) may be accessed by one, two, or more processors that may service database management requests, such as structured query language, transaction logging, input/output handling, and data buffering. It may provide quick access to databases across multiple storage devices.

While a data warehouse may be distributed across several servers and may contain several databases and information from many devices in multiple formats, it also may be accessible through a backup server 2112 as shown in FIG. 21. Access to the data warehouse 2114 may be transparent to the user, who may use commands to retrieve and analyze all the data, details, metadata, summaries, etc. The data warehouse 2114 may include data about the organization of the data warehouse 2114, where the data or information may be found, sources of the data, and any relationships that have been automatically or manually established between data.

Figure 22:
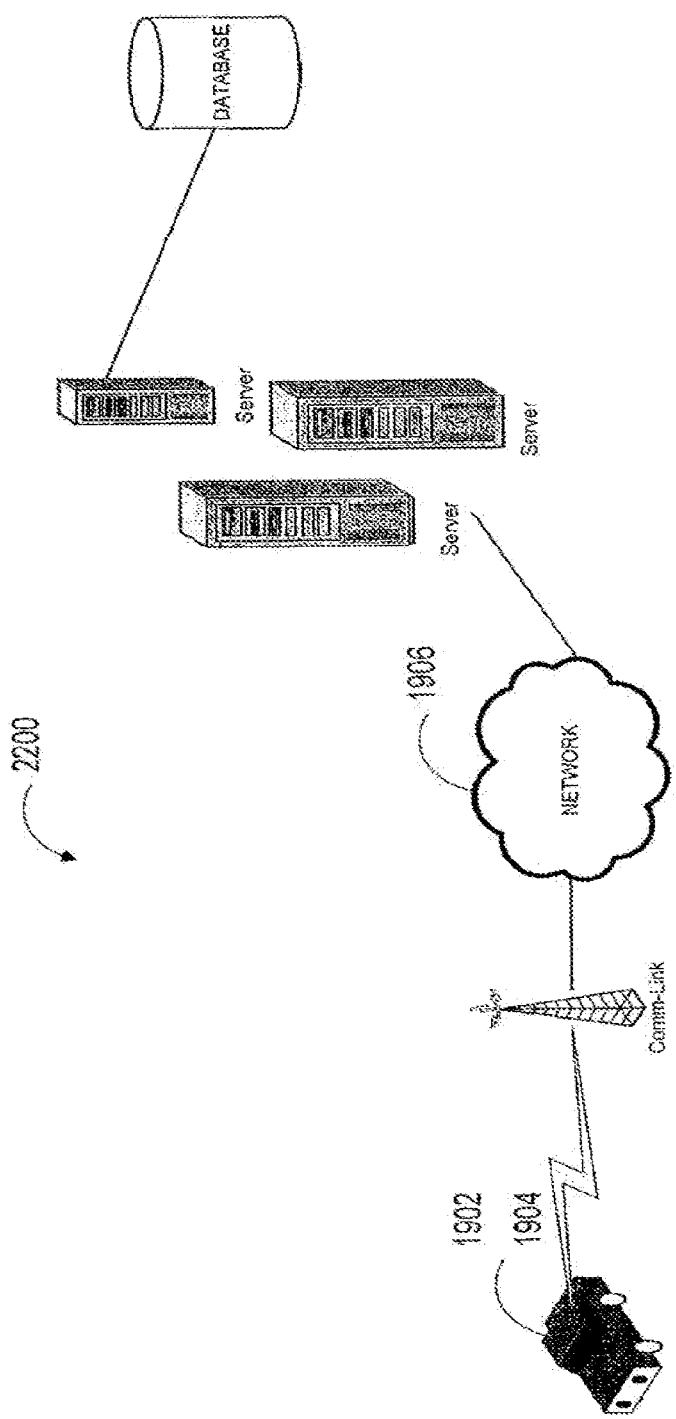
FIG. 22 is a risk management system communicating with a vehicle monitoring device.

FIG. 22 is a high level view of an alternative risk management system 2200 that may communicate with the device 300 through a wireless medium. The device 300 may communicate with an insurer or other entity (through a publicly accessible or privately accessible distributed network) through transceivers (e.g., transmitters or receivers), antenna signaling controllers and base station controllers. Some exemplary communication may occur because of a:

| Call Reason | Description |
| --- | --- |
| Schedule | Through the configuration file, the device 300 may call at synchronous intervals (e.g., a programmable or repeatable period) and/or after asynchronous events (e.g., after each "trip," after a number of "trips," etc.). |
| Short Message Service Page | A non-speech alert received from an insurer or other entity. |
| Device Failure | A hardware and/or software failure occurs. |
| Memory Threshold | Memory use approaches or exceeds a programmable threshold (e.g., a percentage of a capacity). |
| Power-up | When the device 300 receives power. |
| First Detection of Protocol | After device initialization (e.g., source voltage exceeds a programmable threshold, a vehicle is detected, a vehicle protocol is detected, etc.). |
| Speed Delta Threshold | For a fixed or variable programmable period, a difference in sequential speed readings exceeds a programmable threshold. |
| International cell | The device locks to or interfaces an "international" cell or wireless site. |
| Callback | If a call is interrupted or the device 300 may terminate communication to respond to a request (e.g., install a firmware upgrade). The device 300 may report the status of the last command the device 300 executed during the subsequent communication or later call. |

20

Information that may be transmitted through the wireless medium to an insurer or other entities (such as their Web site or private server or cluster) may include:

| Parameter | Description |
| --- | --- |
| Identifiers | A wireless network identifier (e.g., may be retained in a portable subscriber identity module within the device 300 that identifies a unique user account to a wireless network, may handle device 300 authentication, and may provide data storage) |
| Firmware Versions | May include version numbers of one or more processors, firmware, wireless or cellular site protocol, vehicle protocol, and/or GPS versions, etc. |
| Vehicle Protocol | The protocol the device 300 uses to communicate with the vehicle. |
| Vehicle Identification | Vehicle Identification Number |
| Mileage | Distance traveled (e.g., may comprise an end of a trip odometer reading or a discrete measure of distance a user may travel for each trip). |
| Memory Use | Memory currently in use. |
| Call Reason | Why a device 300 is communicating with the insurer or other entity |
| Signal Strength | Magnitude of a desired electric field at a reference point. |
| Trip Identifier | A marker of some type (e.g., a flag) that identifies when a vehicle's engine is started. |

A list of some of the commands that an insurer or other entity may send to the device 300 and some of the expected results may include:

| Command | Result |
| --- | --- |
| Upload (!UL) | The device 300 may transmit complete trips and events recorded by the device 300 since a last memory clear command was executed. The data may include a calculated value to test data (through a sequential combination) to detect errors during transmission and/or storage. Some systems data may be encoded through an error-correction encoding that allows the detection and correction of errors that may occur during transmission. |
| Update (!UD) | The device 300 may be given a type and filename for firmware and/or configuration files(s) that may be downloaded into the device 300. Through some update processes, the device 300 may disconnect from content or other provider (e.g., an insurer or other entity) and connect to another server to download the firmware and/or configuration files to update the device 300. |
| Run Diagnostics (!DG) | Initiates one or more diagnostic tests that one or more processors may perform (e.g., a main processors, wireless processors, vehicle interface processors, and/or GPS processor, etc.). If requested, the success or failure may be transmitted to the insurer or entity. |
| Memory Clear (!MC, !MC0, !MC1, !MC2) | The memory clear commands clear the content retained in local memory of the device 300. Some commands will restore the device 300 to a default others may clear memory to different initialization levels (e.g., !MC may clear only existing trip data). |

-continued

| Command | Result |
| --- | --- |
| Reset (!RS) | Resets the device 300. If a multiprocessing architecture, parallel processing architecture, coprocessor architecture, or modular architecture is used in the device 300, a rest command may reset each or selected processors or modules. |

When an upload command is received, the device 300 may transmit information to a destination (e.g., an insurer or entity). Each response may be unique to a request. Some of the information that may be transmitted by the device 300 may include:

| Information | Description |
| --- | --- |
| Upload date and time: | The date and time the device started the upload to insurer or entity. (Always provided in some applications). |
| Trip start time: | The date and time that a trip was started. (Only provided if a trip has been made since the last memory clear in some applications.) |
| Duration and speed: | For each duration, (e.g., may be configured for a synchronous interval, e.g., about every 1 second) the speed in kilometers (or miles) per hour. |
| Trip end time: | The date and time that a trip ended. (For each trip stored in local memory, the information may include a trip start value, trip details, and a trip end value in some applications) |
| Connect event: | The date and time the device 300 was connected to the vehicle. This is when the device gets power from the vehicle or is in communication with the vehicle. (May be recorded once until the next memory clear command is received in some applications.) |
| Disconnect event: | The device 300 may record a date and time stamp with the stored data at synchronous intervals (e.g., a predetermined time period such as every 5 minutes). The time stamp may be stored in non-volatile memory (e.g., flash memory) when the device is in communication with the vehicle, receives power from the vehicle, an ignition or speed event is detected, etc. |
| Protocol event: | The protocol that the device 300 is using to communicate with the vehicle. (In some applications, this event may only occur after the first ignition cycle or the starting of the vehicle and may be cleared when a memory clear command is received). |
| Specific events: | A - Processor-version, On Board Diagnostic-version, Global Positioning System-version<br>B - Wireless (e.g., cellular) connection failure<br>C - Data connection failure on wireless network<br>D - Unable to contact destination<br>E - Firmware, software, and/or configuration file(s) access failure<br>F - Checksum failure (e.g., firmware, software, configuration files, etc.)<br>G - Network "roaming"<br>H - Memory threshold event<br>I - Unknown trip log file entry<br>J - Unknown event log file entry<br>K - Number of records transmitted not equal number of records stored<br>L - Battery voltage exceeds alternator threshold, in-vehicle communication enabled<br>M - In-vehicle communication terminated due to an ignition off event |

The parenthetical information included in the table above reflects exemplary guidelines that enable an efficient exchange of data and/or software. The frequency at which information, data, etc., and inclusion of objects will change in alternative implementations.

In some systems, the following settings may be configured in the device 300.

| Setting | Description |
| --- | --- |
| Profile Name | The name of this configuration file reported when the device 300 calls or transmits to a destination. |
| Checkin Interval | The number of hours the device 300 should wait until it calls a destination for a scheduled call. A predetermined value (e.g., of "0") may indicate the device 300 should call the destination after a trip has been completed. |

-continued

| Setting | Description |
| --- | --- |
| GPRS Retry Count | Number of times the device 300 should try to connect to a destination if a communication failure occurs. |
| GPRS Retry Pause | The amount of time (e.g., number of minutes) the device 300 should wait before retrying to connect to destination |
| Port Read Frequency | The amount of time (e.g., number of seconds) the device 300 should read information during a trip. |
| PortRead Multiple | Based on the above Port Read Frequency, how many samples should be stored in memory for the trip. |
| Speed Threshold | Speed in kilometers (or miles) per hour; the device 300 may use this parameter to initiate call home event. |
| On Net MCC/MNC | Defines up to a predetermined number (e.g., 10) of networks that may be considered "non-roaming" networks. |
| Apply OnNet | For each call to a destination, represents the number of times the device 300 may call a destination if roaming. |
| APN | Up to a predetermined number (e.g., 10) of APN or wireless nodes the device should cycle through when attempting to connect to a wireless network (e.g., a cellular network). |
| WCP Name | The domain name service that should be used to contact the Wireless Communication Protocol server or other server to reach a destination. |
| WCP Port | What Transmission Control Protocol/Internet Protocol port that may be used for communications. |
| FTP Name | The domain name service name for the FTP server at the destination used to download firmware and/or configuration files. |
| FTP Username | Username to login to the FTP Server |
| FTP Password | Password to login to the FTP Server |
| FTP Directory | The directory that the files are located |

A block diagram of an alternative on-board portable mobile device 300 that may communicate with in-vehicle local processor(s), controller(s), and/or directly with sensors is shown in FIG. 23. The device 300 may store executable programs, configuration files, and vehicle based data. The data may include raw data elements, calculated data elements, derived data elements, and/or subsets of these elements.

In FIG. 23, the usage based monitor or device 300 comprises two or more processors that execute multiple tasks (through programs or instructions sets) in tandem. Each processor may work on a different instruction set or different part of the common process of monitoring vehicle operation and/or driving behavior. While the functions assigned to each processor may occur dynamically (assigned by the main processor 2302 and software), in FIG. 23 the functions are pre-assigned. The processors 2302-2308 share a local and/or distributed memory 2310 and 2316 and an input/output bus or data path. In some systems, the device 300 may have an asymmetric like architecture.

A single copy of the operating system and configuration file(s) may coordinate program execution in the device 300. In alternative devices 300, each processor may have its own operating system and/or memory, and in some cases, share memory and interconnected data paths used to exchange data, receive firmware, or configuration files. The coordinated processing of the architecture increases speed or computing power, like a parallel processor or co-processor architectures used in other alternative devices 300.

To monitor vehicle operation or driver behavior, a main processor 2302 may coordinate the wireless processor 2304, in-vehicle communication processor 2306, and optional location processor 2308. In some devices 300, the main processor 2302 may access the entire memory map and execute applications in support of its input and output nodes. The input/output nodes may include an optional video 2312 node, audio node, and/or tactile node 2314 that transmit video, sound, and output perceptible to a sense of touch, respectively. The transmitted media may be transmitted directly to a user or conveyed through an in-vehicle system (through in-vehicle amplifiers and loudspeakers, for example).

In FIG. 23, the main processor 2306 and/or firmware may offload an out-of network communication component to the wireless microprocessor 2304. The wireless microprocessor 1204 and transceivers 2318 may be compliant with one or more wireless protocols that include the transceiver protocols described above. In some systems, the wireless microprocessor 2304 may comprise a single-chip cellular (or wireless) baseband processor that may be GSM ("Global System for Mobile Communication" that may include enhanced data rates for GSM Evolution (EDGE)) and/or GPRS (General Packet Radio Service) and/or CDMA (Code Division Multiple Access) compliant. Some single-chip cellular processors include a power amplifier controller and speaker-phone/car-phone audio circuitry that may drive the audio output 2314. Some of the single-chip cellular processors contain all analog and digital GSM, CDMA, and/or multi-slot GPRS baseband processing functions within the single chip. Interface software, circuitry, and drivers are integrated in the single-chip cellular (or wireless) processor to enable auxiliary components, such as microphones, loud speakers, display devices or screens, keypads, data terminal equipment and SIM modules (or other memory modules) to connect directly to the wireless microprocessor 2304. A flexible baseband control interface supports a wide range of transceivers, including GSM850, E-GSM900, GSM1800 and GSM1900 frequency bands.

In-vehicle communication may be offloaded to the in-vehicle processor 2306 and transceivers 2318 that may include one, two, or more embedded antenna element(s). The embedded antenna element(s) may be configured and mounted such that a portion of an upper surface, adjacent surface, or an entire upper or adjacent surface of the device 300 may be part of the radiating element (and/or the receiving element). In alternative systems, the antenna element is configured and mounted such that, once the device 300 is fully assembled, the device case itself or portions of it may be used as part of the radiating and/or receiving element. In some systems, the embedded antenna may utilize integrated circuit board designs and connecting links without additional parts. Since some embedded antenna elements are not be buried or embedded between other circuits in some alternative devices, these antenna elements may better control radiation patterns. The in-vehicle processor 2306 and transceivers 2318 may be compliant with one or more in-vehicle communication standards that may include the in-vehicle protocols described above. An optional navigation component may be offloaded to a location processor 2308 (or global positioning processor). The location processor 2308 may be compliant with one or more navigation protocols that may include the location protocols described above.

Figure 24:
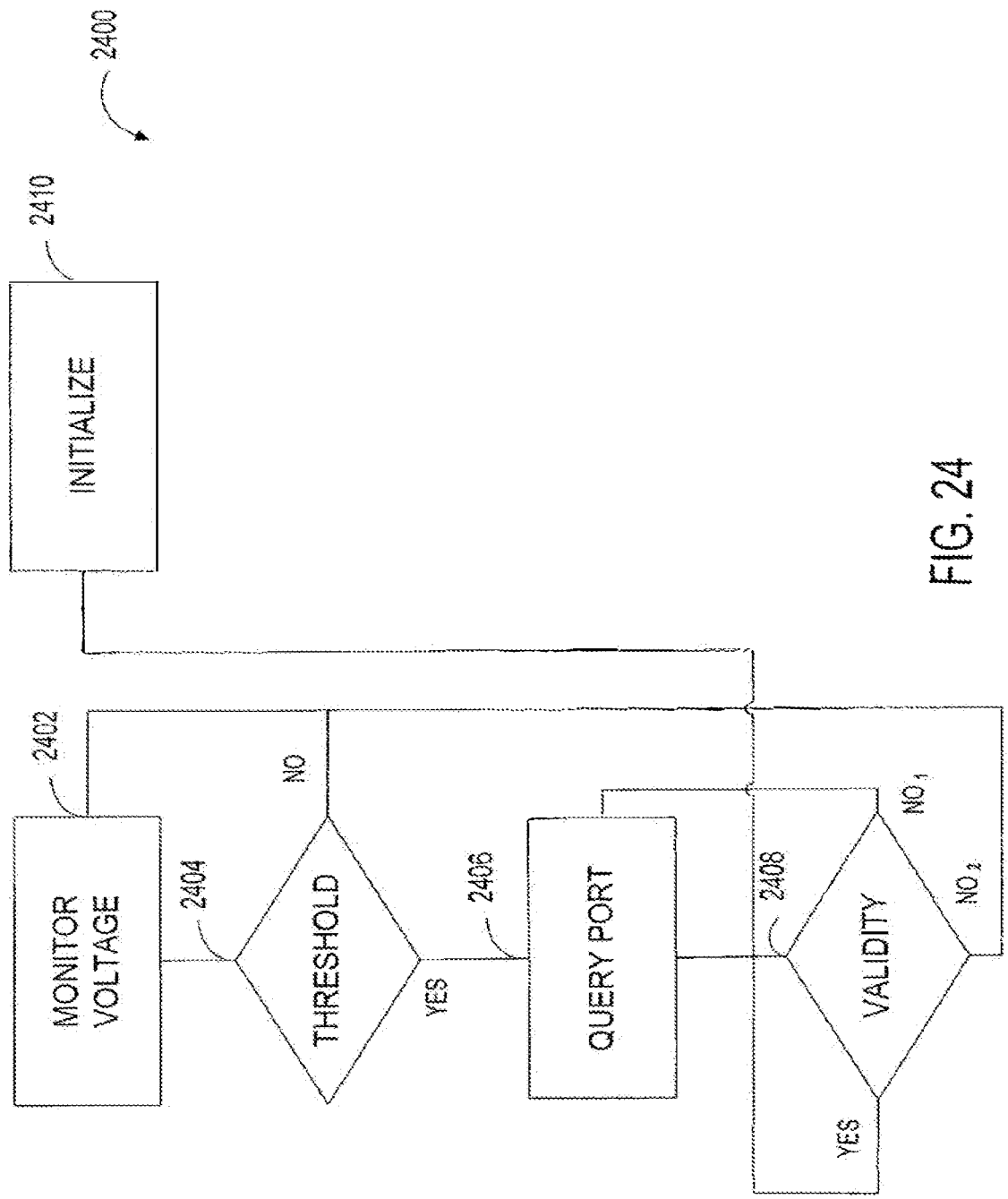
FIG. 24 is an initialization process.

FIG. 24 is an initialization process 2400 that may be implemented through an initialization file. The initialization file may include the hardware configuration information necessary to interface a vehicle and information about the initial configuration of device-based data exchanges. At 2402 and 2404 a vehicle voltage is detected and compared to a programmed threshold (e.g., falls below a threshold in alternative devices 300). When the vehicle voltage exceeds the programmed threshold, a request is transmitted at 2406 across a vehicle bus while waiting for a response at 2408. When a valid response is not received, the process repeats the cycle by sequentially transmitting signals in different vehicle bus protocols at 2406 and 2408. A response may be compared against a list of valid response, and if the process detects a match at 2408, software that supports data transfer or exchanges between the device 300, the vehicle, and a remote destination is loaded into operating memory. With a validated response, vehicle attributes and manufacturers' data requests are transmitted across a vehicle bus. Defaults and/or user preferences within the device 300 may be established.

Figure 25:
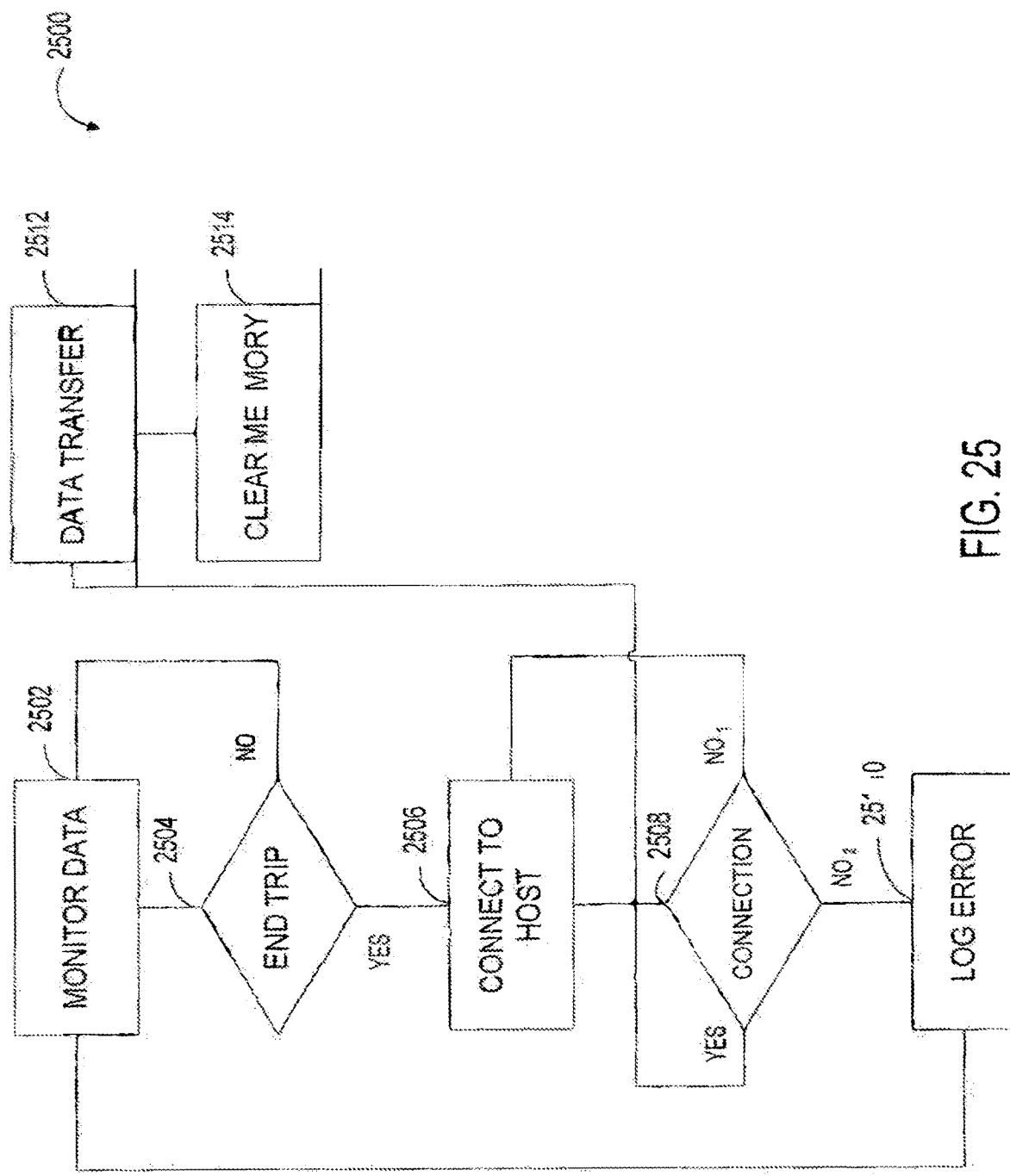
FIG. 25 is a process in which a vehicle monitoring device communicates through a network.

FIG. 25 is a process 2500 in which a device 300 transfers data to a destination. The destination may be associated with an identifying number or may be contacted by specifying or detecting a communication protocol. The data migration from the device 300 to the destination (e.g., an insurer's or entities privately or publicly accessible site) begins when data is not being recorded (e.g., in other devices 300, data transfer may occur at anytime). That may occur at the end of a trip at 2502 and 2504. The process 2500 may automatically cycle through a programmable number of APNs or wireless nodes as the process attempts to connect to a wireless network at 2506 and 2508. If a connection fails, an error is stored at 2510 while the process waits to monitor additional data or reconnect to the network at 2502 and/or 2506. When a connection occurs, the process 2500 transmits an identifier to the network that identifies a unique user account. The identifier may include a device 300 authentication.

When a connection is established and a destination acknowledged at 2508, automated scripts or programs may attempt to transfer data from the local memory of the device 300 to a remote memory at a destination (e.g., such as an insurer or other entities' site) at 2512. In some processes, a method encodes data before the transfer so that errors that may occur during storage or transmission of the data may be detected (e.g., error-detection coding). In alternative processes, the method encodes the data before the transfer to allow for the detection and correction of errors that may occur during storage to or transmission (e.g., error-correction coding). Error codes that correlate to a fault (e.g., error codes that may identify corrupted data, failure to contact a destination) may be stored locally or at the destination and a diagnostic test performed at the request of the destination (e.g., the insurer's or entity). If a data migration is successful, a memory clear command may be received from the destination that directs the device 300 to clear some or all of the local memory at 2514.

Figure 35:
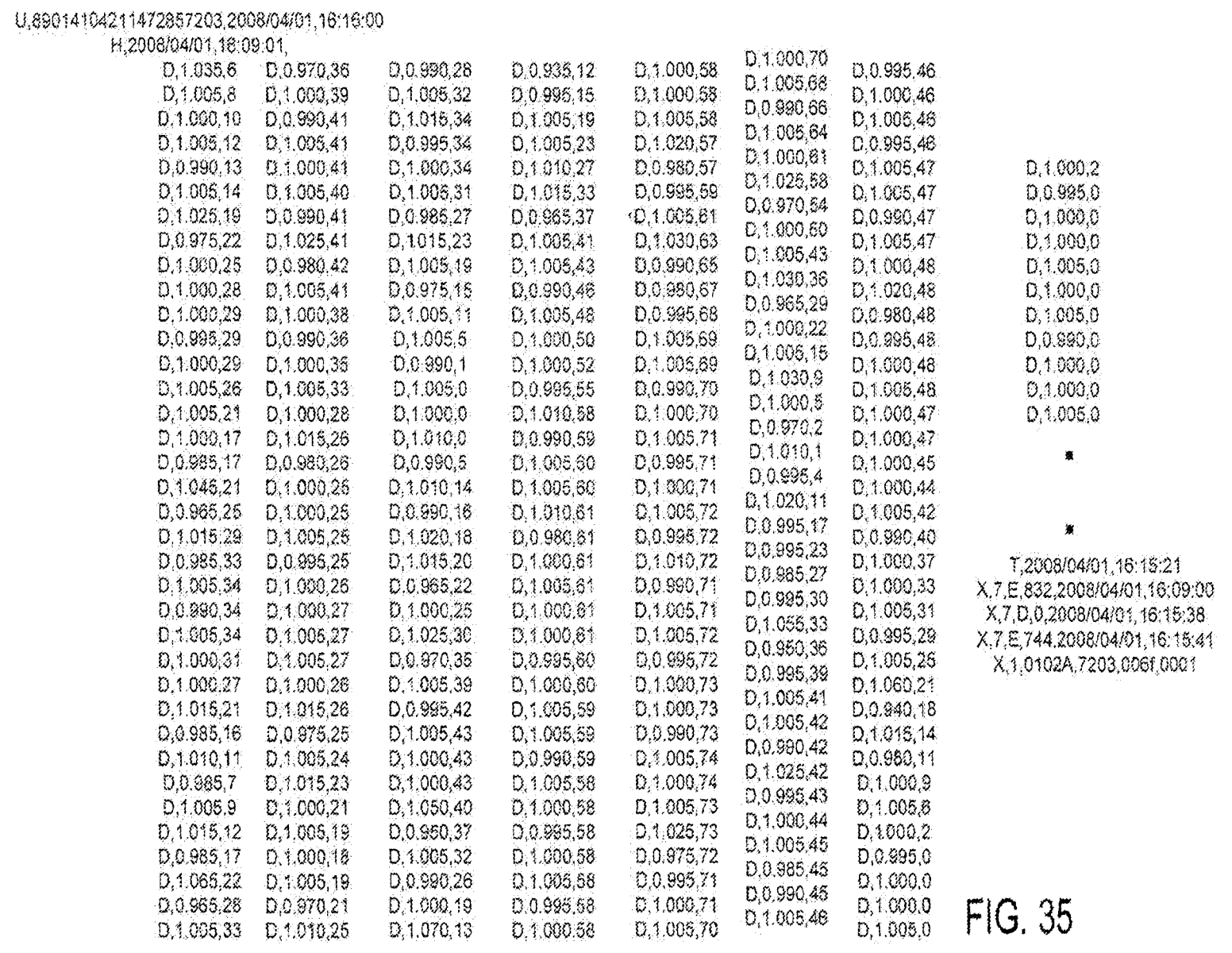

An exemplary record that may be transferred to an insurer's or other entities destination may look like the text file shown in FIG. 35. The data may comprise a single file with the more recent entries appended to the end of the file or separated into distinct files (such as an operational log, an error log, trigger log, etc.) that includes user specific information. A device log analyzer that may be resident to or distributed across the application servers 2102 and 2106 and/or archive servers 2104 of FIG. 21 may parses the log files and derive indicators about vehicle operation, driving behavior, or other usage based metrics. Documents and/or reports may be transmitted to remote interfaces. Alternatively databases or database management servers may parse the log files, derive indicators, and in some systems generate reports through server-side scripts.

The exemplary pages of FIGS. 9-17 and 30-34 may be derived by device log analyzers and/or database management servers. An exemplary explanation of the entries shown in FIG. 35 explains that

| Entry | Description |
|---|---|
| U, 89014104211472857203, 2008 Apr. 1, 16:16:00 (Name of transferred file) | |
| 89014104211472857203 | A unique user account to a wireless network that may handle device authentication |
| 2008 Apr. 1, | Date the log was uploaded |
| 16:16:00 | Time the log was uploaded |
| H, 2008 Apr. 1, 16:09:01 (Header) | |
| 2008 Apr. 1, | Date trip was started (e.g., date/time based on wireless network) |
| 16:09:01 | Time trip started |
| D, 1.000, 10 (Detailed record: time & speed) | |
| 1.000 | Frequency in time (seconds) from last monitored parameter (e.g., speed) |
| 10 | Speed value (e.g., raw data element in kilometers per hour) |
| T, 2008 Apr. 1, 16:15:21 (Trailer record identifying the end of a trip) | |
| 2008 Apr. 1, | Date trip was ended (e.g., date/time based on wireless network) |
| 16:15:21 | Time trip ended |
| X, 7, E, 832, 2008 Apr. 1, 16:09:00 (Found Battery voltage above alternator threshold) | |
| 832 | Measure of battery voltage |
| 2008 Apr. 1, | Date of measurement |
| 16:09:00 | Time of measurement |
| X, 7, D, 0, 2008 Apr. 1, 16:15:38 (Disabled communication after communication stopped due to an ignition off event) | |
| 2008 Apr. 1, | Date when communication was disabled |
| 16:15:38 | Time when communication was disabled |
| X, 7, E, 744, 2008 Apr. 1, 16:15:41 (Found Battery voltage above alternator threshold) | |
| 744 | Measure of battery voltage |
| 2008 Apr. 1, | Date of measurement |
| 16:15:41 | Time of measurement |
| X, 1, 0102A, 7203, 006f, 0001 (Versions & identifiers) | |
| 0102A | Main microprocessor version |
| 7203 | Wireless microprocessor version |
| 006f | In-vehicle communication identifier |
| 0001 | Global Positioning Sensor version |

Figure 26:
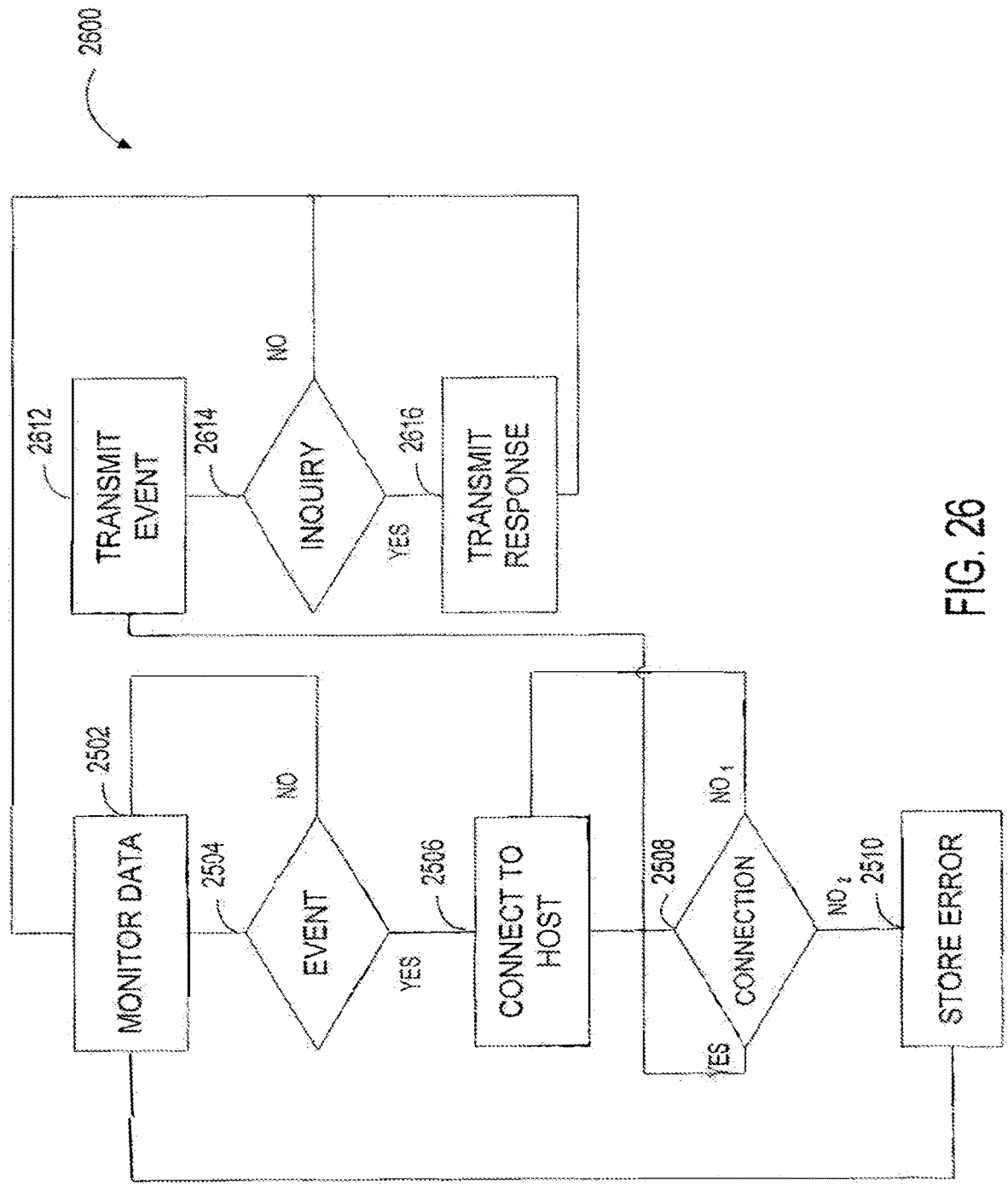
FIG. 26 is a process where a vehicle monitoring device communicates in response to an event.

When a trigger event occurs, a connection through a wireless network is made and an interactive session begins with an entity or insurer at 2502-2508 or an error logged at 2510. In FIG. 26, a trigger event may direct the destination to perform an action. The trigger event may be automatically evaluated at the destination (and in some alternatives, by the device 300). In some circumstances additional data or information may be needed. When needed, the destination may issue a command that causes the device 300 to receive, parse, process a request, and transmit a reply at 2616 (if resolved locally, cause the device to harvest additional information). If the trigger event relates to a safety concern, the destination (or device 300) may automatically seek assistance by sending a message or another alert to a call center, medical center, technical center, or initiate another action. If a trigger event relates to an operational concern, the destination may issue diagnostic or repair commands or firmware updates that may diagnose or repair the device 300 (and/or vehicle in alternative processes).

Figure 27:
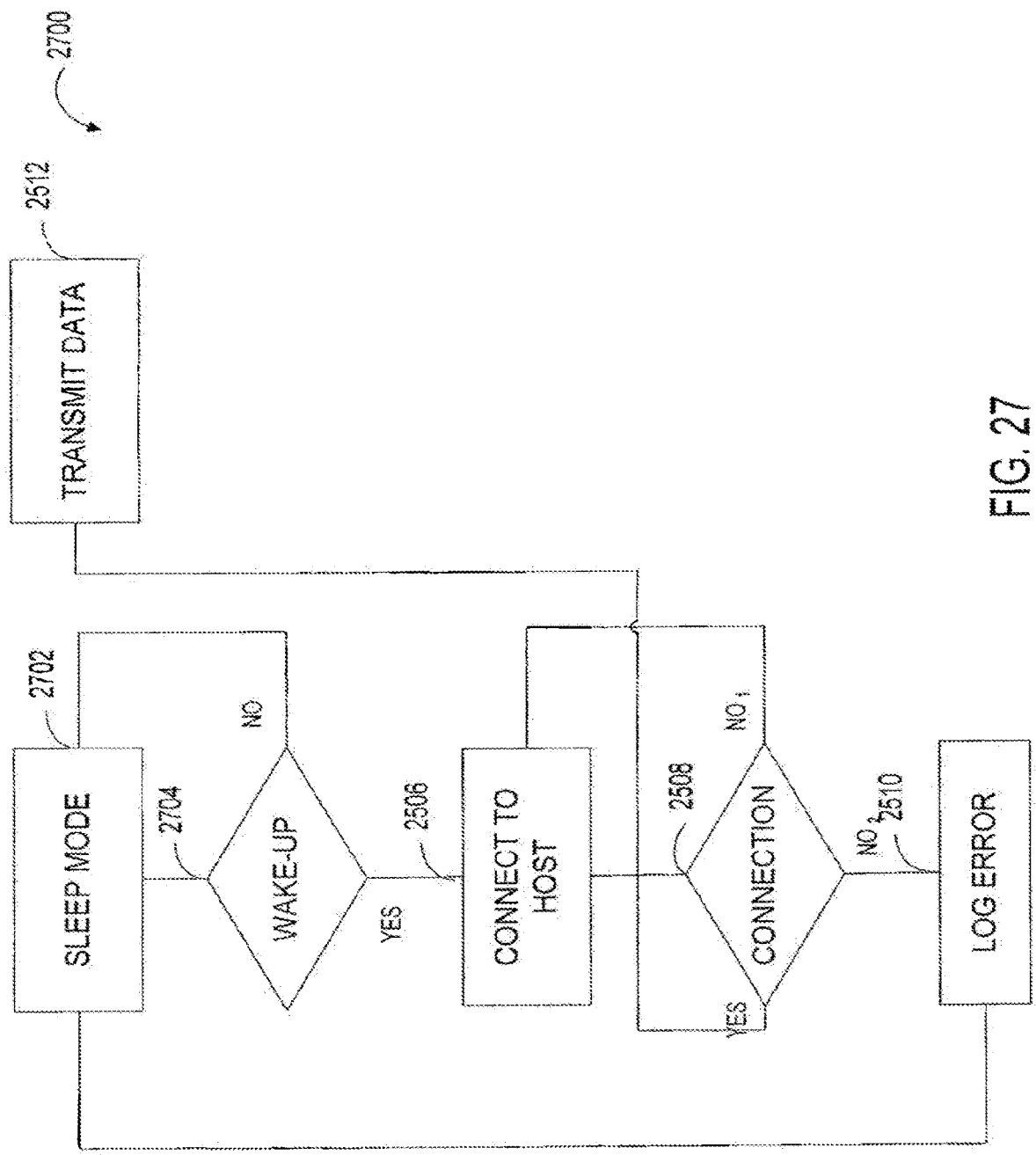
FIG. 27 is a power management process.

When no activity is detected through an in-vehicle bus or out of vehicle network or motion or changes in engine load are not detected (e.g., through a motion sensor, manifold absolute pressure sensor, or another sensor that may detect changes in engine load or speed), the device 300 may reduce power consumption by powering down the physical-layer circuitry to enter a sleep mode at 2702 of FIG. 27. When an in-vehicle or out-of vehicle activity or request is detected, the device 300 may automatically negotiate the connection if it is available. To reduce battery drain, the transmission rate may be automatically reduced to link to a predetermined transmission rate when on battery power (whether it be from the vehicle and/or device 300). This power management characteristic may comprise a built-in power management feature of the device 300. If a connection to a destination is sought, a network connection may be established at 2506-2508 and data transmitted at 2512, a text message sent, or an error logged at 2510. If a connection to the vehicle bus is sought (e.g., when an activity is detected) the device 300 may negotiate a connection through the vehicle bus.

Figure 28:
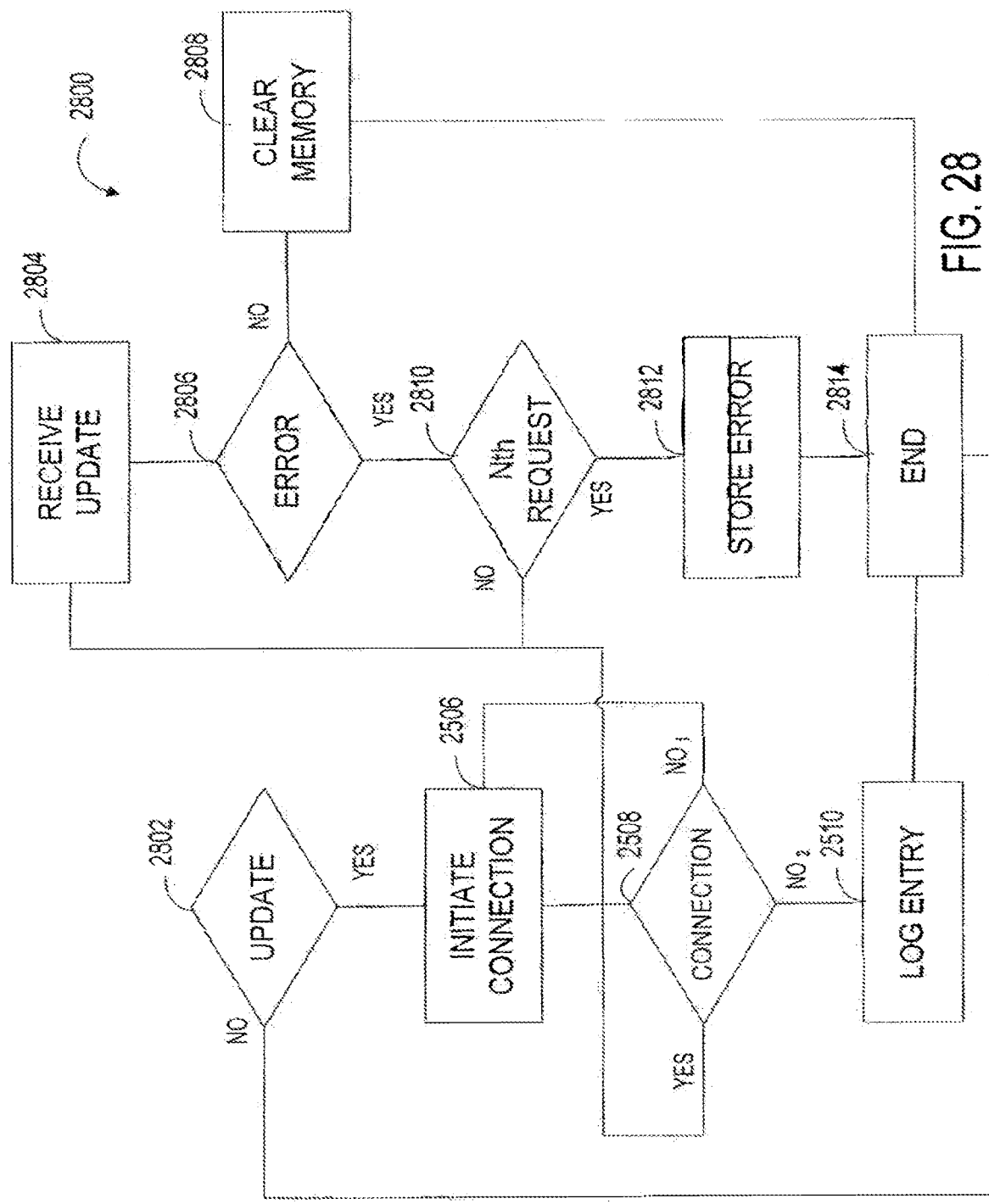
FIG. 28 is a software update process.

A device 300 may receive firmware, configuration files(s), and other updates that may be received from a destination associated with an insurer or entity such as a vendor as shown in FIG. 28. When an update is sought, a network connection may be established at 2506-2508 or an error logged at 2510. A dynamic memory allocation process may allocate additional memory from a device heap (e.g., memory reserved for program or temporary data storage use) before receiving an update. Existing firmware, configuration files, and other files (e.g., legacy versions) may be retained before software, data, or other files are transferred from a destination to the device 300. The transfer of software, data, or other files may fail. If that occurs, the update process may repeat a predetermined number of cycles (e.g., three or more, for example) at 2804-2810. When the error cannot be corrected the legacy versions may be automatically restored and the device 300 may be reset to the preferences and defaults observed before the unsuccessful update. The error may be logged and the dynamic memory allocation process may de-allocate the memory retaining the uninstalled versions from the heap to free some allocated memory. If a device self-diagnostic, an error-detection coding, error-correction coding, or other method confirms or establishes a successful transmission and storage or fails to identify an error, the updates may be installed and the memory allocation process may de-allocate the memory retaining the legacy versions.

The methods and descriptions of FIGS. 1, 5, 6, 7, and 24-28 may be encoded in a signal bearing medium, a computer readable medium or a computer readable storage medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, a powertrain controller, an entertainment and/or comfort controller of a vehicle or non-volatile or volatile memory remote from or resident to a the device 300. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system or apparatus resident to a vehicle or a hands-free or wireless communication system. Alternatively, the software may be embodied in media players (including portable media players) and/or recorders. Such a system may include a computer-based system, a processor-containing system that includes an input and output interface that may communicate with an automotive or wireless communication bus through any hardwired or wireless automotive communication protocol, combinations, or other hardwired or wireless communication protocols to a local or remote destination, server, or cluster.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

Figure 29:
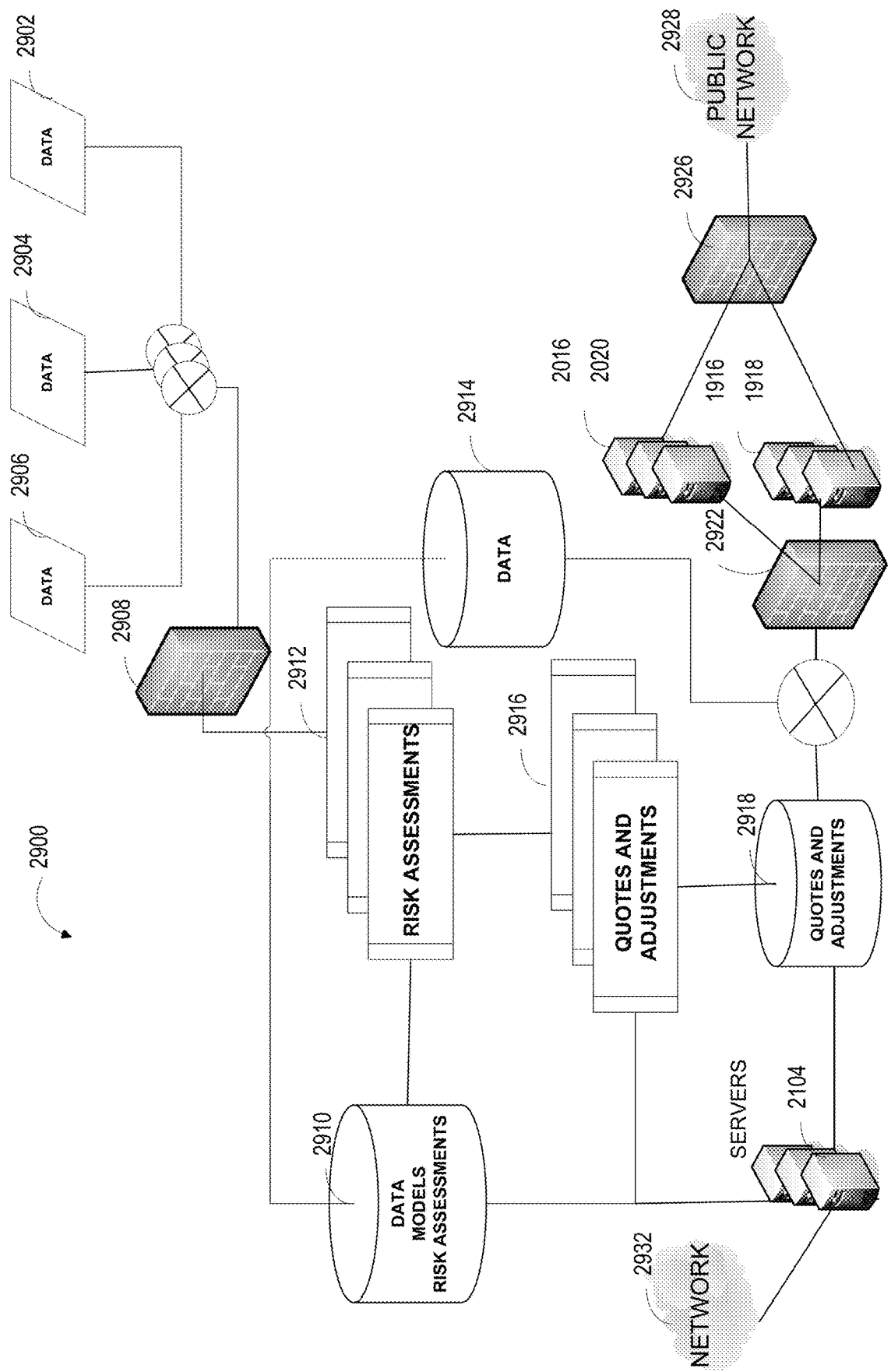
FIG. 29 is an alternative backend of a network based risk management device.
Figure 30:
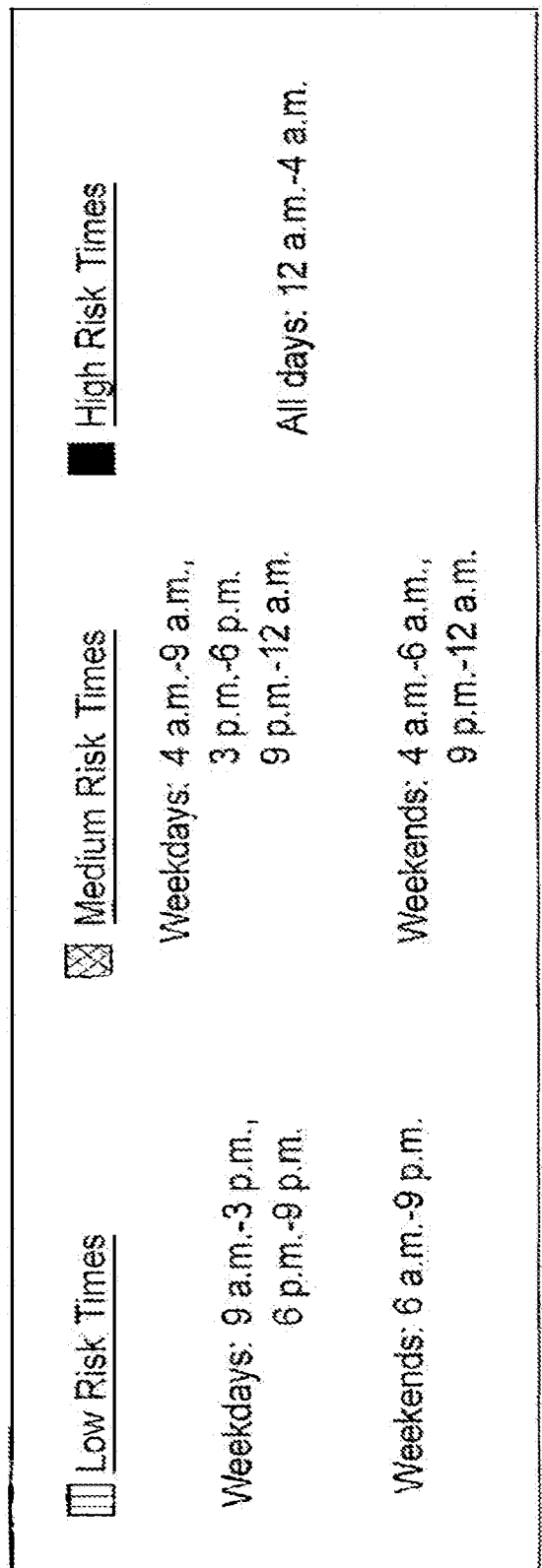
FIG. 30 is a graphical interface summarizing exemplary periods of risk.

When a device initiates a session with a destination (e.g., an insurer or other entity such as a data repository or other content providers) in FIG. 29, it may send and receive discrete digital information such as objects through a wireless network. Objects may be received in real-time or after some delay by the input and output nodes that may interface one or more devices 300 at 2902-2906. Firewalls allow or deny entry or exit from the local area or distributed network at 2908, 2922, and 2926. A correlation analysis, inference programs or engines, insurance computational programs, data modeling, or other statistical analysis may evaluate or assign a level of risk, insurance scores, safety scores, and/or rating factors at 2910-2914. The level of risk scores or factors may be based at least in part on the raw data elements, calculated data elements, derived data elements, and/or other objects received from the device 300.

A quote, cost (e.g., an amount due or bill), or adjustment (e.g., cost, term, or some other parameter) may be derived at 2916. While the quotes, costs, and adjustments may comprise a fixed value, in alternative systems the value may comprise a fluid range that may vary by user, a user's behavior, or by an insurance parameter (e.g., an actuarial class). Distributed databases 2918 may store the quotes, costs, adjustments, raw data elements, calculated data elements, derived data elements, assigned levels of risk, insurance scores, safety scores, rating factors, and/or other objects.

In some systems like those shown in FIG. 29, one or more or of the collective, distributive, or discrete databases may manipulate information in a way a user may find logical or natural to use (e.g., an intelligent database). Intelligent database searches may rely not only on traditional structured query language data-finding routines, but also rely on predetermined rules governing associations, relationships, and/or inferences regarding the data that may be established by the destination (e.g., the insurer or other entity) and that may be retained (e.g., stored) in the database.

Clients or internal users may access the local area or distributed network through firewalls 2926 and 2922, load balancers (not shown), and server clusters 1916, 1918, 2016, 2020 shown in FIG. 29. Through publicly accessible or privately accessible distributed networks, distributors, customers, vendors and other authorized users may transmit requests, and receive, parse, and render responses from clusters of on-line services 2106 and 2020 (that may communicate through Web services) and/or Trip monitoring servers 1916-1922.

Figure 31:
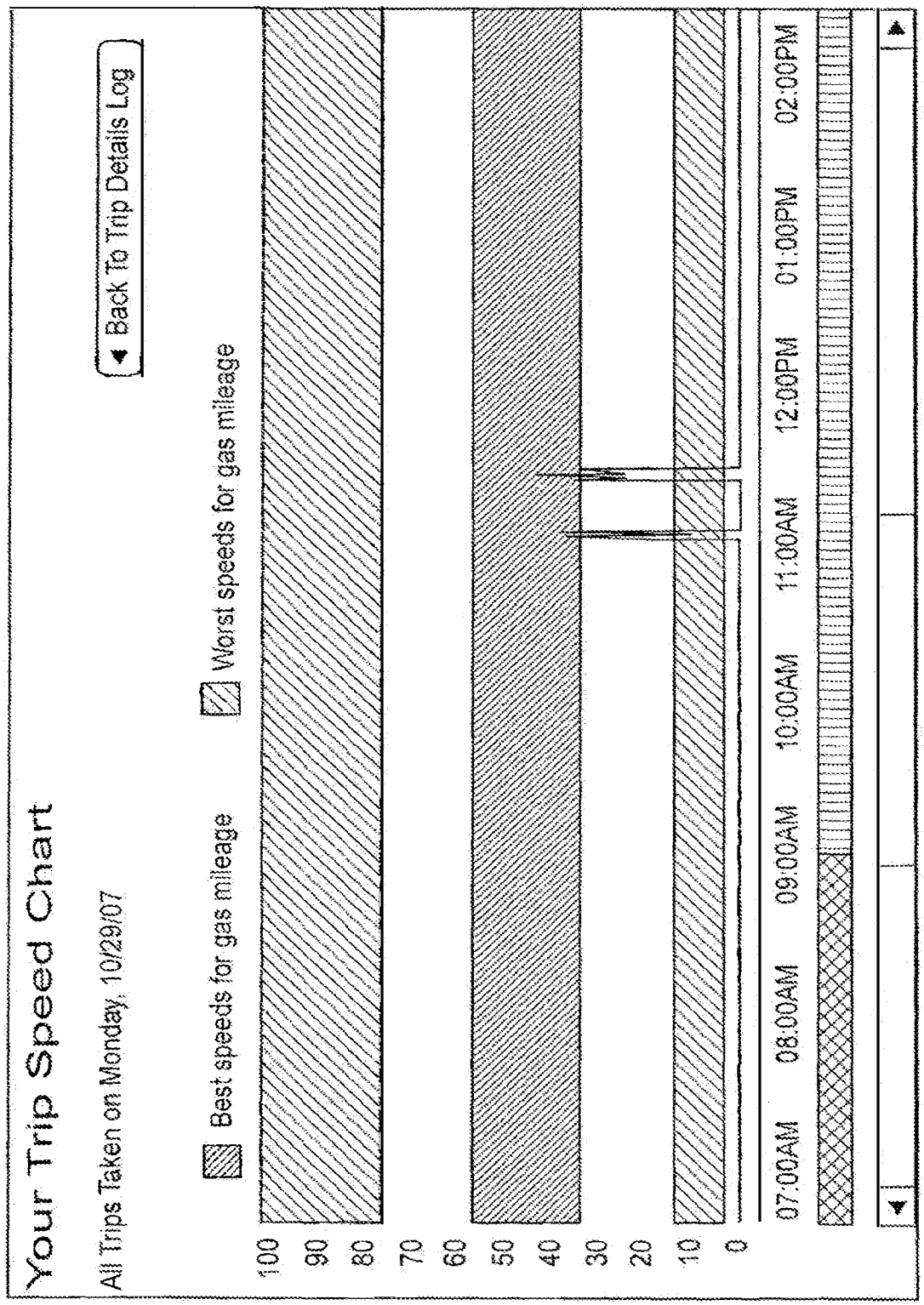
FIG. 31 is a graphical user interface displaying a summary.
Figure 32:
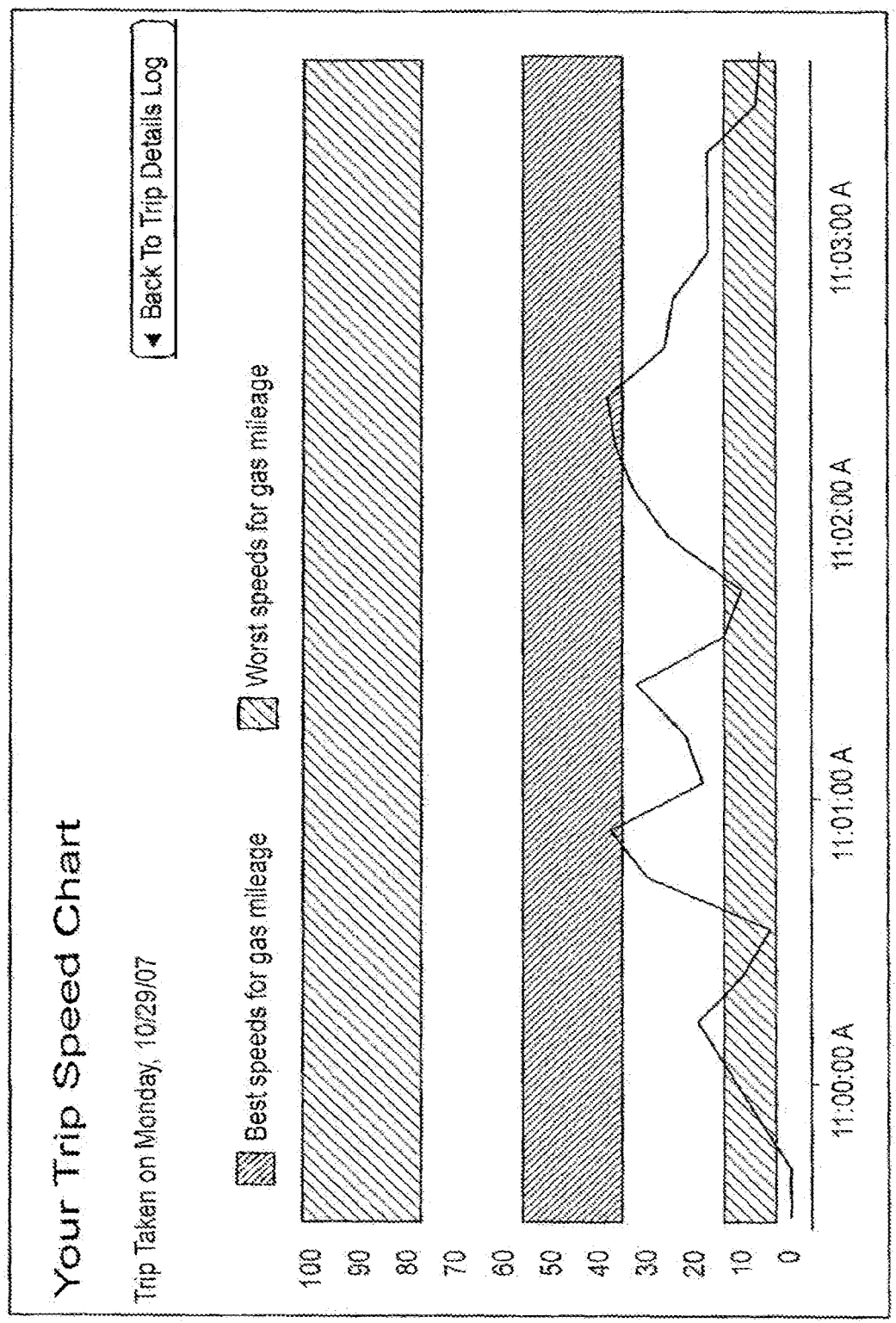
FIG. 32 is a second graphical user interface displaying a summary.
Figure 33:
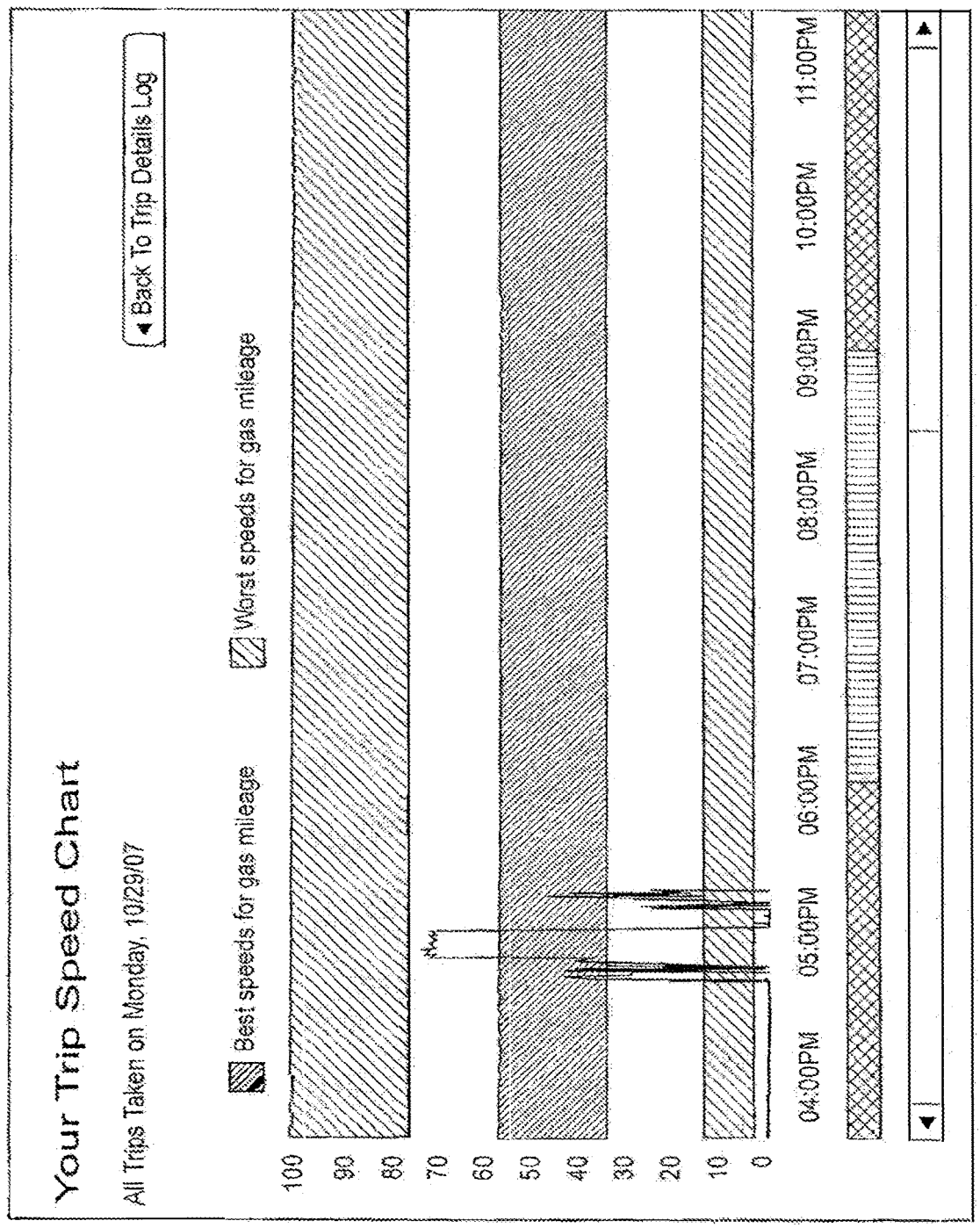
FIG. 33 is a third graphical user interface displaying a summary at a higher resolution.

An information management resource management server (or service within an on-line server) may manage the resources for collecting and delivering content from a destination to the user. The information management resource management server may serve dynamic resources (through an active server side platform) or static resources such as the risk classification page shown in FIG. 30. Other exemplary content that may be delivered to a remote interface is shown in FIGS. 31-34. In FIGS. 31 through 33 a speed is graphically presented. The continuously plotted speed versus time data may provide immediate feedback about the length of time a driver may have been on the road, the driver's continuous speed, and its effect on fuel economy. The level of detail or resolution (compare FIGS. 31 to 32) delivered to a remote interface may be automatically customized to the content delivered to a remote interface to highlight the significance of certain high risk behavior such as driving at excessive speeds.

Additional trip details may be accessed by user activated links that may lead the user to other content such as a trip log. The trip log may provide details that may be sorted or searched and viewed. The exemplary log shown in FIGS. 34A and B provides a chronological record of activities that may enable trip reconstruction or examination of a sequence events and/or changes. The record of events may include the number of trips made on a given date, a pictorial or textual based risk assessment, a measure of drive time, time spent driving at or over a predetermined velocity, mileage, and/or a measure of risk events. In FIGS. 34A and B, a sudden acceleration or braking may suggest an aggressive or unsafe driving behavior.

Other alternate systems and methods may include combinations of some or all of the structure and functions described above or shown in one or more or each of the figures. These systems or methods are formed from any combination of structure and function described or illustrated within the figures. Some alternative systems or devices compliant with one or more of the transceiver protocols may communicate with one or more in-vehicle displays, including touch sensitive displays. In-vehicle and out-of-vehicle wireless connectivity between the device 300, the vehicle, and one or more wireless networks provide high speed connections that allow users to initiate or complete a transaction at any time within a stationary or moving vehicle. The wireless connections may provide access to, or transmit, static or dynamic content (live audio or video streams, for example). The content may include raw data elements, derived data elements, or calculated data elements (e.g., vehicle-related data). Other content may be related to entertainment and comfort, or facilitate electronic commerce or transactions. Some devices 300 allow users to amend or enter into insurance policies through the wireless connections of the vehicle or the wireless processor 2304 of the device 300. Some devices 300 may provide turn-key access to insurance coverage to new vehicle buyers before the vehicle leaves a sales lot. The interoperability of some devices 300 to in-vehicle networks and external wireless protocols allows some devices 300 to provide primary or back-up functionality to in-vehicle equipment, including OEM and/or aftermarket equipment.

Other alternative systems facilitate device 300 recovery. When a disconnection event occurs or an unexpected motion is detected, some devices 300 may initiate an asynchronous or periodic communication with a remote destination, like a control center or another device 300. The device 300 may communicate raw, derived, or calculated data elements including a current location of the device 300. The location may be provided through a radio-navigation system such as a global positioning system, for example. In some applications, devices 300 may monitor real-time traffic conditions. Through synchronous or asynchronous communications, the devices 300 may transmit speed and location readings to a remote destination (e.g., a central control). The remote destination may retain data that may create a real-time picture of traffic speeds, travel times, and/or other travel/road conditions. When compliant with a mesh network, some devices 300 may generate these profiles in areas where wireless service is unavailable. Some devices 300 not only conserve power, but also conserve bandwidth by not moving data continuously across a persistent network. Instead, data is moved across stationary or non-stationary nodes (e.g., a device 300) across relatively short distances until a wireless network transceiver or destination is reached.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system comprising:
a processor;
a server;
a sensor that converts a biometric characteristic of a person into an output that authenticates a vehicle operator;
an in-vehicle automotive device that stores the output and selects data from a bus by acquiring vehicle data related to a level of risk or safety of operation of a vehicle;
the in-vehicle automotive device acquires the vehicle data from one or more in-vehicle sensors;

the in-vehicle automotive device stores the vehicle data, data related to a safety standard, and the output in a memory within the vehicle and is configured to stores a network protocol information in the memory each time the in-vehicle automotive device is installed within the vehicle a plurality of times; and a wireless interface that accesses the vehicle data, data related to the safety standard, and the output;

where the memory stores the vehicle data and data related to the safety standard;

where the vehicle data, data related to the safety standard, and the output are transmitted by the processor through the wireless interface to the server; the processor is configured to assign the vehicle to an actuarial tier based on the vehicle data and the data related to the safety standard and predetermined actuarial parameters; and where the wireless interface is responsive to a wireless request that causes a transfer of an encrypted form of the vehicle data, the data related to the safety standard, and the output by a transceiver.

2. The system of claim 1 where the in-vehicle automotive device automatically identifies the network protocol and autonomously identifies the network protocol by an initialization file executed by the in-vehicle automotive device automatically.

3. The system of claim 1 where the wireless interface is operable to transmit data through two or more wireless modulation schemes.

4. The system of claim 1 where the vehicle data comprises data that identifies a motor vehicle hard braking event.

5. The system of claim 1 where the vehicle data comprises data that identifies a motor vehicle turning event.

6. The system of claim 1 where the vehicle data comprises data that identifies a motor vehicle acceleration event.

7. The system of claim 1 where a wireless transceiver is coupled to the wireless interface.

8. The system of claim 7 where the server is programmed to transmit content to the wireless transceiver in response to an operating event in the vehicle.

9. The system of claim 8 where the server comprises a cluster programmed to identify vehicle operation within a plurality of speed ranges.

10. A system comprising:
a sensor that converts a biometric characteristic of a person into an output;
an in-vehicle automotive device that stores the output and filters data from an in-vehicle bus by selecting vehicle data related to a level of risk or safety of operation of a vehicle, the in-vehicle automotive device selects the vehicle data from one or more in-vehicle sensors;
the in-vehicle automotive device stores the selected vehicle data, relationship data that associates the vehicle data to a user, and the output each within a plurality of memory portions, respectively within the vehicle; and
a wireless transmitter that throttles the selected vehicle data at a transmission rate based on a network bandwidth;
where the in-vehicle automotive device selects a network protocol from a plurality of selectable network protocols used by the wireless transmitter based on an exchange of signals by the wireless transmitter at a network channel's capacity.

11. The system of claim 10 where the selected vehicle data is transmitted in response to a trigger event.

12. The system of claim 10 where the in-vehicle automotive device autonomously identifies an automotive communication protocol automatically and automatically selects an Ultrawideband protocol or a Mobile Fi protocol.

13. The system of claim 10 where the wireless transmitter is configured to transmit data across a plurality of modulation schemes.

14. The system of claim 10 further comprising a biometric scanner that stores biometric information in one of the plurality of memory portions within the vehicle that the in-vehicle automotive device compares against an operator list of biometric characteristics.

15. A system comprising:
a processor;
a sensor that converts a biometric characteristic of a person into an output that authenticates a vehicle operator;
an in-vehicle automotive device that processes the output and filters data from a bus by acquiring vehicle data related to a level of risk or safety of operation of a vehicle; the in-vehicle automotive device acquires the vehicle data from one or more in-vehicle sensors;
the in-vehicle automotive device stores the vehicle data, data related to a safety standard, and the output in a memory within the vehicle and stores a network protocol information each time the in-vehicle automotive device is installed within the vehicle; and
a wireless interface that accesses the vehicle data, data related to the safety standard, and the output;
where the memory stores the vehicle data, data related to the safety standard, and the output and the in-vehicle automotive device is configured to be installed within the vehicle a plurality of time and store a network protocol information a plurality of times;
where the vehicle data, data related to the safety standard, and the output are transmitted through the wireless interface and the processor is configured to assign the vehicle to an actuarial tier based on the vehicle data and the data related to the safety standard and predetermined actuarial parameters automatically;
where the wireless interface is responsive to a wireless request that causes a transfer of an encrypted form of the vehicle data, the data related to the safety standard, and the output; and
where the in-vehicle automotive device selects a second network protocol from a plurality of second selectable network protocols used by a wireless transmitter based on an exchange of signals by the wireless transmitter at a network channel's capacity.

16. A system comprising:
a transducer that converts a biometric characteristic of a person into an output;
an in-vehicle automotive device that processes the output and filters data from an in-vehicle bus by selecting vehicle data related to a level of risk or safety of operation of a first vehicle, the automotive device selects the vehicle data from one or more in-vehicle sensors;
a memory that stores the selected vehicle data, a relationship data, and the output within a memory portion within a vehicle; and
a wireless transmitter that is operable to throttle the selected vehicle data at a transmission rate based on a network bandwidth autonomously;
where the in-vehicle automotive device selects a network protocol from a plurality of selectable network protocols used by the wireless transmitter based on an exchange of signals by the wireless transmitter at a network channel's capacity.

17. The system of claim 16 where a memory that stores the vehicle data, data related to the safety standard, and the output in a memory within a vehicle and stores a network protocol information each time the in-vehicle automotive device is installed within the vehicle.

18. A system comprising:
a transducer that converts a biometric characteristic of a person into an output;
an in-vehicle automotive device that processes the output and filters data from an in-vehicle bus by selecting vehicle data related to a level of risk or safety of operation of a first vehicle, the automotive device selects the vehicle data from one or more in-vehicle sensors;
a memory that stores the selected vehicle data, a user account data, and the output within a memory portion within a vehicle; and
a wireless transmitter operable to throttle the selected vehicle data at a transmission rate based on a wireless network bandwidth autonomously; the wireless transmitter communicates a protocol used by the in-vehicle automotive device to communicate with an in-vehicle bus used by the vehicle;
where the in-vehicle automotive device selects a network protocol from a plurality of selectable network protocols used by the wireless transmitter based on an exchange of signals by the wireless transmitter at a wireless network channel's capacity.

19. The system of claim 18 where the in-vehicle automotive device is programmed with a checkin interval comprising a predetermined time the wireless transmitter calls a destination for a scheduled call.

20. The system of claim 18 where the in-vehicle automotive device is programmed with a port read frequency comprising a predetermined amount of time the in-vehicle automotive device reads information between a time when a motion of the vehicle is detected and when data is not detected.

21. The system of claim 10 further including a processor in communication with the in-vehicle automotive device; the processor configured to assign the vehicle to an actuarial tier based on the vehicle data related to a safety standard and predetermined actuarial parameters.

22. A system comprising:
a sensor that converts a biometric characteristic of a person into an output;
an in-vehicle automotive device that stores the output and filters data from an in-vehicle bus by selecting vehicle data related to a level of risk or safety of operation of a vehicle, the in-vehicle automotive device selects the vehicle data from one or more in-vehicle sensors;
the in-vehicle automotive device stores the selected vehicle data, relationship data that associates the vehicle data to a user, and the output signal within a plurality of memory portions; respectively within the vehicle;
a processor in communication with the in-vehicle automotive device; and
a wireless transmitter that throttles the selected vehicle data at a transmission rate based on a network bandwidth;
where the in-vehicle automotive device selects a network protocol from a plurality of selectable network protocols used by the wireless transmitter based on an exchange of signals by the wireless transmitter at a network channel's capacity; and
where the processor is configured to assign the vehicle to an actuarial tier based on the vehicle data related to a safety standard and predetermined actuarial parameters.

* * * * *

UNITED STATES PATENT AND TRADEMARK OFFICE
CERTIFICATE OF CORRECTION

| | |
|---|---|
| PATENT NO. | : 11,551,486 B1 |
| APPLICATION NO. | : 15/694266 |
| DATED | : January 10, 2023 |
| INVENTOR(S) | : William Curtis Everett et al. |

It is certified that error appears in the above-identified patent and that said Letters Patent is hereby corrected as shown below:

In the Claims

In Claim 1, at Column 45, Line 3 replace "memory within the vehicle and is configured to stores" with -- "memory within the vehicle and is configured to store" --

Signed and Sealed this
Seventh Day of March, 2023

Katherine Kelly Vidal
*Director of the United States Patent and Trademark Office*